(12) United States Patent
Nishida

(10) Patent No.: US 11,774,149 B2
(45) Date of Patent: Oct. 3, 2023

(54) AIR CONDITIONER

(71) Applicant: DENSO CORPORATION, Kariya (JP)

(72) Inventor: Shin Nishida, Kariya (JP)

(73) Assignee: DENSO CORPORATION, Kariya (JP)

( * ) Notice: Subject to any disclaimer, the term of this patent is extended or adjusted under 35 U.S.C. 154(b) by 143 days.

(21) Appl. No.: 17/526,751

(22) Filed: Nov. 15, 2021

(65) Prior Publication Data

US 2022/0074636 A1 Mar. 10, 2022

Related U.S. Application Data

(63) Continuation of application No. PCT/JP2020/016163, filed on Apr. 10, 2020.

(30) Foreign Application Priority Data

May 17, 2019 (JP) .................................. 2019-093536

(51) Int. Cl.
  *F25B 47/02* (2006.01)
  *B60H 1/00* (2006.01)
  (Continued)

(52) U.S. Cl.
  CPC ......... *F25B 47/02* (2013.01); *B60H 1/00921* (2013.01); *B60H 1/22* (2013.01);
  (Continued)

(58) Field of Classification Search
  CPC ....... F25B 47/02; B60H 1/00921; B60H 1/22; B60H 1/32; B60H 2001/00164; B60H 2001/00949
  See application file for complete search history.

(56) References Cited

U.S. PATENT DOCUMENTS 10,017,031 B2   7/2018   Klein et al.
2016/0052365 A1  2/2016   Kohigashi et al.
(Continued)

FOREIGN PATENT DOCUMENTS

JP   H0858359 A    3/1996
JP   2013193668 A  9/2013
(Continued)

*Primary Examiner* — Marc E Norman
(74) *Attorney, Agent, or Firm* — Harness, Dickey & Pierce, P.L.C.

(57) ABSTRACT

An air conditioner includes a first inlet-side inside/outside air switching part, a first outlet-side outside/inside air switching part, a second inlet-side inside/outside air switching part and a second outlet-side inside/outside air switching part. In a dehumidifying heating mode, the first outlet-side inside/outside air switching part makes a switch to a ventilation path that guides air having passed through a first heat exchange part into a space to be air-conditioned, and the second inlet-side inside/outside air switching part makes a switch to a ventilation path that guides outside air to a second heat exchange part. In a defrosting mode, the second inlet-side inside/outside air switching part makes a switch to a ventilation path that guides inside air to the second heat exchange part, and a flow rate of refrigerant flowing through the second heat exchange part is reduced more than in the dehumidifying heating mode.

14 Claims, 31 Drawing Sheets

(51) Int. Cl.
*B60H 1/22* (2006.01)
*B60H 1/32* (2006.01)

(52) U.S. Cl.
CPC ..... *B60H 1/32* (2013.01); *B60H 2001/00164* (2013.01); *B60H 2001/00949* (2013.01)

(56) References Cited

U.S. PATENT DOCUMENTS

| | | |
|---|---|---|
| 2017/0043646 A1 | 2/2017 | Lee et al. |
| 2017/0129309 A1 | 5/2017 | Lee et al. |
| 2017/0217278 A1 | 8/2017 | Richter et al. |
| 2017/0299232 A1 | 10/2017 | Richter et al. |
| 2018/0093545 A1 | 4/2018 | Park et al. |
| 2020/0101819 A1 | 4/2020 | Yamada et al. |
| 2020/0290426 A1* | 9/2020 | Aikawa .............. B60H 1/00428 |
| 2022/0402331 A1* | 12/2022 | Tada ........................ B60L 1/08 |

FOREIGN PATENT DOCUMENTS

| | | |
|---|---|---|
| JP | 6189098 B2 | 8/2017 |
| JP | 2017226418 A | 12/2017 |
| WO | WO-2019003694 A1 | 1/2019 |

\* cited by examiner

INSIDE-AIR HEATING MODE

OUTSIDE-AIR HEATING MODE

DEFROSTING MODE (DEHUMIDIFYING HEATING MODE)

DEFROSTING MODE (DEHUMIDIFYING HEATING MODE)

DEFROSTING MODE (DEHUMIDIFYING HEATING MODE)

⟵ : FIRST REFRIGERANT CIRCUIT
⟵-- : SECOND REFRIGERANT CIRCUIT

← : FIRST REFRIGERANT CIRCUIT
←--- : SECOND REFRIGERANT CIRCUIT

← : FIRST REFRIGERANT CIRCUIT
←-- : SECOND REFRIGERANT CIRCUIT

⟵ : FIRST REFRIGERANT CIRCUIT
⟵ - - : SECOND REFRIGERANT CIRCUIT

US 11,774,149 B2

AIR CONDITIONER

CROSS REFERENCE TO RELATED APPLICATION

The present application is a continuation application of International Patent Application No. PCT/JP2020/016163 filed on Apr. 10, 2020, which designated the U.S. and claims the benefit of priority from Japanese Patent Application No. 2019-093536 filed on May 17, 2019. The entire disclosures of all of the above applications are incorporated herein by reference.

TECHNICAL FIELD

The present disclosure relates to an air conditioner having a heat pump cycle.

BACKGROUND

An air conditioner for a vehicle includes a heat pump cycle configured to control temperature of air that is blown into a cabin of the vehicle. The heat pump cycle is further configured to switch a refrigerant circuit in accordance with an operation mode of the air conditioner.

SUMMARY

An air conditioner includes a heat pump cycle having: a compressor that compresses and discharges a refrigerant; a heating part that heats air blown into a space to be air-conditioned by using the refrigerant discharged from the compressor as a heat source; a first decompression part that decompresses the refrigerant on a downstream side of the heating part; a first heat exchange part that exchanges heat between the refrigerant flowing out of the first decompression part and air; a second decompression part that decompresses the refrigerant flowing out of the first heat exchange part; and a second heat exchange part that exchanges heat between the refrigerant flowing out of the second decompression part and air. A first inlet-side inside/outside air switching part is configured to switch between a ventilation path that guides inside air in the space to be air-conditioned to the first heat exchange part and a ventilation path that guides outside air outside the space to be air-conditioned to the first heat exchange part. A first outlet-side outside/inside air switching part is configured to switch between a ventilation path that guides the air passing through the first heat exchange part into the space to be air-conditioned and a ventilation path that guides the air passing through the first heat exchange part out of the space to be air-conditioned. A second inlet-side inside/outside air switching part is configured to switch between a ventilation path that guides the inside air to the second heat exchange part and a ventilation path that guides the outside air to the second heat exchange part. A second outlet-side inside/outside air switching part is configured to switch between a ventilation path that guides the air passing through the second heat exchange part into the space to be air-conditioned and a ventilation path that guides the air passing through the second heat exchange part out of the space to be air-conditioned. The heating part is disposed to be able to heat at least the air passing through the first heat exchange part. In a dehumidifying heating mode for dehumidifying and heating the space to be air-conditioned, the first outlet-side inside/outside air switching part makes a switch to the ventilation path that guides the air passing through the first heat exchange part into the space to be air-conditioned, and the heating part heats the air passing through the first heat exchange part. The second inlet-side inside/outside air switching part makes a switch to the ventilation path that guides the outside air to the second heat exchange part, and the second outlet-side inside/outside air switching part makes a switch to the ventilation path that guides the air passing through the second heat exchange part out of the space to be air-conditioned. In a defrosting mode for defrosting the second heat exchange part, the second inlet-side inside/outside air switching part makes a switch to the ventilation path that passes the inside air to the second heat exchange part and further reduces a flow rate of the refrigerant flowing through the second heat exchange part more than in the dehumidifying heating mode to maintain a temperature of the refrigerant flowing through the second heat exchange part within a predetermined reference defrosting temperature range.

DESCRIPTION OF EMBODIMENTS

Figure 1:
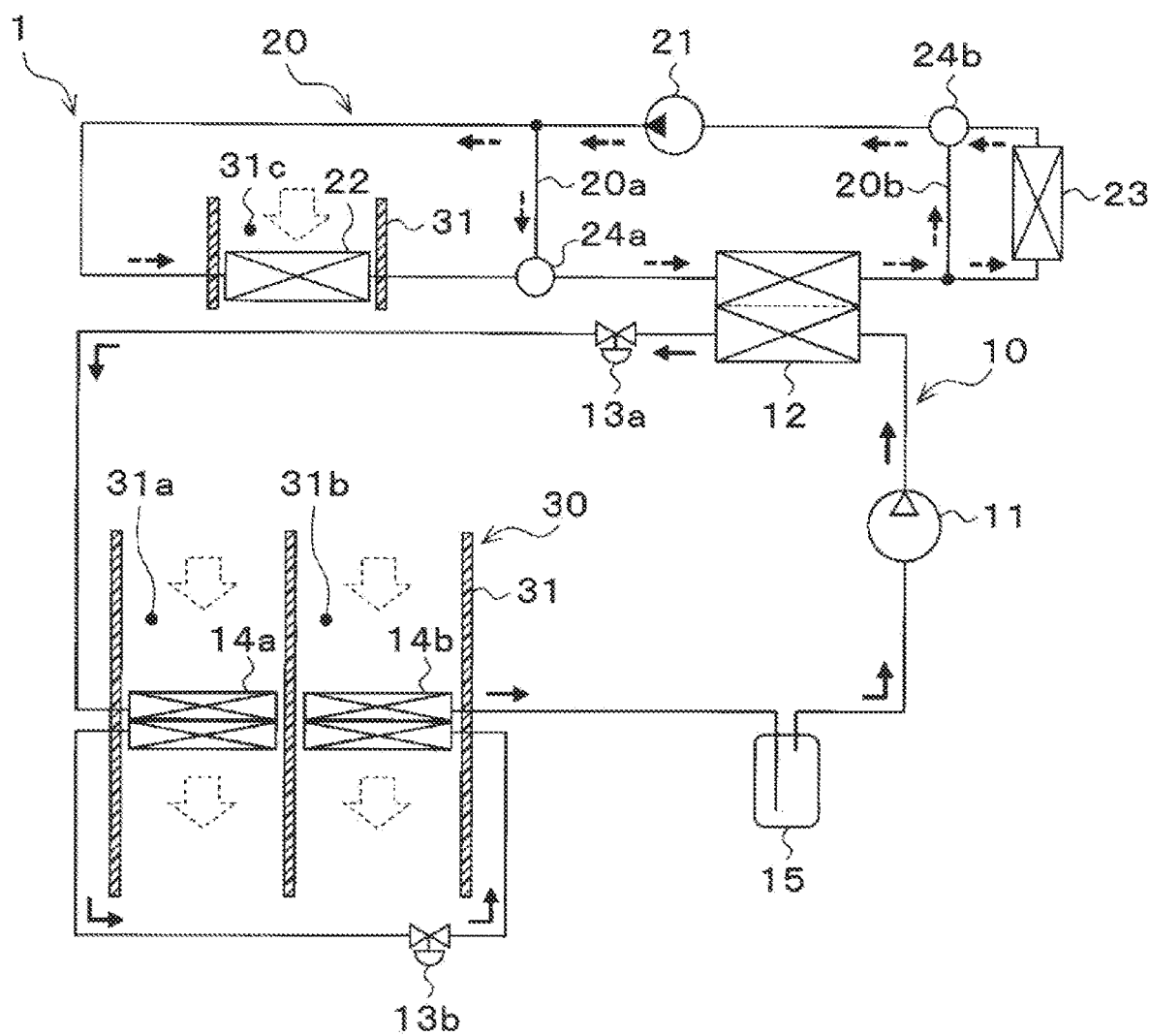
FIG. 1 is a schematic overall configuration diagram of an air conditioner according to a first embodiment.

To begin with, examples of relevant techniques will be described.

A vehicular air conditioner includes a heat pump cycle configured to regulate the temperature of air that is blown into a vehicle interior. Further, the heat pump cycle is configured to be able to switch a refrigerant circuit in accordance with an operation mode of a vehicular air conditioner.

More specifically, the vehicular air conditioner performs an operation in an operation mode for heating air, such as a heating mode or a dehumidifying heating mode.

In the operation mode for heating air, the heat pump cycle can make a switch to a refrigerant circuit that allows a high-pressure refrigerant discharged from a compressor to flow into an interior condenser and allows a low-pressure refrigerant decompressed by an expansion valve to flow into the exterior heat exchanger. Accordingly, in the heat pump cycle, the heat absorbed from the outside air by the refrigerant in the exterior heat exchanger is radiated from the refrigerant to the air in the interior condenser to heat the air.

For this reason, when the operation mode for heating the air at a low outside air temperature is executed, a refrigerant evaporation temperature in the exterior heat exchanger becomes 0° C. or lower, and frost may form on the exterior heat exchanger. Such frosting causes deterioration in heat exchange performance between the refrigerant and outside air in the exterior heat exchanger. As a result, when frost forms on the exterior heat exchanger, the air heating capacity of the heat pump cycle deteriorates.

In contrast, in the vehicular air conditioner, when frost forms on the exterior heat exchanger, an operation in a defrosting mode for removing the frost on the exterior heat exchanger is performed.

In the defrosting mode, the heat pump cycle is switched to a refrigerant circuit constituting a so-called hot gas cycle in which the high-pressure refrigerant discharged from the compressor is circulated through the interior condenser, the exterior heat exchanger, and the suction port of the compressor in this order. Accordingly, in the defrosting mode of the vehicular air conditioner, the exterior heat exchanger is defrosted while the air is heated in the interior condenser.

However, when the exterior heat exchanger is defrosted while the air is heated as in the defrosting mode, heat usable for defrosting may be insufficient. As a result, the defrosting time is prolonged.

In contrast, it is conceivable that the refrigerant discharge capacity of the compressor is increased in the defrosting mode to increase the heat usable for defrosting. However, when the refrigerant discharge capacity of the compressor is increased in the defrosting mode, energy consumed by the heat pump cycle for defrosting the exterior heat exchanger increases.

The present disclosure provides an air conditioner including a heat pump cycle and capable of reducing energy consumed for defrosting a heat exchange part where frost has formed.

According to a first aspect of the present disclosure, an air conditioner includes a heat pump cycle, a heat exchange part inlet-side inside/outside air switching part, and a heat exchange part outlet-side inside/outside air switching part.

The heat pump cycle includes a compressor that compresses and discharges a refrigerant, a heating part that heats air blown into a space to be air-conditioned by using the refrigerant discharged from the compressor as a heat source, a decompression part that decompresses the refrigerant on a downstream side of the heating part, and a heat exchange part that exchanges heat between the refrigerant flowing out of the decompression part and the air.

The heat exchange part inlet-side inside/outside air switching part is configured to switch between a ventilation path that guides inside air in the space to be air-conditioned to the heat exchange part and a ventilation path that guides outside air outside the space to be air-conditioned to the heat exchange part. The heat exchange part outlet-side inside/outside air switching part is configured to switch between a ventilation path that guides the air passing through the heat exchange part into the space to be air-conditioned and a ventilation path that guides the air passing through the heat exchange part out of the space to be air-conditioned.

In a heating mode for heating the space to be air-conditioned, the heat exchange part outlet-side inside/outside air switching part makes a switch to the ventilation path that guides the air passing through the heat exchange part out of the space to be air-conditioned.

In a defrosting mode for defrosting the heat exchange part, the heat exchange part inlet-side inside/outside air switching part makes a switch to the ventilation path that guides the inside air to the heat exchange part, the heat exchange part further reducing a flow rate of the refrigerant flowing through the heat exchange part more than in the heating mode to maintain a temperature of the refrigerant flowing through the heat exchange part within a predetermined reference defrosting temperature range.

Accordingly, in the heating mode, the heat exchange part outlet-side inside/outside air switching part makes a switch to the ventilation path that guides the air having passed through the heat exchange part out of the space to be air-conditioned. Thus, in the heating mode, that the space to be air-conditioned can be heated by guiding the air heated in the heating part to the space to be air-conditioned. In the heating mode, the air can be reliably heated in the heating part by using the heat absorbed from the outside air by the refrigerant in the heat exchange part as a heat source.

In the defrosting mode, the heat exchange part inlet-side inside/outside air switching part makes a switch to the ventilation path that guides inside air to the heat exchange part. Hence it is possible to defrost the heat exchange part by using the heat of inside air having a relatively high temperature.

At the same time, in the defrosting mode, the flow rate of the refrigerant flowing through the heat exchange part is reduced more than in the heating mode, whereby the temperature has of the refrigerant flowing through the heat exchange part is maintained within the reference defrosting temperature range where the heat exchange part can be defrosted. It is thus possible to effectively defrost the heat exchange part.

As a result, according to the air conditioner of the first aspect, it is possible to reduce energy consumed for defrosting the heat exchange part.

According to a second aspect of the present disclosure, an air conditioner includes a heat pump cycle, a first inlet-side inside/outside air switching part, a first outlet-side outside/inside air switching part, a second inlet-side inside/outside air switching part and a second outlet-side inside/outside air switching part.

The heat pump cycle includes a compressor that compresses and discharges a refrigerant, a heating part that heats air blown into a space to be air-conditioned by using the refrigerant discharged from the compressor as a heat source, a first decompression part that decompresses the refrigerant on a downstream side of the heating part, a first heat exchange part that exchanges heat between the refrigerant flowing out of the first decompression part and air, a second decompression part that decompresses the refrigerant flowing out of the first heat exchange part, and a second heat exchange part that exchanges heat between the refrigerant flowing out of the second decompression part and air.

The first inlet-side inside/outside air switching part is configured to switch between a ventilation path that guides inside air in the space to be air-conditioned to the first heat exchange part and a ventilation path that guides outside air outside the space to be air-conditioned to the first heat exchange part. Thea first outlet-side outside/inside air switching part is configured to switch between a ventilation path that guides the air passing through the first heat exchange part into the space to be air-conditioned and a ventilation path that guides the air passing through the first heat exchange part out of the space to be air-conditioned.

The second inlet-side inside/outside air switching part is configured to switch between a ventilation path that guides the inside air to the second heat exchange part and a ventilation path that guides the outside air to the second heat exchange part. The second outlet-side inside/outside air switching part is configured to switch between a ventilation path that guides the air passing through the second heat exchange part into the space to be air-conditioned and a ventilation path that guides the air passing through the second heat exchange part out of the space to be air-conditioned.

The heating part is disposed to be able to heat at least the air passing through the first heat exchange part.

In a dehumidifying heating mode for dehumidifying and heating the space to be air-conditioned, the first outlet-side inside/outside air switching part makes a switch to the ventilation path that guides the air passing through the first heat exchange part into the space to be air-conditioned. The heating part heats the air passing through the first heat exchange part. The second inlet-side inside/outside air switching part makes a switch to the ventilation path that guides the outside air to the second heat exchange part. The second outlet-side inside/outside air switching part makes a switch to the ventilation path that guides the air passing through the second heat exchange part out of the space to be air-conditioned.

In a defrosting mode for defrosting the second heat exchange part, the second inlet-side inside/outside air switching part makes a switch to the ventilation path that passes the inside air to the second heat exchange part and further reduces a flow rate of the refrigerant flowing through the second heat exchange part more than in the dehumidifying heating mode to maintain a temperature of the refrigerant flowing through the second heat exchange part within a predetermined reference defrosting temperature range.

Accordingly, in the dehumidifying heating mode, the first outlet-side inside/outside air switching part makes a switch to the ventilation path that guides the air having passed through the first heat exchange part into the space to be air-conditioned. The heating part heats the air having passed through the first heat exchange part. Therefore, the space to be air-conditioned can be dehumidified and heated by reheating the air, cooled and dehumidified in the first heat exchange part, in the heating part and guiding the air to the space to be air-conditioned.

In the dehumidifying heating mode, the second inlet-side inside/outside air switching part makes a switch to the ventilation path that guides outside air to the second heat exchange part. The second outlet-side inside/outside air switching part makes a switch to the ventilation path that guides the air having passed through the second heat exchange part out of the space to be air-conditioned. Hence the air can be reliably reheated in the heating part by using the heat absorbed from the outside air by the refrigerant in the second heat exchange part as a heat source.

In the defrosting mode, the second inlet-side inside/outside air switching part makes a switch to the ventilation path that guides the inside air to the second heat exchange part. It is thus possible to defrost the second heat exchange part by using the heat of inside air at a relatively high temperature.

At the same time, in the defrosting mode, the flow rate of the refrigerant flowing through the second heat exchange part is reduced more than in the dehumidifying heating mode, whereby the temperature of the refrigerant flowing through the second heat exchange part is maintained within the reference defrosting temperature range where the second heat exchange part can be defrosted. It is thus possible to effectively defrost the second heat exchange part.

As a result, according to the air conditioner of the second aspect, it is possible to reduce energy consumed for defrosting the second heat exchange part.

According to a third aspect of the present disclosure, an air conditioner includes a heat pump cycle, a first inlet-side inside/outside air switching part, a first outlet-side outside/inside air switching part, a second inlet-side inside/outside air switching part and a second outlet-side inside/outside air switching part.

The heat pump cycle includes a compressor that compresses and discharges a refrigerant, a heating part that heats blown air blown into a space to be air-conditioned by using a high-pressure refrigerant discharged from the compressor as a heat source, a first decompression part that decompresses the refrigerant on a downstream side of the heating part, a second decompression part that decompresses the refrigerant on the downstream side of the heating part, a first heat exchange part that exchanges heat between the refrigerant flowing out of one of the first decompression part and the second decompression part and air, a second heat exchange part that exchanges heat between the refrigerant flowing out of the other heat exchange part of the first decompression part and the second decompression part and air, and a refrigerant circuit switching part that switches a refrigerant circuit.

The first inlet-side inside/outside air switching part is configured to switch between a ventilation path that guides inside air in the space to be air-conditioned to the first heat exchange part and a ventilation path that guides outside air outside the space to be air-conditioned to the first heat exchange part. The first outlet-side outside/inside air switching part is configured to switch between a ventilation path that guides the air passing through the first heat exchange part into the space to be air-conditioned and a ventilation path that guides the air passing through the first heat exchange part out of the space to be air-conditioned.

The second inlet-side inside/outside air switching part is configured to switch between a ventilation path that guides the inside air to the second heat exchange part and a ventilation path that guides the outside air to the second heat exchange part. The second outlet-side inside/outside air switching part is configured to switch between a ventilation path that guides the air passing through the second heat exchange part into the space to be air-conditioned and a ventilation path that guides the air passing through the second heat exchange part out of the space to be air-conditioned.

The heating part is disposed to be able to heat the air passing through the first heat exchange part and the air passing through the second heat exchange part.

The refrigerant circuit switching part is configured to be able to switch between a first refrigerant circuit that allows a refrigerant to flow through at least the first decompression part, the first heat exchange part, the second decompression part, and the second heat exchange part in this order and a second refrigerant circuit that allows a refrigerant to flow through the first decompression part, the second heat exchange part, the second decompression part, and the first heat exchange part in this order.

In a dehumidifying heating mode for dehumidifying and heating the space to be air-conditioned, the first outlet-side inside/outside air switching part and the second outlet-side inside/outside air switching part make a switch to the ventilation path that guides the air passing through one of the first heat exchange part and the second heat exchange part into the space to be air-conditioned. The heating part heats the air passing through the one of heat exchange parts. The first outlet-side inside/outside air switching part and the second inlet-side inside/outside air switching part switch the outside air to the other of the first heat exchange part and the second heat exchange part. The first inlet-side inside/outside air switching part and the second outlet-side inside/outside air switching part make a switch to the ventilation path that guides the air passing through the other heat exchange part out of the space to be air-conditioned.

In a defrosting mode for defrosting the other heat exchange part, the first inlet-side inside/outside air switching part and the second inlet-side inside/outside air switching part make a switch to the ventilation path that passes the inside air to the other heat exchange part and further reduces a flow rate of the refrigerant flowing through the other heat exchange part more than in the dehumidifying heating mode to maintain a temperature of the refrigerant flowing through the other heat exchange part within a predetermined reference defrosting temperature range.

Accordingly, in the dehumidifying heating mode, the first outlet-side inside/outside air switching part and the second outlet-side inside/outside air switching part make a switch to the ventilation path that guides the air having passed through the one heat exchange part into the space to be air-conditioned. The heating part heats the air having passed through the one heat exchange part. Therefore, the space to be air-conditioned can be dehumidified and heated by reheating the air, cooled and dehumidified in the one heat exchange part, in the heating part and guiding the air to the space to be air-conditioned.

In the dehumidifying heating mode, the first inlet-side inside/outside air switching part and the second inlet-side inside/outside air switching part make a switch to the ventilation path that guides outside air to the other heat exchange part. The first outlet-side inside/outside air switching part and the second outlet-side inside/outside air switching part make a switch to the ventilation path that guides the air having passed through the other heat exchange part out of the space to be air-conditioned. Hence the air can be reliably reheated in the heating part by using the heat absorbed from the outside air by the refrigerant in the other heat exchange part as a heat source.

In the defrosting mode, the first inlet-side inside/outside air switching part and the second inlet-side inside/outside air switching part make a switch the ventilation path that guides the inside air to the other heat exchange part. Hence it is possible to defrost the other heat exchange part by using the heat of inside air having a relatively high temperature.

At the same time, in the defrosting mode, the flow rate of the refrigerant flowing through the other heat exchange part is reduced more than in the dehumidifying heating mode, whereby the temperature of the refrigerant flowing through the other heat exchange part is maintained within the reference defrosting temperature range where the other heat exchange part can be defrosted. It is thus possible to effectively defrost the other heat exchange part.

As a result, according to the air conditioner of the third aspect, it is possible to reduce energy consumed for defrosting the other heat exchange part.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

In the present embodiment, the air conditioner according to the present disclosure is applied to an air conditioner 1 mounted on an electric vehicle that obtains a driving force for traveling from an electric motor. The air conditioner 1 performs air conditioning of a vehicle interior that is a space to be air-conditioned in an electric vehicle.

The air conditioner 1 includes a heat pump cycle 10, a heat medium circuit 20, an air conditioning unit 30, a control device 40, and the like.

First, the heat pump cycle 10 will be described with reference to FIG. 1. The heat pump cycle 10 regulates, in the air conditioner 1, the temperature of air that is blown into the vehicle interior. The heat pump cycle 10 includes a compressor 11, a water-refrigerant heat exchanger 12, a first expansion valve 13a, a first heat exchanger 14a, a second expansion valve 13b, a second heat exchanger 14b, an accumulator 15, and the like.

In the heat pump cycle 10, a hydrofluoroolefin (HFO) refrigerant (specifically, R1234yf) is adopted as the refrigerant. The heat pump cycle 10 constitutes a subcritical refrigeration cycle in which the refrigerant pressure on the high-pressure side does not exceed the critical pressure of the refrigerant. Refrigerant machine oil (specifically, polyalkylene glycol (PAG) oil) for lubricating the compressor 11 is mixed in the refrigerant. A part of the refrigerant machine oil circulates in the heat pump cycle 10 together with the refrigerant.

The compressor 11 sucks, compresses, and discharges the refrigerant in the heat pump cycle 10. The compressor 11 is disposed in the drive device compartment on the front side of the vehicle interior. The drive device compartment forms a space in which at least a part of a driving device for outputting a driving force for traveling (e.g., an electric motor) is disposed.

The compressor 11 is an electric compressor in which a fixed capacity type compression mechanism having a fixed discharge capacity is rotationally driven by an electric motor. The rotation speed (i.e., refrigerant discharge capacity) of the compressor 11 is controlled by a control signal output from the control device 40 to be described later.

The inlet side of the refrigerant passage of the water-refrigerant heat exchanger 12 is connected to the discharge port of the compressor 11. The water-refrigerant heat exchanger 12 has a refrigerant passage, through which the high-pressure refrigerant discharged from the compressor 11 is allowed to flow, and a heat medium passage, through which a heat medium circulating in the heat medium circuit 20 to be described later is allowed to flow. The water-refrigerant heat exchanger 12 exchanges heat between the high-pressure refrigerant flowing through the refrigerant passage and the heat medium flowing through the heat medium passage. In the water-refrigerant heat exchanger 12, the heat of the high-pressure refrigerant can be radiated to the heat medium to heat the heat medium.

The inlet side of the first expansion valve 13a is connected to the outlet of the refrigerant passage of the water-refrigerant heat exchanger 12. The first expansion valve 13a is a first decompression part that decompresses the refrigerant having flowed out of the refrigerant passage of the water-refrigerant heat exchanger 12. The first expansion valve 13a is a first flow rate regulating part that regulates the flow rate of the refrigerant allowed to flow out to the downstream side.

The first expansion valve 13a is an electric variable throttle mechanism including a valve body that changes a throttle opening and an electric actuator (specifically, a stepping motor) that displaces the valve body. The operation of the first expansion valve 13a is controlled by a control pulse output from the control device 40.

Further, the first expansion valve 13a has a full-open function that functions as a simple refrigerant passage without exerting a refrigerant decompressing action and a flow rate regulating action by fully opening the valve opening. The first expansion valve 13a has a full-close function of closing the refrigerant passage by fully closing the valve opening.

The refrigerant inlet side of the first heat exchanger 14a is connected to the outlet of the first expansion valve 13a. The first heat exchanger 14a is a first heat exchange part that exchanges heat between the refrigerant having flowed out of the first expansion valve 13a and air. The first heat exchanger 14a is disposed in a first air passage 31a formed in a casing 31 of the air conditioning unit 30 to be described later.

In the present embodiment, a so-called tank-and-tube heat exchanger is adopted as the first heat exchanger 14a. The tank-and-tube heat exchanger includes a plurality of refrigerant tubes and a pair of tanks. The refrigerant tube is a metal tube through which the refrigerant is allowed to flow. The plurality of refrigerant tubes are stacked at intervals in a predetermined direction. An air passage through which air for heat exchange with the refrigerant is allowed to flow is formed between the adjacent refrigerant tubes.

The tank is a bottomed cylindrical member made of metal and extending in the stacking direction of the plurality of refrigerant tubes. Each of the pair of tanks is connected to both ends of the plurality of refrigerant tubes. A distribution space for distributing the refrigerant to the plurality of refrigerant tubes and a collection space for collecting the refrigerant having flowed out of the plurality of refrigerant tubes are formed inside the tank.

Thereby, a heat exchange core portion for exchanging heat between the refrigerant flowing through each refrigerant tube and the air flowing through the air passage is formed. A heat exchange fin for promoting the heat exchange between the refrigerant and the air may be disposed in the air passage.

Further, in the first heat exchanger 14a, in order to reduce the temperature distribution of the air blown out from the first heat exchanger 14a, a plurality of (specifically, two) heat exchange core portions are arranged in series in the airflow direction. The first heat exchanger 14a is disposed such that the longitudinal direction of the refrigerant tube has a component extending in the vertical direction.

The inlet side of the second expansion valve 13b is connected to the refrigerant outlet of the first heat exchanger 14a. The second expansion valve 13b is a second decompression part that decompresses the refrigerant having flowed out of the refrigerant passage of the first heat exchanger 14a. The second expansion valve 13b is a second flow rate regulating part that regulates the flow rate of the refrigerant flowing out to the downstream side. The basic configuration of the second expansion valve 13b is similar to that of the first expansion valve 13a.

The refrigerant inlet side of the second heat exchanger 14b is connected to the outlet of the second expansion valve 13b. The second heat exchanger 14b is a second heat exchange part that exchanges heat between the refrigerant having flowed out of the second expansion valve 13b and air. The second heat exchanger 14b is disposed in a second air passage 31b formed in the casing 31 of the air conditioning unit 30. The basic configuration of the second heat exchanger 14b is similar to that of the first heat exchanger 14a.

The inlet side of the accumulator 15 is connected to the refrigerant outlet of the second heat exchanger 14b. The accumulator 15 is a low-pressure liquid storage that separates the refrigerant having flowed into the accumulator into gas and liquid and stores the separated liquid-phase refrigerant into the cycle as a surplus refrigerant. The suction port side of the compressor 11 is connected to the gas-phase refrigerant outlet of the accumulator 15.

Next, the heat medium circuit 20 will be described. The heat medium circuit 20 is a circuit that circulates the heat medium. A heat medium pump 21, a heater core 22, a heat medium radiator 23, the heat medium passage of the water-refrigerant heat exchanger 12, and the like are connected to the heat medium circuit 20. In the heat medium circuit 20, an ethylene glycol aqueous solution is adopted as the heat medium.

The heat medium pump 21 pumps the heat medium in the heat medium circuit 20. The heat medium pump 21 is an electric pump with its rotation speed (i.e., pumping capacity) controlled by a control voltage output from the control device 40.

The heat medium inlet side of the heater core 22 is connected to the discharge port of the heat medium pump 21. The heater core 22 exchanges heat between the heat medium pumped from the heat medium pump 21 and air blown into the vehicle interior. In the heater core 22, the heat of the heat medium can be radiated to the air to heat the heat medium.

The heater core 22 is disposed in a third air passage 31$c$ formed in the casing 31 of the air conditioning unit 30. One inflow port of a first flow rate control valve 24$a$ is connected to the heat medium outlet of the heater core 22.

Further, the heat medium circuit 20 is connected with a first bypass passage 20$a$ that guides the heat medium pumped from the heat medium pump 21 to the other inflow port side of the first flow rate control valve 24$a$ while allowing the heat medium to bypass the heater core 22. The inlet side of a heat medium passage of the water-refrigerant heat exchanger 12 is connected to the outflow port of the first flow rate control valve 24$a$.

The first flow rate control valve 24$a$ regulates the flow rate ratio between the flow rate of the heat medium allowed to flow the heater core 22 and the flow rate of the heat medium allowed to flow the first bypass passage 20$a$ among the heat medium pumped from the heat medium pump 21. The first flow rate control valve 24$a$ is an electric three-way flow rate control valve, the operation of which is controlled by a control signal output from the control device 40.

The heat medium inlet side of the heat medium radiator 23 is connected to the outlet of the heat medium passage of the water-refrigerant heat exchanger 12. The heat medium radiator 23 exchanges heat between the heat medium having flowed out of the heat medium passage of the water-refrigerant heat exchanger 12 and outside air blown by an outside air blower (not illustrated). In the heat medium radiator 23, the heat of the heat medium can be radiated to the outside air to cool the heat medium.

The heat medium radiator 23 is disposed on the front side in the drive device compartment. Therefore, at the time of traveling of the vehicle, a traveling air having flowed into the drive device compartment via a grill can be blown onto the heat medium radiator 23. One inflow port of the second flow rate control valve 24$b$ is connected to the heat medium outlet of the heat medium radiator 23.

Further, the heat medium circuit 20 is connected with a second bypass passage 20$b$ that guides the heat medium having flowed out of the heat medium passage of the water-refrigerant heat exchanger 12 to the other inflow port side of the second flow rate control valve 24$b$ while allowing the refrigerant to bypass the heat medium radiator 23. The suction port side of the heat medium pump 21 is connected to an outflow port of the second flow rate control valve 24$b$.

The second flow rate control valve 24$b$ regulates the flow rate ratio between the flow rate of the heat medium allowed to flow the heat medium radiator 23 and the flow rate of the heat medium allowed to flow the second bypass passage 20$b$ among the heat media having flowed out of the heat medium passage of the water-refrigerant heat exchanger 12. The basic configuration of the second flow rate control valve 24$b$ is similar to that of the first flow rate control valve 24$a$.

Therefore, in the heat medium circuit 20 of the present embodiment, the heat medium can be heated in the water-refrigerant heat exchanger 12 by using the high-pressure refrigerant as a heat source. Further, the heater core 22 can heat the air blown into the vehicle interior by using the heat medium as a heat source. That is, the water-refrigerant heat exchanger 12 and the heater core 22 of the present embodiment constitute a heating part that heats air by using the high-pressure refrigerant as a heat source. The first expansion valve 13$a$ decompresses the refrigerant on the downstream side of the heating part.

Next, the air conditioning unit 30 will be described with reference to FIG. 2. The air conditioning unit 30 is a unit in which a plurality of constituent devices are integrated in order to blow air having an appropriately regulated temperature to an appropriate position in the vehicle interior in the air conditioner 1.

The air conditioning unit 30 includes a casing 31. The casing 31 forms the outer shell of the air conditioning unit and forms an air passage therein. The casing 31 is made of resin (specifically, polypropylene) having a certain degree of elasticity and excellent strength.

The first air passage 31$a$, the second air passage 31$b$, the third air passage 31$c$, and a fourth air passage 31$d$ are formed inside the casing 31. The air passages formed in the casing 31 are at least partially disposed adjacent to each other.

A part of a portion of the casing 31 forming the third air passage 31$c$ and a part of a portion of the casing 31 forming the fourth air passage 31$d$ are disposed in a vehicle interior R1. Further, in the air conditioning unit 30, a portion forming the first air passage 31$a$ of the casing 31, a portion forming the second air passage 31$b$ of the casing 31, and the other portion are disposed in a drive device compartment R2.

The vehicle interior R1 and drive device compartment R2 are partitioned by a partition wall 38. The partition wall 38 corresponds to a partition wall member for soundproofing and fireproofing, which is called a dash panel or a firewall, in a normal engine vehicle that obtains a driving force for vehicle traveling from an internal combustion (engine).

The first heat exchanger 14$a$ is disposed in the first air passage 31$a$. Hence the first air passage 31$a$ is an air passage through which the air flowing into the first heat exchanger 14$a$ and the air having passed through the first heat exchanger 14$a$ are allowed to flow.

A first inlet-side inside/outside air switch device 32$a$, which is a first inlet-side inside/outside air switching part, is disposed on the airflow most upstream side of the first air passage 31$a$. The first inlet-side inside/outside air switch device 32$a$ switches, as air allowed to flow into the first heat exchanger 14$a$, between a ventilation path that guides inside air, which is air inside the vehicle interior, to the inlet side of the first heat exchanger 14$a$ and a ventilation path that guides outside air, which is air outside the vehicle interior, to the inlet side of the first heat exchanger 14$a$.

The first inlet-side inside/outside air switch device 32$a$ includes a first inlet-side outside air door 321$a$ and a first inlet-side inside air door 322$a$.

The first inlet-side outside air door 321a opens and closes a first outside air introduction port 323a. The first outside air introduction port 323a is an introduction port for introducing outside air into the first air passage 31a. The first outside air introduction port 323a is formed in a portion on the airflow upstream side of the first heat exchanger 14a in a portion forming the first air passage 31a of the casing 31.

The first inlet-side inside air door 322a opens and closes a first inside air introduction port 35a. The first inside air introduction port 35a allows the first air passage 31a and the fourth air passage 31d to communicate with each other. The first inside air introduction port 35a is an introduction port for introducing inside air into the first air passage 31a via a fourth air passage 31d. The first inside air introduction port 35a is formed in a portion on the airflow upstream side of the first heat exchanger 14a in the portion forming the first air passage 31a of the casing 31.

The first inlet-side outside air door 321a and the first inlet-side inside air door 322a are coupled to a first inlet-side electric actuator (not illustrated) via a link mechanism or the like. The first inlet-side outside air door 321a and the first inlet-side inside air door 322a are driven in conjunction with each other by the first inlet-side electric actuator.

The first inlet-side electric actuator can continuously regulate the opening of each of the first outside air introduction port 323a and the first inside air introduction port 35a. For example, the first inlet-side electric actuator can increase the opening of the first inside air introduction port 35a as the first inlet-side electric actuator decreases the opening of the first outside air introduction port 323a. The operation of the first inlet-side electric actuator is controlled by a control signal output from the control device 40.

A first outlet-side inside/outside air switch device 33a, which is a first outlet-side inside/outside air switching part, is disposed on the most downstream side of the first air passage 31a in the airflow direction. The first outlet-side inside/outside air switch device 33a switches between a ventilation path that guides the air having passed through the first heat exchanger 14a to the vehicle interior via the third air passage 31c and a ventilation path that guides the air having passed through the first heat exchanger 14a to the vehicle exterior.

The first outlet-side inside/outside air switch device 33a includes a first outlet-side exterior door 331a and a first outlet-side interior door 332a.

The first outlet-side exterior door 331a opens and closes a first exterior outflow port 333a. The first exterior outflow port 333a is an outflow port through which air is allowed to flow out from the first air passage 31a to the outside of the vehicle interior. The first outside air introduction port 323a is formed in a portion on the airflow downstream side of the first heat exchanger 14a in the portion forming the first air passage 31a of the casing 31.

The first outlet-side interior door 332a opens and closes a first interior outflow port 35b. The first interior outflow port 35b allows the first air passage 31a and the third air passage 31c to communicate with each other. The first interior outflow port 35b is an outflow port through which air is allowed to flow out from the first air passage 31a to the interior side via the third air passage 31c. The first interior outflow port 35b is formed in a portion on the airflow downstream side of the first heat exchanger 14a in the portion forming the first air passage 31a of the casing 31.

The first outlet-side exterior door 331a and the first outlet-side interior door 332a are coupled to a first outlet-side electric actuator (not illustrated) via a link mechanism or the like. The first outlet-side exterior door 331a and the first outlet-side interior door 332a are driven in conjunction with each other by the first outlet-side electric actuator.

The first outlet-side electric actuator can continuously regulate the opening of each of the first exterior outflow port 333a and the first interior outflow port 35b. For example, the first outlet-side electric actuator can increase the opening of the first exterior outflow port 333a as the first outlet-side electric actuator decreases the opening of the first interior outflow port 35b. The operation of the first outlet-side electric actuator is controlled by a control signal output from the control device 40.

The second heat exchanger 14b is disposed in the second air passage 31b. Therefore, the second air passage 31b is an air passage through which the air flowing into the second heat exchanger 14b and the air having passed through the second heat exchanger 14b are allowed to flow.

A second inlet-side inside/outside air switch device 32b, which is a second inlet-side inside/outside air switching part, is disposed on the airflow most upstream side of the second air passage 31b. The second inlet-side inside/outside air switch device 32b switches between a ventilation path that guides inside air to the upstream side of the second heat exchanger 14b and a ventilation path that guides outside air to the upstream side of the second heat exchanger 14b, as air allowed to flow into the second heat exchanger 14b.

The second inlet-side inside/outside air switch device 32b includes a second inlet-side outside air door 321b and a second inlet-side inside air door 322b.

The second inlet-side outside air door 321b opens and closes a second outside air introduction port 323b. The second outside air introduction port 323b is an introduction port for introducing outside air into the second air passage 31b. The second outside air introduction port 323b is formed in a portion on the airflow upstream side of the second heat exchanger 14b in the portion forming the second air passage 31b of the casing 31.

The second inlet-side inside air door 322b opens and closes a second inside air introduction port 35c. The second inside air introduction port 35c allows the second air passage 31b and the fourth air passage 31d to communicate with each other. The second inside air introduction port 35c is an introduction port for introducing inside air into the second air passage 31b via the fourth air passage 31d. The second inside air introduction port 35c is formed in a portion on the airflow upstream side of the second heat exchanger 14b in the portion forming the second air passage 31b of the casing 31.

The second inlet-side outside air door 321b and the second inlet-side inside air door 322b are coupled to a second inlet-side electric actuator (not illustrated) via a link mechanism or the like. The second inlet-side outside air door 321b and the second inlet-side inside air door 322b are driven in conjunction with each other by the second inlet-side electric actuator.

The second inlet-side electric actuator can continuously regulate the opening of each of the second outside air introduction port 323b and the second inside air introduction port 35c. For example, the second inlet-side electric actuator can increase the opening of the second inside air introduction port 35c as the opening of the second outside air introduction port 323b is decreased. The operation of the second inlet-side electric actuator is controlled by a control signal output from the control device 40.

A second outlet-side inside/outside air switch device 33b, which is the second outlet-side inside/outside air switching part, is disposed on the airflow most downstream side of the second air passage 31b. The second outlet-side inside/ outside air switch device 33b switches between a ventilation path that guides the air having passed through the second heat exchanger 14b to the vehicle interior via the third air passage 31c and a ventilation path that guides the air having passed through the second heat exchanger 14b to the vehicle exterior.

The second outlet-side inside/outside air switch device 33b includes a second outlet-side exterior door 331b and a second outlet-side interior door 332b.

The second outlet-side exterior door 331b opens and closes a second exterior outflow port 333b. The second exterior outflow port 333b is an outflow port through which air is allowed to flow out from the second air passage 31b out of the room. The second exterior outflow port 333b is formed in a portion on the airflow downstream side of the second heat exchanger 14b in the portion forming the second air passage 31b of the casing 31.

The second outlet-side interior door 332b opens and closes a second interior outflow port 35d. The second interior outflow port 35d allows the second air passage 31b and the third air passage 31c to communicate with each other. The second interior outflow port 35d is an outlet through which air is allowed to flow out from the second air passage 31b to the interior side via the third air passage 31c. The second interior outflow port 35d is formed in a portion on the airflow downstream side of the second heat exchanger 14b in the portion forming the second air passage 31b of the casing 31.

The second outlet-side exterior door 331b and the second outlet-side interior door 332b are coupled to a second outlet-side electric actuator (not illustrated) via a link mechanism or the like. The second outlet-side exterior door 331b and the second outlet-side interior door 332b are driven in conjunction with each other by the second outlet-side electric actuator.

The second outlet-side electric actuator can continuously regulate the opening of each of the second exterior outflow port 333b and the second interior outflow port 35d. For example, the second outlet-side electric actuator can increase the opening of the second interior outflow port 35d as the second outlet-side electric actuator decreases the opening of the second exterior outflow port 333b. The operation of the second outlet-side electric actuator is controlled by a control signal output from the control device 40.

A blower 36 for emission is disposed on the downstream side of the first exterior outflow port 333a of the first air passage 31a and the second exterior outflow port 333b of the second air passage 31b. The blower 36 is an electric blower that sucks the air having flowed out of each of the first exterior outflow port 333a and the second exterior outflow port 333b and releases the air out of the vehicle interior. The rotation speed (i.e., blowing capacity) of the blower 36 is controlled by a control voltage output from the control device 40.

The heater core 22 is disposed in the third air passage 31c. Hence the third air passage 31c is an air passage through which the air flowing into the heater core 22 and the air having passed through the heater core 22 are allowed to flow.

An outside air introduction device 32c, which is an outside air introduction part, is disposed on the airflow most upstream side of the third air passage 31c. The outside air introduction device 32c allows outside air to flow into the third air passage 31c. More specifically, outside air introduction device 32c guides outside air allowed to bypass the first heat exchanger 14a and the second heat exchanger 14b to the inlet side of the heater core 22 constituting the heating part.

The outside air introduction device 32c includes an outside air introduction door 321c. The outside air introduction door 321c opens and closes a third outside air introduction port 323c. The third outside air introduction port 323c is an introduction port for introducing outside air into the third air passage 31c. The third outside air introduction port 323c is formed in a portion on the airflow upstream side of the heater core 22 in the portion forming the third air passage 31c of the casing 31.

The first interior outflow port 35b that allows the first air passage 31a and the third air passage 31c to communicate with each other is formed in a portion on the airflow upstream side of the heater core 22 in the portion forming the third air passage 31c of the casing 31. The second interior outflow port 35d that allows the second air passage 31b and the third air passage 31c to communicate with each other is formed in a portion on the airflow upstream side of the heater core 22 in the portion forming the third air passage 31c of the casing 31.

Therefore, the heater core 22 is disposed to be able to heat the air having flowed into the third air passage 31c from the outside air introduction part. The heater core 22 is disposed to be able to heat the air having passed through the first heat exchanger 14a and having flowed into the third air passage 31c from the first interior outflow port 35b. The heater core 22 is disposed to be able to heat the air having passed through the second heat exchanger 14b and having flowed into the third air passage 31c from the second interior outflow port 35d.

An indoor blower 37 is disposed on the airflow downstream side of the third outside air introduction port 323c, the first interior outflow port 35b, and the second interior outflow port 35d and on the airflow upstream side of the heater core 22 in the third air passage 31c. The indoor blower 37 is an electric blower that sucks the air having flowed into the third air passage 31c and blows the air toward the vehicle interior. The rotation speed (i.e., blowing capacity) of the indoor blower 37 is controlled by a control voltage output from the control device 40.

In the present embodiment, a centrifugal blower including a turbofan is adopted as the indoor blower 37. As in the present embodiment, in the air conditioning unit in which the ventilation path is formed by connecting the plurality of air passages via the introduction port or the like, the pressure loss generated when the air flows through the ventilation path is likely to increase. In contrast, the centrifugal blower including the turbofan is effective in that a pressure ratio tends to be high and the air is easily blown into the vehicle interior.

Further, a plurality of opening holes (not illustrated) for blowing out the air having passed through the heater core 22 into the vehicle interior are formed in a portion forming the most downstream portion of the third air passage 31c of the casing 31.

As the opening hole, a face opening hole, a foot opening hole, and a defroster opening hole are provided. The face opening hole is an opening hole for blowing out air toward the upper body of an occupant in the vehicle interior. The foot opening hole is an opening hole for blowing air toward the feet of the occupant. The defroster opening hole is an opening hole through which air is blown toward the inside surface of the front window glass of the vehicle.

A blowing mode switching door (not illustrated) is disposed on the upstream side of these opening holes. The blowing mode switching door opens and closes each opening hole to switch the opening hole through which the conditioned air is blown. The blowing mode switching door is driven by an electric actuator for driving the blowing mode switching door. The operation of the electric actuator for driving the blowing mode switching door is controlled by a control signal output from the control device 40.

The fourth air passage 31d is an air passage into which inside air is introduced and through which the inside air is allowed to flow. A heating part inlet-side switch device 34a and a heating part outlet-side switch device 34b are disposed at a portion partitioning the third air passage 31c and the fourth air passage 31d of the casing 31.

The heating part inlet-side switch device 34a is a heating part inlet-side switching part that switches between a ventilation path that guides inside air toward the first inside air introduction port 35a and the second inside air introduction port 35c and a ventilation path that directly sucks inside air into the indoor blower 37. More specifically, the heating part inlet-side switch device 34a allows the inside air flowing through the fourth air passage 31d to bypass the first air passage 31a and the second air passage 31b and suck the inside air into the indoor blower 37.

The heating part inlet-side switch device 34a includes a heating part inlet side door 341a. The heating part inlet side door 341a opens and closes a heating part inlet-side opening portion 35e. The heating part inlet-side opening portion 35e allows the third air passage 31c and the fourth air passage 31d to communicate with each other. The heating part inlet-side opening portion 35e is formed in a portion on the airflow upstream side of the suction port of the indoor blower 37 in the portion forming the third air passage 31c of the casing 31.

The heating part inlet side door 341a is coupled to a heating part inlet-side electric actuator (not illustrated). The heating part inlet side door 341a is driven by a heating part inlet-side electric actuator. The operation of the heating part inlet-side electric actuator is controlled by a control signal output from the control device 40.

The heating part outlet-side switch device 34b is a heating part outlet-side switching part that switches between a ventilation path that guides the air heated in the heater core 22 constituting the heating part to the vehicle interior and a ventilation path that directly guides the air heated in the heater core 22 to the fourth air passage 31d. More specifically, the heating part outlet-side switch device 34b can return the air heated in the heater core 22 to the first inside air introduction port 35a and the second inside air introduction port 35c side while allowing the air to bypass the vehicle interior.

The heating part outlet-side switch device 34b includes a heating part outlet side door 341b. The heating part outlet side door 341b opens and closes a heating part outlet-side opening portion 35f. The heating part outlet-side opening portion 35f allows the third air passage 31c and the fourth air passage 31d to communicate with each other. The heating part outlet-side opening portion 35f is formed in a portion on the airflow downstream side of the heater core 22 in the portion forming the third air passage 31c of the casing 31.

The heating part outlet side door 341b is coupled to a heating part outlet-side electric actuator (not illustrated). The heating part outlet side door 341b is driven by the heating part outlet-side electric actuator. The operation of the heating part outlet-side electric actuator is controlled by a control signal output from the control device 40.

The first inside air introduction port 35a that allows the fourth air passage 31d and the first air passage 31a to communicate with each other is formed in a portion of the fourth air passage 31d on the airflow downstream side of the heating part inlet-side opening portion 35e in the portion forming the fourth air passage 31d of the casing 31.

The second inside air introduction port 35c that allows the fourth air passage 31d and the second air passage 31b to communicate with each other is formed in a portion of the fourth air passage 31d on the inside airflow downstream side of the heating part inlet-side opening portion 35e in the portion forming the fourth air passage 31d of the casing 31.

Figure 2:
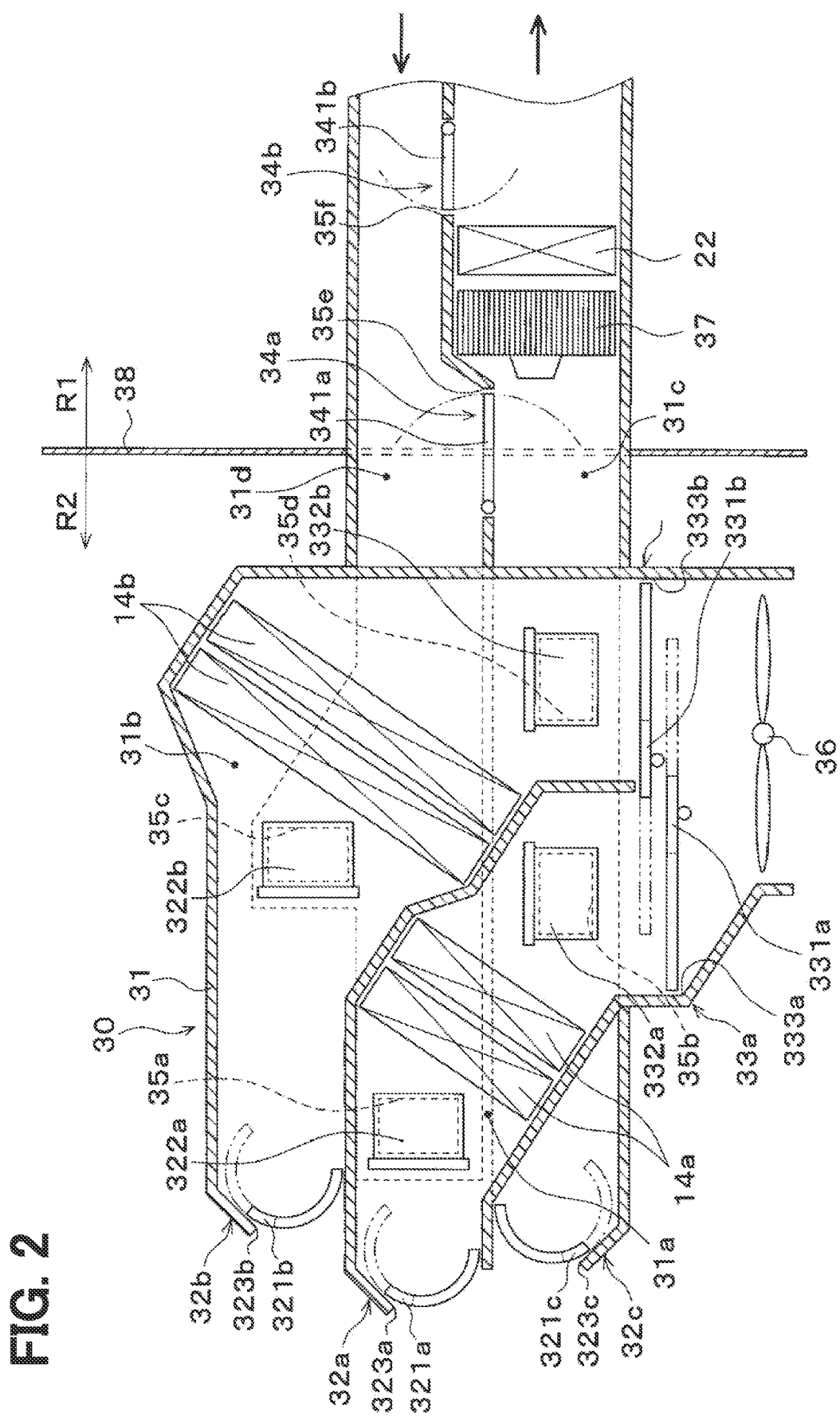
FIG. 2 is a schematic sectional view of an air conditioning unit of the first embodiment.

For clarity of description, FIG. 2 illustrates a state in which the respective doors of the switch devices 32a to 32c, 33a, 33b, 34a, 34b close the respective outside air introduction ports, inside air introduction ports, exterior outflow ports, interior outflow ports, and openings.

Next, an outline of an electric controller of the air conditioner 1 will be described with reference to FIG. 3. The control device 40 has a microcomputer including a central processing unit (CPU), a read-only memory (ROM), a random access memory (RAM,) and the like, and peripheral circuits thereof. The control device 40 performs various calculations and processing based on an air-conditioning control program stored in the ROM and controls the operations of various control target devices 11, 13a, 13b, 21, 24a, 24b, 32a, 32b, 32c, 33a, 33b, 34a, 34b, 36, 37 connected to the output side.

Figure 3:
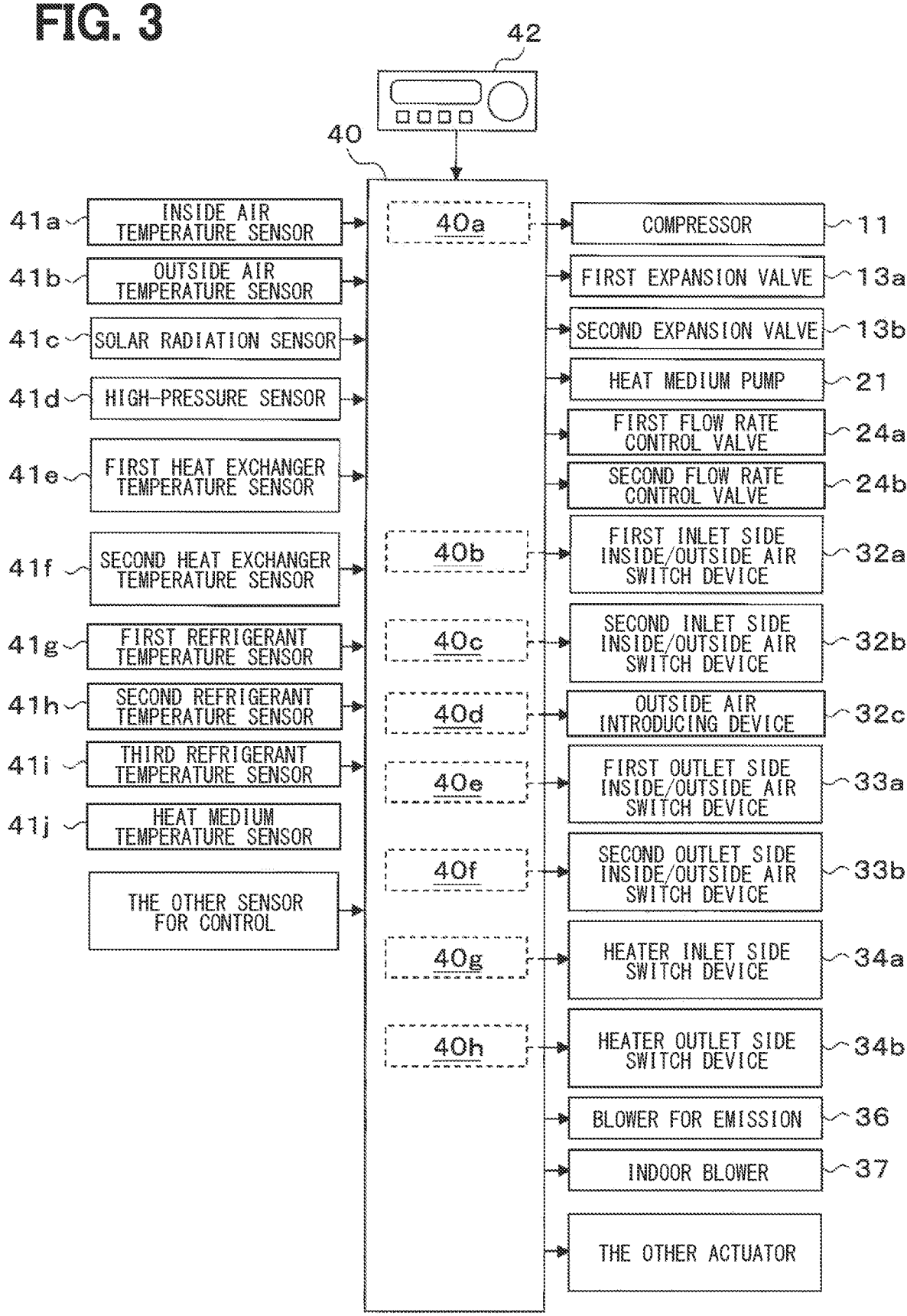
FIG. 3 is a block diagram illustrating an electric controller of the air conditioner of the first embodiment.

As illustrated in FIG. 3, various controlling sensors are connected to the input side of the control device 40. The controlling sensors include an inside air temperature sensor 41a, an outside air temperature sensor 41b, a solar radiation sensor 41c, and the like. Further, the controlling sensors include a high-pressure sensor 41d, a first heat exchanger temperature sensor 41e, a second heat exchanger temperature sensor 41f, a first refrigerant temperature sensor 41g, a second refrigerant temperature sensor 41h, a third refrigerant temperature sensor 41i, a heat medium temperature sensor 41j, and the like.

The inside air temperature sensor 41a is an inside air temperature detector for detecting an inside air temperature Tr that is a temperature inside the vehicle interior. The outside air temperature sensor 41b is an outside air temperature detector for detecting an outside air temperature Tam that is a temperature outside the vehicle interior. The solar radiation sensor 41c is an insolation amount detector for detecting an insolation amount As with which the vehicle interior is irradiated. The high-pressure sensor 41d is a high-pressure detector for detecting high pressure Pd of the high-pressure refrigerant discharged from the compressor 11.

The first heat exchanger temperature sensor 41e is a first heat exchanger temperature detector for detecting a refrigerant evaporation temperature (i.e., the temperature of the first heat exchanger 14a) in the first heat exchanger 14a. The second heat exchanger temperature sensor 41f is a second heat exchanger temperature detector for detecting a refrigerant evaporation temperature (i.e., the temperature of the second heat exchanger 14b) in the second heat exchanger 14b.

The first refrigerant temperature sensor 41g is a first refrigerant temperature detector for detecting a first refrigerant temperature T1 that is a temperature of a refrigerant having flowed out of the refrigerant passage of the water-refrigerant heat exchanger 12. The second refrigerant temperature sensor 41h is a second refrigerant temperature detector for detecting a second refrigerant temperature T2 that is a temperature of a refrigerant having flowed out of the first heat exchanger 14a. The third refrigerant temperature sensor 41*i* is a third refrigerant temperature detector for detecting a third refrigerant temperature T3 that is a temperature of a refrigerant having flowed out of the second heat exchanger 14*b*.

The heat medium temperature sensor 41*j* is a heat medium temperature detector for detecting a heat medium temperature Tw that is a temperature of a heat medium flowing into the heater core 22.

An operation panel 42 disposed in the vicinity of an instrument panel in the front of the vehicle interior is connected to the input side of the control device 40. Operation signals from various operation switches provided on the operation panel 42 are input to the control device 40. Specific examples of the various operation switches provided on the operation panel 42 include an automatic switch, an air conditioner switch, an air volume setting switch, and a temperature setting switch.

The automatic switch is an operation switch for setting or canceling the automatic control operation of the heat pump cycle 10. The air conditioner switch is an operation switch for requesting the first heat exchanger 14*a* or the second heat exchanger 14*b* to cool air. The air volume setting switch is an operation switch for manually setting the air volume of the indoor blower 37. The temperature setting switch is an operation switch for setting a target temperature Tset in the vehicle interior.

The control device 40 of the present embodiment is integrally configured with a controller that controls various control target devices connected to an output side thereof. Therefore, a configuration (i.e., hardware and software) for controlling the operation of each control target device constitutes the control part that controls the operation of each control target device.

For example, in the control device 40, the configuration for controlling the operation of compressor 11 of the heat pump cycle 10 is a compressor controller 40*a*.

The configuration for controlling the operation of the first inlet-side inside/outside air switch device 32*a* is a first inlet-side inside/outside air switching controller 40*b*. The configuration for controlling the operation of the second inlet-side inside/outside air switch device 32*b* is a second inlet-side inside/outside air switching controller 40*c*. The configuration for controlling the operation of the outside air introduction device 32*c* is an outside air introduction controller 40*d*.

The configuration for controlling the operation of the first outlet-side inside/outside air switch device 33*a* is a first outlet-side inside/outside air switching controller 40*e*. The configuration for controlling the operation of the second outlet-side inside/outside air switch device 33*b* is a second outlet-side inside/outside air switching controller 40*f*. The configuration for controlling the operation of the heating part inlet-side switch device 34*a* is a heating part inlet-side switching controller 40*g*. The configuration for controlling the operation of the heating part outlet-side switch device 34*b* is a heating part outlet side switching controller 40*h*.

Next, the operation of the air conditioner 1 of the present embodiment having the above configuration will be described. The air conditioner 1 can switch operation modes, such as a cooling mode, a heating mode, a dehumidifying heating mode, and a defrosting mode, in order to perform the air conditioning in the vehicle interior.

The cooling mode is an operation mode for blowing cooled air into the vehicle interior. The heating mode is an operation mode for blowing heated air into the vehicle interior. The dehumidifying heating mode is an operation mode for reheating cooled and dehumidified air and blowing the air into the vehicle interior. The defrosting mode is an operation mode for removing frost on the heat exchanger in which frosting has occurred.

The operation mode is switched by executing an air-conditioning control program stored in advance in the control device 40. The air-conditioning control program is executed when an automatic switch of the operation panel 42 is turned on. In the air-conditioning control program, an operation mode is switched based on detection signals of various controlling sensors and an operation signal of an operation panel. The operation of each operation mode will be described below.

(a) Cooling Mode

The cooling mode is an operation mode mainly executed when the outside air temperature Tam is relatively high (20° C. or higher in the present embodiment). In the air conditioner 1 of the present embodiment, an inside-air cooling mode, an outside-air cooling mode, and a composite cooling mode can be switched as the cooling mode.

(a-1) Inside-Air Cooling Mode

In the inside-air cooling mode, the control device 40 operates the compressor 11 of the heat pump cycle 10. More specifically, the control device 40 controls the refrigerant discharge capacity of the compressor 11 such that a second heat exchanger temperature Tefin2 detected by the second heat exchanger temperature sensor 41*f* approaches a target evaporator temperature TEO.

The target evaporator temperature TEO is determined based on a target blowing temperature TAO of the air blown into the vehicle interior with reference to a control map for the cooling mode stored in advance in the control device 40. The target blowing temperature TAO is calculated using the detection signals of various controlling sensors and the operation signal of the operation panel.

In the control map of the present embodiment, the target evaporator temperature TEO is determined so as to increase with an increase in the target blowing temperature TAO. The target evaporator temperature TEO is determined to be a value (at least 1° C. or higher in the present embodiment) at which frosting on the second heat exchanger 14*b* can be restricted.

The control device 40 brings the first expansion valve 13*a* into a fully open state. The control device 40 brings the second expansion valve 13*b* into a throttling state where a refrigerant decompressing action is exerted. More specifically, the control device 40 controls the operation of the second expansion valve 13*b* such that a supercooling degree SC2 of the refrigerant flowing into the second expansion valve 13*b* approaches a target supercooling degree SCO2.

The target supercooling degree SCO2 is determined based on the second refrigerant temperature T2 detected by the second refrigerant temperature sensor 41*h* with reference to the control map for the cooling mode stored in advance in the control device 40. In the control map of the present embodiment, the target supercooling degree SCO2 is determined such that the coefficient of performance (i.e., COP) of the cycle approaches the maximum value.

The control device 40 operates the heat medium pump 21 of the heat medium circuit 20 so as to exhibit a predetermined reference pumping capacity.

The control device 40 controls the operation of the first flow rate control valve 24*a* such that the total flow rate of the heat medium discharged from the heat medium pump 21 flows into the heat medium passage of the water-refrigerant heat exchanger 12. The control device 40 controls the operation of the second flow rate control valve 24*b* such that the total flow rate of the heat medium having flowed out of the heat medium passage of the water-refrigerant heat exchanger 12 flows into the heat medium radiator 23.

The control device 40 controls the operation of the first inlet-side inside/outside air switch device 32a so as to open the first outside air introduction port 323a of the air conditioning unit 30 and close the first inside air introduction port 35a. That is, the first inlet-side inside/outside air switch device 32a makes a switch to a ventilation path that guides outside air to the first heat exchanger 14a.

The control device 40 controls the operation of the first outlet-side inside/outside air switch device 33a so as to open the first exterior outflow port 333a and close the first interior outflow port 35b. That is, the first outlet-side inside/outside air switch device 33a makes a switch to a ventilation path that guides the air having passed through the first heat exchanger 14a out of the vehicle interior.

The control device 40 controls the operation of the second inlet-side inside/outside air switch device 32b so as to close the second outside air introduction port 323b and open the second inside air introduction port 35c. That is, the second inlet-side inside/outside air switch device 32b makes a switch to a ventilation path that guides the inside air to the second heat exchanger 14b.

The control device 40 controls the operation of the second outlet-side inside/outside air switch device 33b so as to close the second exterior outflow port 333b and open the second interior outflow port 35d. That is, the second outlet-side inside/outside air switch device 33b makes a switch to a ventilation path that guides the air having passed through the second heat exchanger 14b into the vehicle interior.

The control device 40 controls the operation of the outside air introduction device 32c so as to close the third outside air introduction port 323c. The control device 40 controls the operation of the heating part inlet-side switch device 34a so as to close the heating part inlet-side opening portion 35e. The control device 40 controls the operation of the heating part outlet-side switch device 34b so as to close the heating part outlet-side opening portion 35f.

The control device 40 operates the blower 36 so as to exhibit a predetermined reference blowing capacity. The control device 40 operates the indoor blower 37 so as to exhibit a target blowing capacity.

The target blowing capacity of the indoor blower 37 is determined based on the target blowing temperature TAO with reference to a control map stored in advance in the control device 40. In the control map of the present embodiment, the blowing capacity of the indoor blower 37 is maximized in an extremely low temperature range (maximum cooling range) and an extremely high temperature range (maximum heating range) of the target blowing temperature TAO.

Further, the blowing capacity is decreased in accordance with the increase in the target blowing temperature TAO as the target blowing temperature TAO increases from the extremely low temperature range toward an intermediate temperature range, and the blowing capacity is decreased in accordance with the decrease in the target blowing temperature TAO as the target blowing temperature TAO decreases from the extremely high temperature range toward the intermediate temperature range. When the target blowing temperature TAO falls within a predetermined intermediate temperature range, the blowing capacity is minimized.

Thus, in the heat pump cycle 10 in the inside-air cooling mode, the high-pressure refrigerant discharged from the compressor 11 flows into the refrigerant passage of the water-refrigerant heat exchanger 12. The refrigerant having flowed into the refrigerant passage of the water-refrigerant heat exchanger 12 exchanges heat with the heat medium flowing through the heat medium passage. In the water-refrigerant heat exchanger 12, the refrigerant radiates heat to the heat medium and condenses. Thereby, the heat medium is heated.

The refrigerant having flowed out of the refrigerant passage of the water-refrigerant heat exchanger 12 flows into the first heat exchanger 14a via the fully open first expansion valve 13a.

The refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the refrigerant radiates heat to the air and further condenses. Thereby, the air flowing through the first air passage 31a is heated.

The refrigerant having flowed out of the first heat exchanger 14a flows into the second expansion valve 13b and is decompressed. The low-pressure refrigerant decompressed in the second expansion valve 13b flows into the second heat exchanger 14b.

The refrigerant having flowed into the second heat exchanger 14b exchanges heat with air (specifically, inside air) having flowed into the second air passage 31b from the second inside air introduction port 35c of the air conditioning unit 30. In the second heat exchanger 14b, the refrigerant absorbs heat from the air and evaporates. Accordingly, the air flowing through the second air passage 31b is cooled.

The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

In the heat medium circuit 20 in the inside-air cooling mode, the total flow rate of the heat medium pumped from the heat medium pump 21 flows into the heat medium passage of the water-refrigerant heat exchanger 12. The heat medium having flowed into the heat medium passage of the water-refrigerant heat exchanger 12 exchanges heat with the refrigerant flowing through the refrigerant passage. In the water-refrigerant heat exchanger 12, the heat medium is heated.

The total flow rate of the heat medium having flowed out of the water-refrigerant heat exchanger 12 flows into the heat medium radiator 23. The heat medium having flowed into the heat medium radiator 23 exchanges heat with the outside air. In the heat medium radiator 23, the heat medium radiates heat to the outside air and is cooled. The heat medium having flowed out of the heat medium radiator 23 is sucked into the heat medium pump 21 and pumped again.

Figure 4:
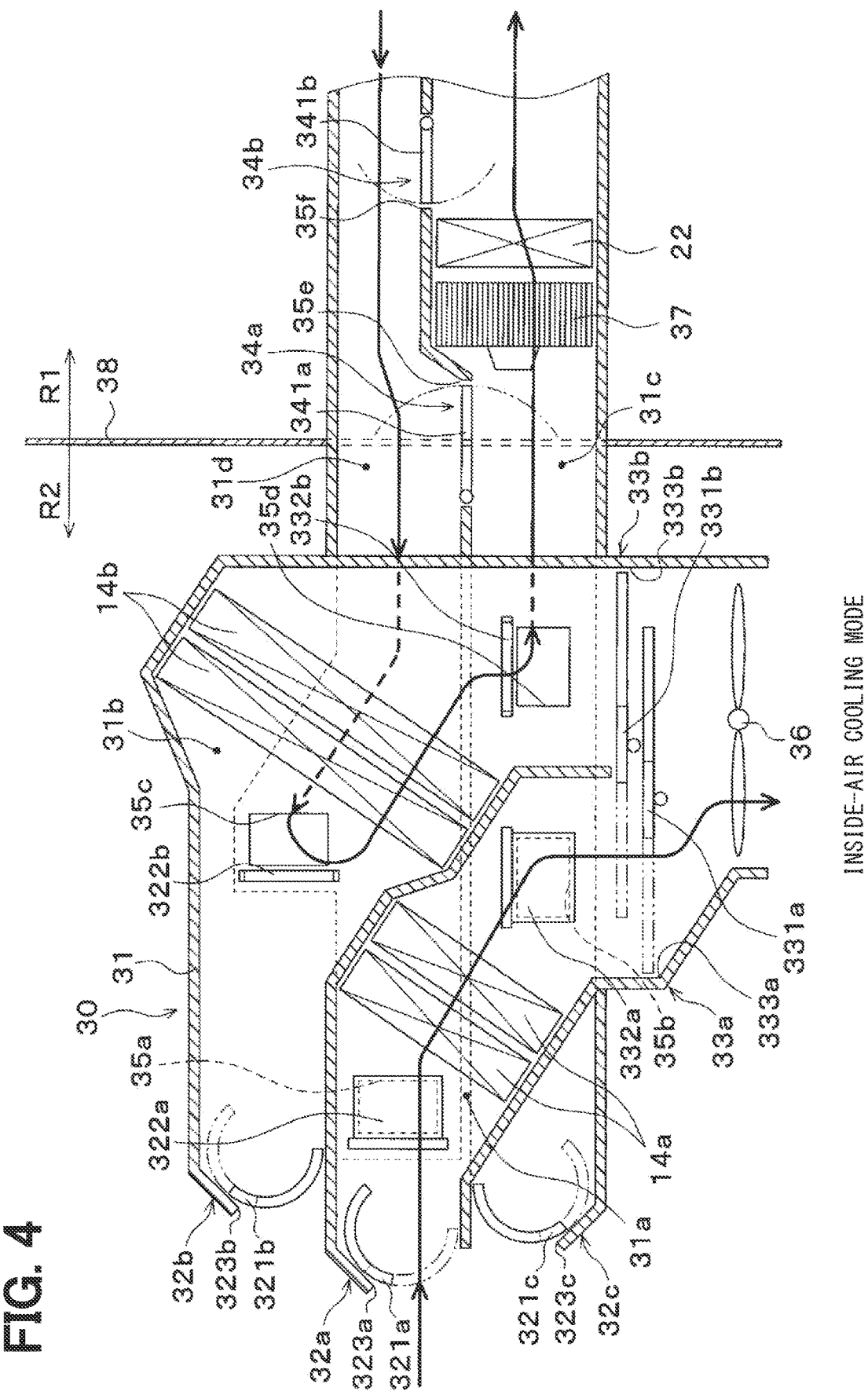
FIG. 4 is a schematic sectional view illustrating an airflow in an inside-air cooling mode of the air conditioning unit of the first embodiment.

In the air conditioning unit 30 in the inside-air cooling mode, air flows through each air passage as indicated by a thick arrow in FIG. 4.

Air (specifically, outside air) flows into the first air passage 31a via the first outside air introduction port 323a. The air having flowed into the first air passage 31a exchanges heat with the refrigerant and is heated in the first heat exchanger 14a. The air heated in the first heat exchanger 14a flows out of the first exterior outflow port 333a. The air having flowed out of the first exterior outflow port 333a is sucked into the blower 36 and released out of the vehicle interior.

Air (specifically, inside air) having flowed through the fourth air passage 31d flows into the second air passage 31b via the second inside air introduction port 35c. The air having flowed into the second air passage 31b exchanges heat with the refrigerant in the second heat exchanger 14*b* and is cooled. The air cooled in the second heat exchanger 14*b* flows into the third air passage 31*c* via the second interior outflow port 35*d*.

The air having flowed into the third air passage 31*c* is sucked into the indoor blower 37 and blown to the heater core 22. In the inside-air cooling mode, the heat medium does not flow through the heater core 22. Thus, the air having flowed into the heater core 22 is blown into the vehicle interior without being heated by the heat medium. This achieves cooling in the vehicle interior.

In the inside-air cooling mode, the inside air is circulated and blown to be cooled in the second heat exchanger 14*b*. Thus, by making a switch to the inside-air cooling mode immediately after the start of cooling, the vehicle interior can be expected to be cooled rapidly.

(a-2) Outside-Air Cooling Mode

In the outside-air cooling mode, as in the inside-air cooling mode, the control device 40 controls the operations of the compressor 11, the first expansion valve 13*a*, and the second expansion valve 13*b* of the heat pump cycle 10. As in the inside-air cooling mode, the control device 40 controls the operations of the heat medium pump 21, the first flow rate control valve 24*a*, and the second flow rate control valve 24*b* of the heat medium circuit 20.

As in the inside-air cooling mode, the control device 40 controls the operations of the first inlet-side inside/outside air switch device 32*a* and the first outlet-side inside/outside air switch device 33*a* of the air conditioning unit 30.

The control device 40 controls the operation of the second inlet-side inside/outside air switch device 32*b* so as to open the second outside air introduction port 323*b* and close the second inside air introduction port 35*c*. That is, the second inlet-side inside/outside air switch device 32*b* makes a switch to a ventilation path that guides outside air to the second heat exchanger 14*b*. As in the inside-air cooling mode, the control device 40 controls the operation of the second outlet-side inside/outside air switch device 33*b*.

As in the inside-air cooling mode, the control device 40 controls the operations of the outside air introduction device 32*c*, the heating part inlet-side switch device 34*a*, and the heating part outlet-side switch device 34*b*. As in the inside-air cooling mode, the control device 40 controls the operations of the blower 36 and the indoor blower 37.

Therefore, the heat pump cycle 10 and the heat medium circuit 20 in the outside-air cooling mode operate as in the inside-air cooling mode.

Figure 5:
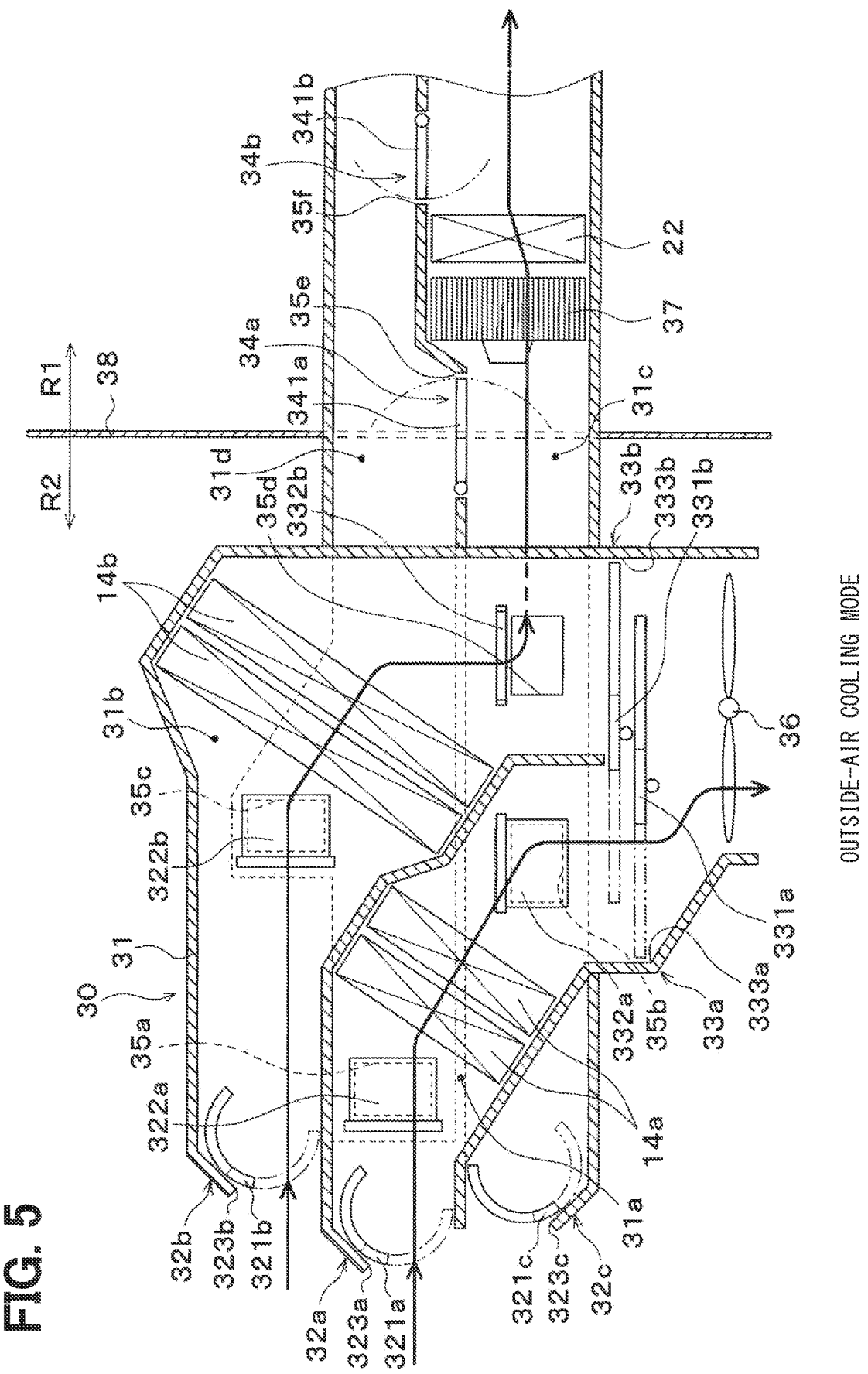
FIG. 5 is a schematic sectional view illustrating an airflow in an outside-air cooling mode of the air conditioning unit of the first embodiment.

In the air conditioning unit 30 in the outside-air cooling mode, air flows through each air passage as indicated by a thick arrow in FIG. 5.

Air (specifically, outside air) flows into the first air passage 31*a* via the first outside air introduction port 323*a*. As in the inside-air cooling mode, the air having flowed into the first air passage 31*a* is heated in the first heat exchanger 14*a* and released out of the vehicle interior.

Air (specifically, outside air) flows into the second air passage 31*b* via the second outside air introduction port 323*b*. The air having flowed into the second air passage 31*b* exchanges heat with the refrigerant in the second heat exchanger 14*b* and is cooled. The air cooled in the second heat exchanger 14*b* flows into the third air passage 31*c* via the second interior outflow port 35*d*.

The air having flowed into the third air passage 31*c* is blown into the vehicle interior as in the inside-air cooling mode. This achieves cooling in the vehicle interior.

(a-3) Composite Cooling Mode

In the composite cooling mode, the control device 40 controls the operation of the compressor 11 of the heat pump cycle 10 as in the inside-air cooling mode.

The control device 40 brings the first expansion valve 13*a* into the throttling state. More specifically, the control device 40 controls the operation of the first expansion valve 13*a* such that a supercooling degree SC1 of the refrigerant flowing into the first expansion valve 13*a* approaches a target supercooling degree SCO1.

The target supercooling degree SCO1 is determined based on the first refrigerant temperature T1 detected by the first refrigerant temperature sensor 41*g* with reference to the control map for the cooling mode stored in advance in the control device 40. In the control map of the present embodiment, the target supercooling degree SCO1 is determined such that the coefficient of performance (i.e., COP) of the cycle approaches the maximum value.

The control device 40 brings the second expansion valve 13*b* into the fully open state.

As in the inside-air cooling mode, the control device 40 controls the operations of the heat medium pump 21, the first flow rate control valve 24*a*, and the second flow rate control valve 24*b* of the heat medium circuit 20.

The control device 40 controls the operation of the first inlet-side inside/outside air switch device 32*a* so as to open the first outside air introduction port 323*a* of the air conditioning unit 30 and close the first inside air introduction port 35*a*. That is, the first inlet-side inside/outside air switch device 32*a* makes a switch to the ventilation path that guides outside air to the first heat exchanger 14*a*.

The control device 40 controls the operation of the first outlet-side inside/outside air switch device 33*a* so as to close the first exterior outflow port 333*a* and open the first interior outflow port 35*b*. That is, the first outlet-side inside/outside air switch device 33*a* makes a switch to the ventilation path that guides the air having passed through the first heat exchanger 14*a* into the vehicle interior.

The control device 40 controls the operation of the second inlet-side inside/outside air switch device 32*b* so as to open the second outside air introduction port 323*b* and close the second inside air introduction port 35*c*. That is, the second inlet-side inside/outside air switch device 32*b* makes a switch to the ventilation path that guides outside air to the second heat exchanger 14*b*.

The control device 40 controls the operation of the second outlet-side inside/outside air switch device 33*b* so as to close the second exterior outflow port 333*b* and open the second interior outflow port 35*d*. That is, the second outlet-side inside/outside air switch device 33*b* makes a switch to the ventilation path that guides the air having passed through the second heat exchanger 14*b* into the vehicle interior.

As in the inside-air cooling mode, the control device 40 controls the operations of the outside air introduction device 32*c*, the heating part inlet-side switch device 34*a*, and the heating part outlet-side switch device 34*b*. The control device 40 stops the blower 36. As in the inside-air cooling mode, the control device 40 controls the operation of the indoor blower 37.

Accordingly, in the heat pump cycle 10 in the composite cooling mode, the high-pressure refrigerant discharged from the compressor 11 flows into the refrigerant passage of the water-refrigerant heat exchanger 12. In the water-refrigerant heat exchanger 12, the heat medium is heated as in the inside-air cooling mode.

The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the refrigerant absorbs heat from the air and evaporates. Thereby, the air flowing through the first heat exchanger 14a is cooled.

The refrigerant having flowed out of the first heat exchanger 14a flows into the second heat exchanger 14b via the fully open second expansion valve 13b.

The refrigerant having flowed into the second heat exchanger 14b exchanges heat with air (specifically, outside air) having flowed into the second air passage 31b from the second outside air introduction port 323b of the air conditioning unit 30. In the second heat exchanger 14b, the refrigerant absorbs heat from the air and evaporates. Accordingly, the air flowing through the second air passage 31b is cooled.

The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

The heat medium circuit 20 in the composite cooling mode operates as in the inside-air cooling mode.

Figure 6:
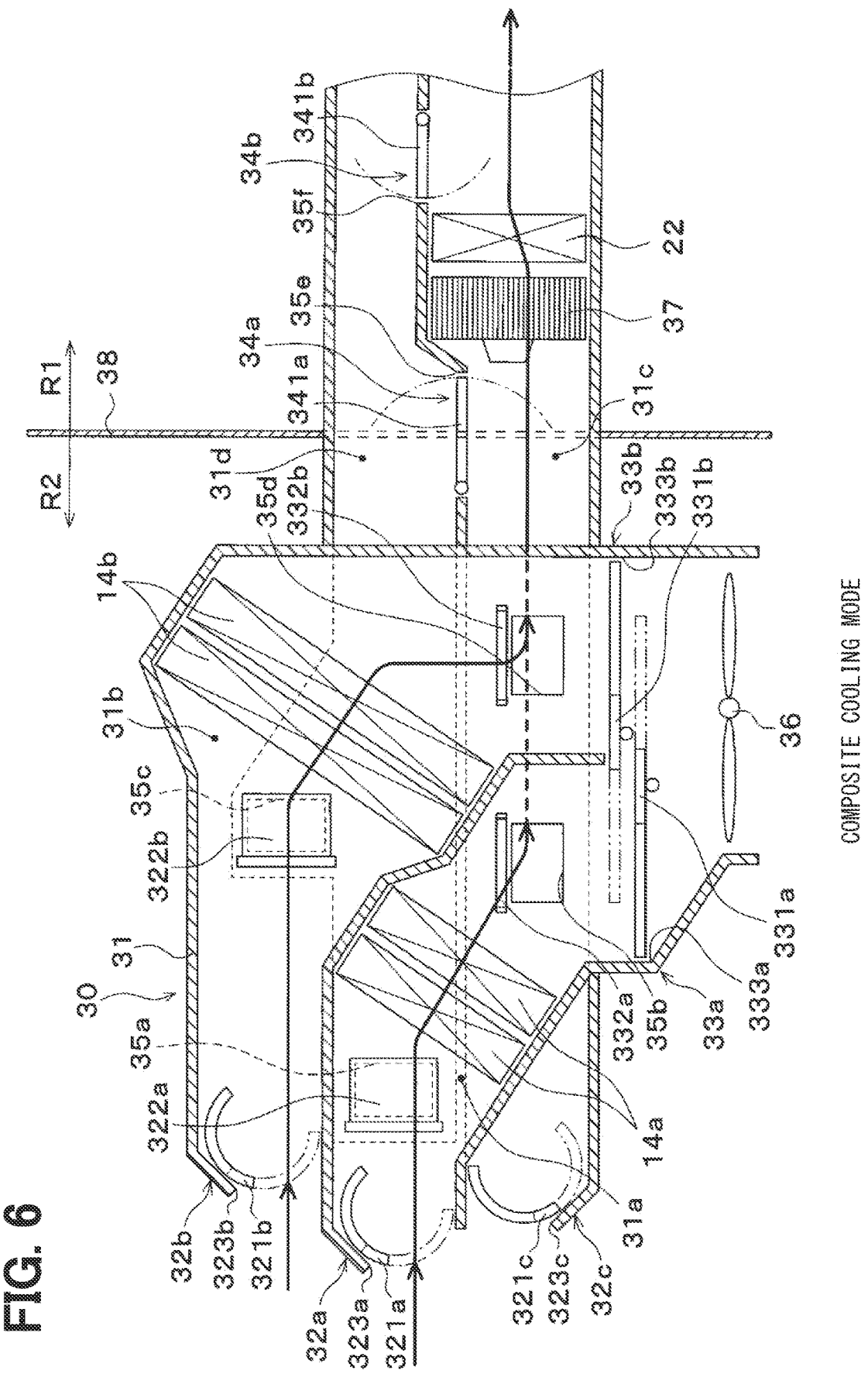
FIG. 6 is a schematic sectional view illustrating an airflow in a composite cooling mode of the air conditioning unit of the first embodiment.

In the air conditioning unit 30 in the composite cooling mode, air flows through each air passage as indicated by a thick arrow in FIG. 6.

Air (specifically, outside air) flows into the first air passage 31a via the first outside air introduction port 323a. The air having flowed into the first air passage 31a is cooled in the first heat exchanger 14a. The air cooled in the first heat exchanger 14a flows into the third air passage 31c via the first interior outflow port 35b.

Air (specifically, outside air) flows into the second air passage 31b via the second outside air introduction port 323b. The air having flowed into the second air passage 31b is cooled in the second heat exchanger 14b. The air cooled in the second heat exchanger 14b flows into the third air passage 31c via the second interior outflow port 35d.

The air having flowed into the third air passage 31c is blown into the vehicle interior as in the inside-air cooling mode. This achieves cooling in the vehicle interior.

In the composite cooling mode, since the air can be cooled by both the first heat exchanger 14a and the second heat exchanger 14b, a sufficient flow rate of the air can be cooled. In the composite cooling mode as well, the first inlet-side inside/outside air switch device 32a may make a switch to the ventilation path that guides the inside air to the first heat exchanger 14a. Further, the second inlet-side inside/outside air switch device 32b may make a switch to the ventilation path that guides the inside air to the second heat exchanger 14b.

(b) Heating Mode

The heating mode is an operation mode mainly executed when the outside air temperature Tam is relatively low (0° C. or lower in the present embodiment). In the air conditioner 1 of the present embodiment, an inside-air heating mode, an outside-air heating mode, and a ventilation heating mode can be switched as the heating mode.

(b-1) Inside-Air Heating Mode

In the inside-air heating mode, the control device 40 operates the compressor 11 of the heat pump cycle 10. More specifically, the control device 40 controls the refrigerant discharge capacity of the compressor 11 such that the high pressure Pd detected by the high-pressure sensor 41d approaches a target high pressure PDO. The target heat exchanger temperature PDO is determined based on the target blowing temperature TAO with reference to the control map for the heating mode stored in advance in the control device 40.

In the control map of the present embodiment, it is determined to increase the target high pressure PDO with an increase in the target blowing temperature TAO.

The control device 40 brings the first expansion valve 13a into the throttling state. The control device 40 brings the second expansion valve 13b into the fully open state. More specifically, the control device 40 controls the operation of the first expansion valve 13a such that the supercooling degree SC1 of the refrigerant flowing into the first expansion valve 13a approaches the target supercooling degree SCO1.

The target supercooling degree SCO1 is determined based on the first refrigerant temperature T1 detected by the first refrigerant temperature sensor 41g with reference to the control map for the heating mode stored in advance in the control device 40. In the control map of the present embodiment, the target supercooling degree SCO1 is determined such that the coefficient of performance of the cycle approaches the maximum value.

The control device 40 operates the heat medium pump 21 of the heat medium circuit 20 so as to exhibit a predetermined reference pumping capacity.

The control device 40 controls the operation of the first flow rate control valve 24a such that the total flow rate of the heat medium discharged from the heat medium pump 21 flows into the heater core 22. The control device 40 controls the operation of the second flow rate control valve 24b such that the heat medium temperature Tw detected by the heat medium temperature sensor 41j approaches the target heat medium temperature TWO.

The target heat medium temperature TWO is determined based on the target blowing temperature TAO with reference to the control map for the heating mode stored in advance in the control device 40.

The control device 40 controls the operation of the first inlet-side inside/outside air switch device 32a so as to open the first outside air introduction port 323a of the air conditioning unit 30 and close the first inside air introduction port 35a. That is, the first inlet-side inside/outside air switch device 32a makes a switch to the ventilation path that guides outside air to the first heat exchanger 14a.

The control device 40 controls the operation of the first outlet-side inside/outside air switch device 33a so as to open the first exterior outflow port 333a and close the first interior outflow port 35b. That is, the first outlet-side inside/outside air switch device 33a makes a switch to the ventilation path that guides the air having passed through the first heat exchanger 14a out of the vehicle interior.

The control device 40 controls the operation of the second inlet-side inside/outside air switch device 32b so as to open the second outside air introduction port 323b and close the second inside air introduction port 35c. That is, the second inlet-side inside/outside air switch device 32b makes a switch to the ventilation path that guides outside air to the second heat exchanger 14b.

The control device 40 controls the operation of the second outlet-side inside/outside air switch device 33b so as to open the second exterior outflow port 333b and close the second interior outflow port 35d. That is, the second outlet-side inside/outside air switch device 33b makes a switch to the ventilation path that guides the air having passed through the second heat exchanger 14b out of the vehicle interior.

The control device 40 controls the operation of the outside air introduction device 32c so as to close the third outside air introduction port 323c. The control device 40 controls the operation of the heating part inlet-side switch device 34a so as to open the heating part inlet-side opening portion 35e. The control device 40 controls the operation of the heating part outlet-side switch device 34b so as to close the heating part outlet-side opening portion 35f.

As in the inside-air cooling mode, the control device 40 controls the operations of the blower 36 and the indoor blower 37.

Thus, in the heat pump cycle 10 in the inside-air heating mode, the high-pressure refrigerant discharged from the compressor 11 flows into the refrigerant passage of the water-refrigerant heat exchanger 12. The high-pressure refrigerant having flowed into the refrigerant passage of the water-refrigerant heat exchanger 12 exchanges heat with the heat medium flowing through the heat medium passage. In the water-refrigerant heat exchanger 12, the refrigerant radiates heat to the heat medium and condenses. Thereby, the heat medium is heated.

The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the refrigerant absorbs heat from the air and evaporates. The refrigerant having flowed out of the first heat exchanger 14a flows into the second heat exchanger 14b via the fully open second expansion valve 13b.

The refrigerant having flowed into the second heat exchanger 14b exchanges heat with air (specifically, outside air) having flowed into the second air passage 31b from the second outside air introduction port 323b of the air conditioning unit 30. In the second heat exchanger 14b, the refrigerant absorbs heat from the air and evaporates.

The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

In the heat medium circuit 20 in the inside-air heating mode, the heat medium pumped from the heat medium pump 21 flows into the heater core 22. The heat medium having flowed into the heater core 22 exchanges heat with the air flowing through the third air passage 31c. In the heater core 22, the heat medium radiates heat to the air. Thereby, the air flowing through the third air passage 31c is heated.

The heat medium having flowed out of the heater core 22 flows into the heat medium passage of the water-refrigerant heat exchanger 12. The heat medium having flowed into the heat medium passage of the water-refrigerant heat exchanger 12 exchanges heat with the refrigerant and is heated.

A part of the heat medium having flowed out of the heat medium passage of the water-refrigerant heat exchanger 12 flows into the heat medium radiator 23. The heat medium having flowed into the heat medium radiator 23 radiates heat to the outside air and is cooled. The heat medium having flowed out of the heat medium radiator 23 flows into one inflow port of the second flow rate control valve 24b. The heat medium having flowed into the second bypass passage 20b from the heat medium passage of the water-refrigerant heat exchanger 12 flows into the other inflow port of the second flow rate control valve 24b.

At this time, the second flow rate control valve 24b regulates the flow rate ratio between the flow rate of the heat medium allowed to flow the heat medium radiator 23 and the flow rate of the heat medium allowed to flow the heat medium bypass passage 25 such that the heat medium temperature Tw approaches the target heat medium temperature TWO. The heat medium having flowed out of the second flow rate control valve 24b is sucked into the heat medium pump 21 and pumped to the heater core 22 side again.

Figure 7:
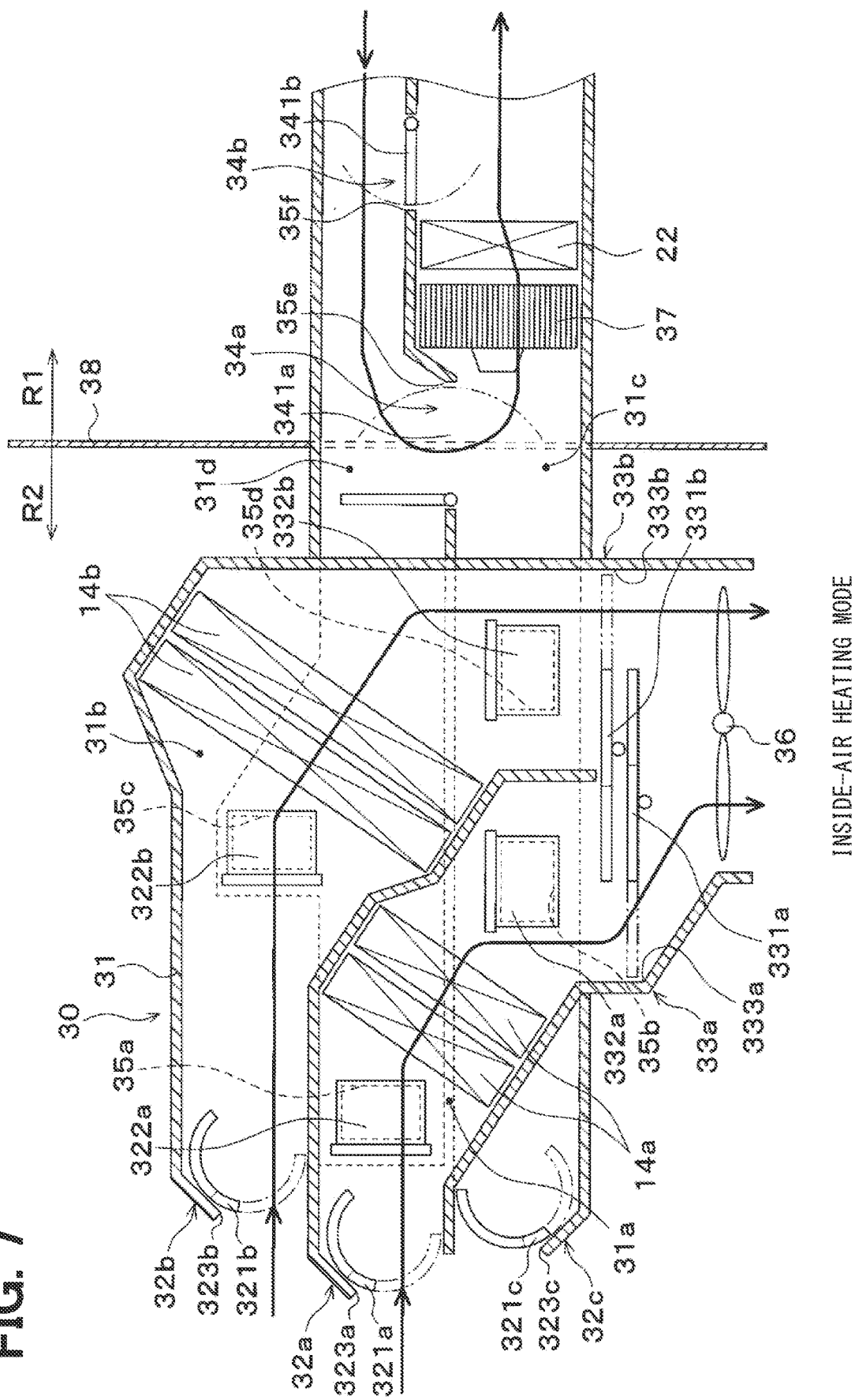
FIG. 7 is a schematic sectional view illustrating an airflow in an inside-air heating mode of the air conditioning unit of the first embodiment.

In the air conditioning unit 30 in the inside-air heating mode, air flows through each air passage as indicated by a thick arrow in FIG. 7.

Air (specifically, outside air) flows into the first air passage 31a via the first outside air introduction port 323a. The air having flowed into the first air passage 31a exchanges heat with the refrigerant and is cooled in the first heat exchanger 14a. The air cooled in the first heat exchanger 14a flows out of the first exterior outflow port 333a. The air having flowed out of the first exterior outflow port 333a is sucked into the blower 36 and released out of the vehicle interior.

Air (specifically, outside air) flows into the second air passage 31b via the second outside air introduction port 323b. The air having flowed into the second air passage 31b exchanges heat with the refrigerant and is cooled in the second heat exchanger 14b. The air cooled in the second heat exchanger 14b flows out of the second exterior outflow port 333b. The air having flowed out of the second exterior outflow port 333b is sucked into the blower 36 and released out of the vehicle interior.

The air (specifically, inside air) flowing through the fourth air passage 31d flows into the third air passage 31c via the heating part inlet-side opening portion 35e. The air having flowed into the third air passage 31c is sucked into the indoor blower 37 and blown to the heater core 22. The air having flowed into the heater core 22 exchanges heat with the heat medium and is heated. The air heated in the heater core 22 is blown into the vehicle interior. This achieves heating in the vehicle interior.

In the inside-air heating mode, the inside air is circulated and blown to be heated in the heater core 22. Thus, by making a switch to the inside-air heating mode immediately after the start of heating, the vehicle interior can be expected to be heated rapidly.

(b-2) Outside-Air Heating Mode

In the outside-air heating mode, as in the inside-air heating mode, the control device 40 controls the operations of the compressor 11, the first expansion valve 13a, and the second expansion valve 13b of the heat pump cycle 10. As in the inside-air heating mode, the control device 40 controls the operations of the heat medium pump 21, the first flow rate control valve 24a, and the second flow rate control valve 24b of the heat medium circuit 20.

As in the inside-air heating mode, the control device 40 controls the operations of the first inlet-side inside/outside air switch device 32a, the first outlet-side inside/outside air switch device 33a, the second inlet-side inside/outside air switch device 32b, and the second outlet-side inside/outside air switch device 33b of the air conditioning unit 30.

The control device 40 controls the operation of the outside air introduction device 32c so as to open the third outside air introduction port 323c. The control device 40 controls the operation of the heating part inlet-side switch device 34a so as to close the heating part inlet-side opening portion 35e. The control device 40 controls the operation of the heating part outlet-side switch device 34b so as to close the heating part outlet-side opening portion 35f.

As in the inside-air cooling mode, the control device 40 controls the operations of the blower 36 and the indoor blower 37.

Therefore, the heat pump cycle 10 and the heat medium circuit 20 in the outside-air heating mode operate as in the inside-air heating mode.

Figure 8:
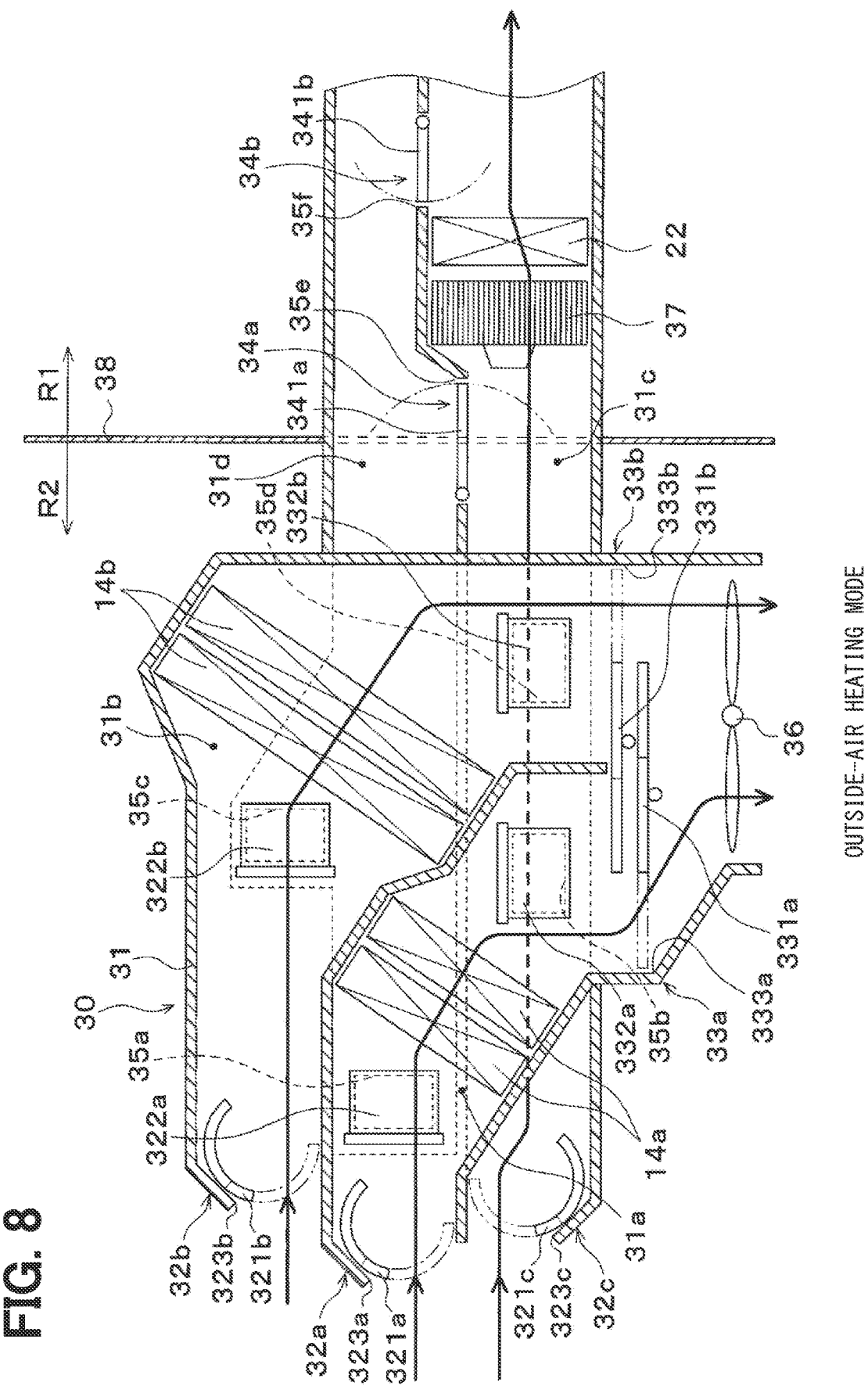
FIG. 8 is a schematic sectional view illustrating an airflow in an outside-air heating mode of the air conditioning unit of the first embodiment.

In the air conditioning unit 30 in the outside-air heating mode, air flows through each air passage as indicated by a thick arrow in FIG. 8.

Air (specifically, outside air) flows into the first air passage 31a via the first outside air introduction port 323a. As in the inside-air heating mode, the air having flowed into the first air passage 31a is heated in the first heat exchanger 14a and released out of the vehicle interior.

Air (specifically, outside air) flows into the second air passage 31b via the second outside air introduction port 323b. The air having flowed into the second air passage 31b is cooled in the second heat exchanger 14b and released out of the vehicle interior as in the inside-air heating mode.

Air (specifically, outside air) flows into the third air passage 31c via the third outside air introduction port 323c. The air having flowed into the third air passage 31c is sucked into the indoor blower 37 and blown to the heater core 22. The air having flowed into the heater core 22 exchanges heat with the heat medium and is heated. The air heated in the heater core 22 is blown into the vehicle interior. This achieves heating in the vehicle interior.

(b-3) Ventilation Heating Mode

In the ventilation heating mode, the control device 40 controls the operation of the compressor 11 of the heat pump cycle 10 as in the inside-air heating mode.

The control device 40 brings the first expansion valve 13a into the throttling state. More specifically, the control device 40 controls the operation of the first expansion valve 13a such that the refrigerant evaporation temperature in the first heat exchanger 14a is a temperature lower than the inside air temperature Tr and not causing frost to form on the first heat exchanger 14a (higher than 1° C. in the present embodiment).

The control device 40 brings the second expansion valve 13b into the throttling state. More specifically, the control device 40 controls the operation of the second expansion valve 13b such that the supercooling degree SC1 of the refrigerant flowing into the first expansion valve 13a approaches the target supercooling degree SCO1.

As in the inside-air heating mode, the control device 40 controls the operations of the heat medium pump 21, the first flow rate control valve 24a, and the second flow rate control valve 24b of the heat medium circuit 20.

The control device 40 controls the operation of the first inlet-side inside/outside air switch device 32a so as to close the first outside air introduction port 323a of the air conditioning unit 30 and open the first inside air introduction port 35a. That is, the first inlet-side inside/outside air switch device 32a makes a switch to the ventilation path that guides inside air to the first heat exchanger 14a.

The control device 40 controls the operation of the first outlet-side inside/outside air switch device 33a so as to open the first exterior outflow port 333a and close the first interior outflow port 35b. That is, the first outlet-side inside/outside air switch device 33a makes a switch to the ventilation path that guides the air having passed through the first heat exchanger 14a out of the vehicle interior.

As in the inside-air heating mode, the control device 40 controls the operations of the second inlet-side inside/outside air switch device 32b and the second outlet-side inside/outside air switch device 33b.

The control device 40 controls the operation of the outside air introduction device 32c so as to open the third outside air introduction port 323c. The control device 40 controls the operation of the heating part inlet-side switch device 34a so as to close the heating part inlet-side opening portion 35e. The control device 40 controls the operation of the heating part outlet-side switch device 34b so as to close the heating part outlet-side opening portion 35f.

As in the inside-air heating mode, the control device 40 controls the operations of the blower 36 and the indoor blower 37.

Accordingly, in the heat pump cycle 10 in the ventilation heating mode, the high-pressure refrigerant discharged from the compressor 11 flows into the refrigerant passage of the water-refrigerant heat exchanger 12. In the water-refrigerant heat exchanger 12, the heat medium is heated as in the inside-air heating mode. The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, inside air) having flowed into the first air passage 31a from the first inside air introduction port 35a of the air conditioning unit 30. In the first heat exchanger 14a, the refrigerant absorbs heat from the air and evaporates. The refrigerant having flowed out of the first heat exchanger 14a flows into the second expansion valve 13b and is decompressed. The low-pressure refrigerant decompressed in the second expansion valve 13b flows into the second heat exchanger 14b.

The refrigerant having flowed into the second heat exchanger 14b absorbs heat from the air (specifically, outside air) and evaporates as in the inside-air heating mode. The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

The heat medium circuit 20 in the ventilation heating mode operates as in the inside-air heating mode.

Figure 9:
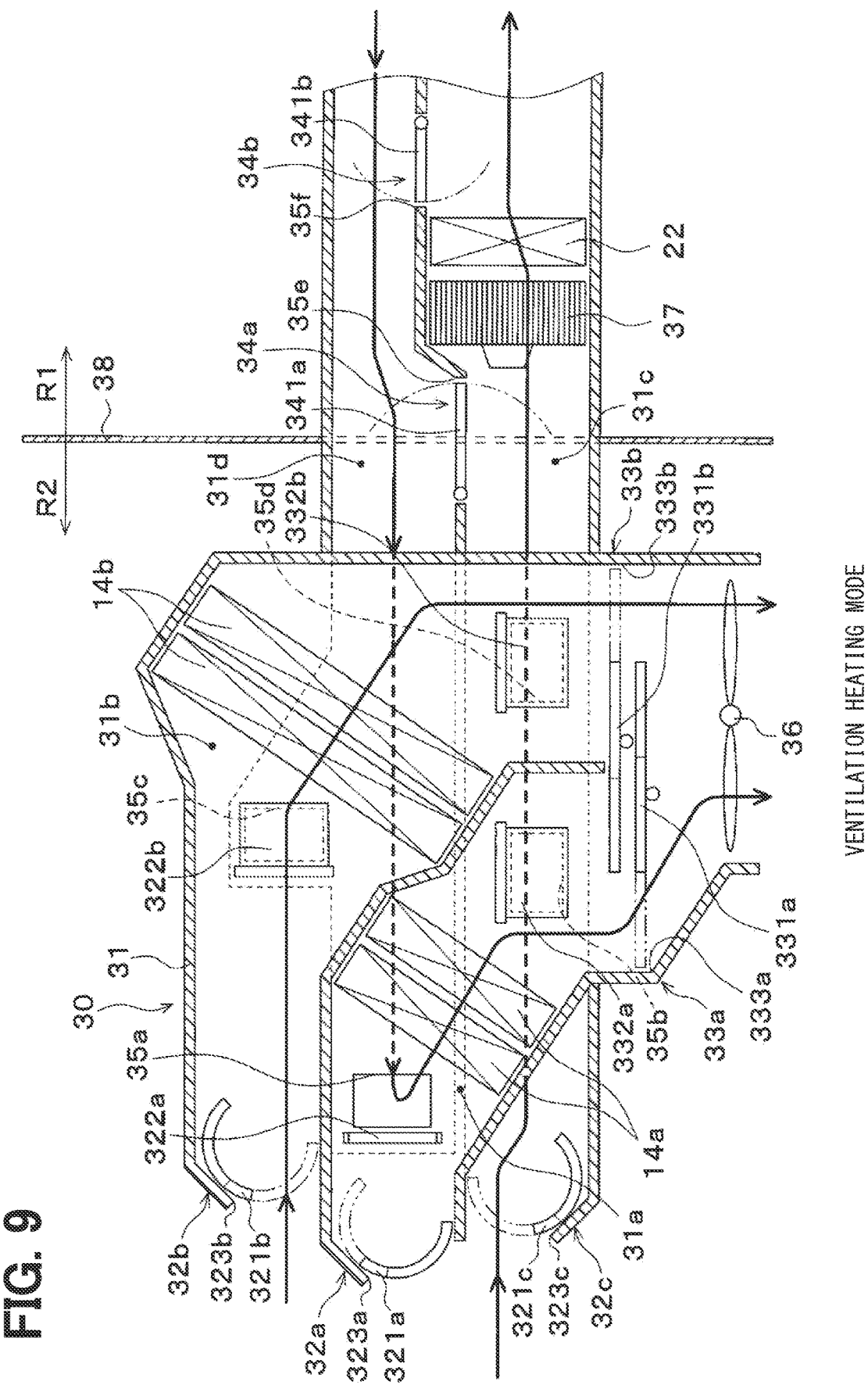
FIG. 9 is a schematic sectional view illustrating an airflow in a ventilation heating mode of the air conditioning unit of the first embodiment.

In the air conditioning unit 30 in the ventilation heating mode, air flows through each air passage as indicated by a thick arrow in FIG. 9.

Air (specifically, inside air) having flowed through the fourth air passage 31d flows into the first air passage 31a via the first inside air introduction port 35a. The air having flowed into the first air passage 31a exchanges heat with the refrigerant and is cooled. The air cooled in the first heat exchanger 14a flows out of the first exterior outflow port 333a. The air having flowed out of the first exterior outflow port 333a is sucked into the blower 36 and released out of the vehicle interior.

Air (specifically, outside air) flows into the second air passage 31b via the second outside air introduction port 323b. The air having flowed into the second air passage 31b is cooled in the second heat exchanger 14b and released out of the vehicle interior as in the inside-air heating mode.

Air (specifically, outside air) flows into the third air passage 31c via the third outside air introduction port 323c. The air having flowed into the third air passage 31c is sucked into the indoor blower 37 and blown to the heater core 22. The air having flowed into the heater core 22 exchanges heat with the heat medium and is heated. The air heated in the heater core 22 is blown into the vehicle interior. This achieves heating in the vehicle interior.

(c) Dehumidifying Heating Mode

The dehumidifying heating mode is an operation mode mainly executed when the outside air temperature Tam is a medium or low temperature (0° C. or higher and 20° C. or lower in the present embodiment). The air conditioner 1 of the present embodiment can switch between the first dehumidifying heating mode and the second dehumidifying heating mode as the dehumidifying heating mode.

The first dehumidifying heating mode is executed when the outside air temperature Tam is equal to or higher than a predetermined reference dehumidifying and heating temperature KTam (10° C. in the present embodiment). The second dehumidifying heating mode is executed when the outside air temperature Tam is lower than a reference dehumidifying and heating temperature KTam.

(c-1) First Dehumidifying Heating Mode

In the outside-air heating mode, the control device 40 controls the operation of the compressor 11 of the heat pump cycle 10 as in the inside-air heating mode.

The control device 40 brings the first expansion valve 13a into the throttling state. More specifically, the control device 40 controls the operation of the first expansion valve 13a such that the refrigerant evaporation temperature in the first heat exchanger 14a is a temperature lower than the outside air temperature Tam and is equal to or higher than the refrigerant evaporation temperature in the second heat exchanger 14b.

The control device 40 brings the second expansion valve 13b into the throttling state. More specifically, the control device 40 controls the operation of the second expansion valve 13b such that the refrigerant evaporation temperature in the second heat exchanger 14b becomes a reference evaporation temperature KTe2 (1° C. in the present embodiment).

As in the inside-air heating mode, the control device 40 controls the operations of the heat medium pump 21, the first flow rate control valve 24a, and the second flow rate control valve 24b of the heat medium circuit 20.

The control device 40 controls the operation of the first inlet-side inside/outside air switch device 32a so as to open the first outside air introduction port 323a of the air conditioning unit 30 and close the first inside air introduction port 35a. That is, the first inlet-side inside/outside air switch device 32a makes a switch to the ventilation path that guides outside air to the first heat exchanger 14a.

The control device 40 controls the operation of the first outlet-side inside/outside air switch device 33a so as to open the first exterior outflow port 333a and close the first interior outflow port 35b. That is, the first outlet-side inside/outside air switch device 33a makes a switch to the ventilation path that guides the air having passed through the first heat exchanger 14a out of the vehicle interior.

The control device 40 controls the operation of the second inlet-side inside/outside air switch device 32b so as to close the second outside air introduction port 323b and open the second inside air introduction port 35c. That is, the second inlet-side inside/outside air switch device 32b makes a switch to the ventilation path that guides the inside air to the second heat exchanger 14b.

The control device 40 controls the operation of the second outlet-side inside/outside air switch device 33b so as to close the second exterior outflow port 333b and open the second interior outflow port 35d. That is, the second outlet-side inside/outside air switch device 33b makes a switch to the ventilation path that guides the air having passed through the second heat exchanger 14b into the vehicle interior.

The control device 40 controls the operation of the outside air introduction device 32c so as to close the third outside air introduction port 323c. The control device 40 controls the operation of the heating part inlet-side switch device 34a so as to close the heating part inlet-side opening portion 35e. The control device 40 controls the operation of the heating part outlet-side switch device 34b so as to close the heating part outlet-side opening portion 35f.

As in the inside-air cooling mode, the control device 40 controls the operations of the blower 36 and the indoor blower 37.

Thus, in the heat pump cycle 10 in the first dehumidifying heating mode, the high-pressure refrigerant discharged from the compressor 11 flows into the refrigerant passage of the water-refrigerant heat exchanger 12. In the water-refrigerant heat exchanger 12, the heat medium is heated as in the inside-air heating mode. The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the refrigerant absorbs heat from the air and evaporates. The refrigerant having flowed out of the first heat exchanger 14a flows into the second expansion valve 13b and is decompressed. The low-pressure refrigerant decompressed in the second expansion valve 13b flows into the second heat exchanger 14b.

The refrigerant having flowed into the second heat exchanger 14b exchanges heat with air (specifically, inside air) having flowed into the second air passage 31b from the second inside air introduction port 35c. In the second heat exchanger 14b, the refrigerant absorbs heat from the air and evaporates. Thereby, the air flowing through the second air passage 31b is cooled and dehumidified.

The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

The heat medium circuit 20 in the first dehumidifying heating mode operates as in the inside-air heating mode.

Figure 10:
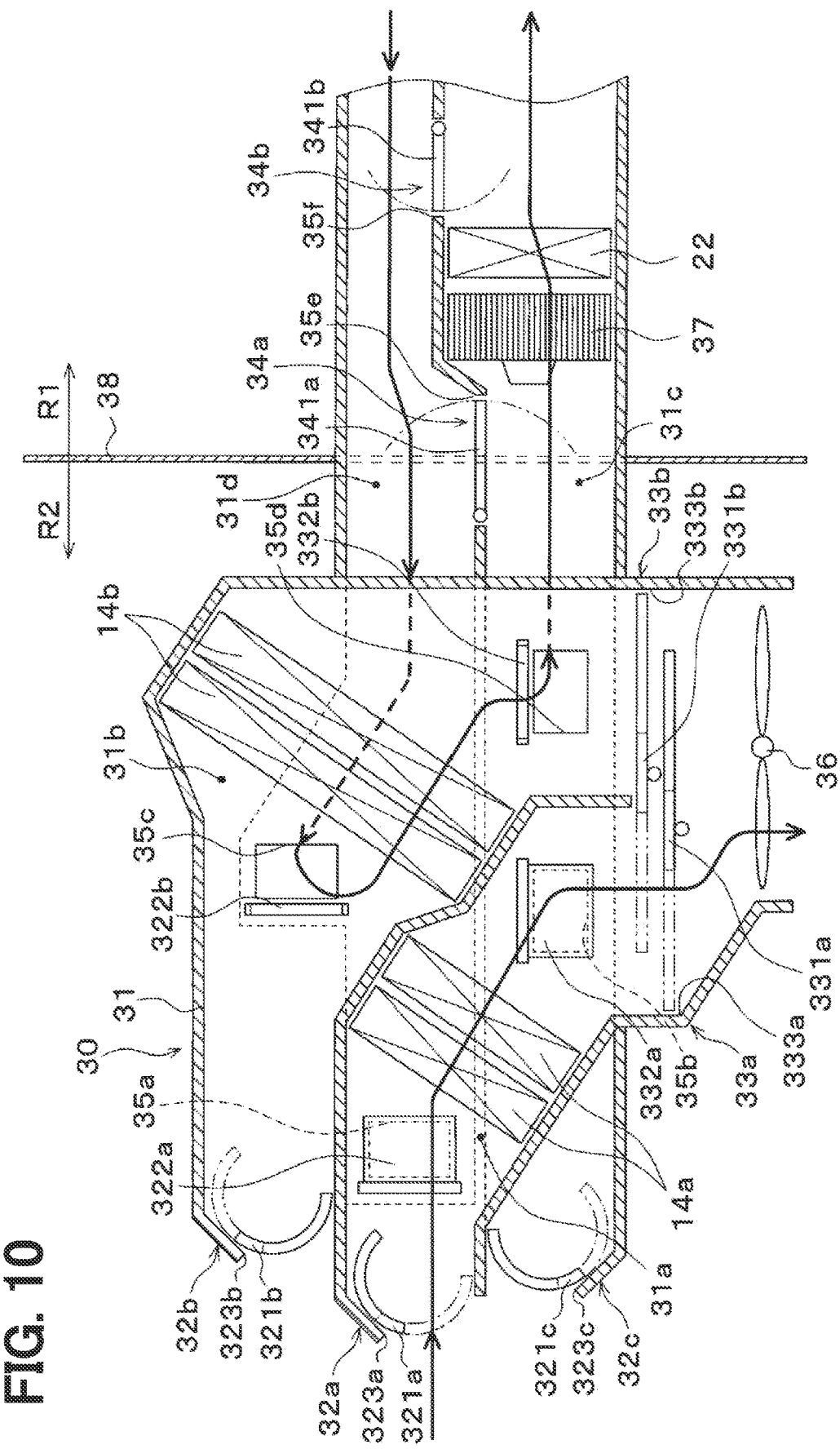
FIG. 10 is a schematic sectional view illustrating an airflow in a first dehumidifying heating mode of the air conditioning unit of the first embodiment.

In the air conditioning unit 30 in the first dehumidifying heating mode, air flows through each air passage as indicated by a thick arrow in FIG. 10.

Air (specifically, outside air) flows into the first air passage 31a via the first outside air introduction port 323a. As in the inside-air heating mode, the air having flowed into the first air passage 31a is heated in the first heat exchanger 14a and released out of the vehicle interior.

Air (specifically, inside air) having flowed through the fourth air passage 31d flows into the second air passage 31b via the second inside air introduction port 35c. The air having flowed into the second air passage 31b exchanges heat with the refrigerant in the second heat exchanger 14b and is cooled and dehumidified. The air dehumidified in the second heat exchanger 14b flows into the third air passage 31c via the second interior outflow port 35d.

The air having flowed into the third air passage 31c is sucked into the indoor blower 37 and blown to the heater core 22. The air having flowed into the heater core 22 exchanges heat with the heat medium and is reheated. The air reheated in the heater core 22 is blown into the vehicle interior. This achieves dehumidification and heating in the vehicle interior.

In the first dehumidifying heating mode, the refrigerant evaporation temperature of the first heat exchanger 14a is higher than the refrigerant evaporation temperature of the second heat exchanger 14b. Therefore, frost forms in neither the first heat exchanger 14a nor the second heat exchanger 14b.

(c-2) Second Dehumidifying Heating Mode

In the second dehumidifying heating mode, the control device 40 controls the operation of compressor 11 of the heat pump cycle 10 as in the inside-air heating mode.

The control device 40 brings the first expansion valve 13a into the throttling state. More specifically, the control device 40 controls the operation of the first expansion valve 13a such that the refrigerant evaporation temperature in the first heat exchanger 14a becomes a reference evaporation temperature $KTe1$ (1° C. in the present embodiment).

The control device 40 brings the second expansion valve 13b into the throttling state. More specifically, the control device 40 controls the operation of the second expansion valve 13b such that the refrigerant evaporation temperature in the second heat exchanger 14b is lower than the outside air temperature Tam.

As in the inside-air heating mode, the control device 40 controls the operations of the heat medium pump 21, the first flow rate control valve 24a, and the second flow rate control valve 24b of the heat medium circuit 20.

The control device 40 controls the operation of the first inlet-side inside/outside air switch device 32a so as to close the first outside air introduction port 323a of the air conditioning unit 30 and open the first inside air introduction port 35a. That is, the first inlet-side inside/outside air switch device 32a makes a switch to the ventilation path that guides inside air to the first heat exchanger 14a.

The control device 40 controls the operation of the first outlet-side inside/outside air switch device 33a so as to close the first exterior outflow port 333a and open the first interior outflow port 35b. That is, the first outlet-side inside/outside air switch device 33a makes a switch to the ventilation path that guides the air having passed through the first heat exchanger 14a into the vehicle interior.

The control device 40 controls the operation of the second inlet-side inside/outside air switch device 32b so as to open the second outside air introduction port 323b and close the second inside air introduction port 35c. That is, the second inlet-side inside/outside air switch device 32b makes a switch to the ventilation path that guides outside air to the second heat exchanger 14b.

The control device 40 controls the operation of the second outlet-side inside/outside air switch device 33b so as to open the second exterior outflow port 333b and close the second interior outflow port 35d. That is, the second outlet-side inside/outside air switch device 33b makes a switch to the ventilation path that guides the air having passed through the second heat exchanger 14b out of the vehicle interior.

The control device 40 controls the operation of the outside air introduction device 32c so as to close the third outside air introduction port 323c. The control device 40 controls the operation of the heating part inlet-side switch device 34a so as to close the heating part inlet-side opening portion 35e. The control device 40 controls the operation of the heating part outlet-side switch device 34b so as to close the heating part outlet-side opening portion 35f.

As in the inside-air cooling mode, the control device 40 controls the operations of the blower 36 and the indoor blower 37.

Thus, in the heat pump cycle 10 in the second dehumidifying heating mode, the high-pressure refrigerant discharged from the compressor 11 flows into the refrigerant passage of the water-refrigerant heat exchanger 12. In the water-refrigerant heat exchanger 12, the heat medium is heated as in the inside-air heating mode. The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, inside air) having flowed into the first air passage 31a from the first inside air introduction port 35a of the air conditioning unit 30. In the first heat exchanger 14a, the refrigerant absorbs heat from the air and evaporates. Thereby, the air flowing through the first air passage 31a is cooled and dehumidified. The refrigerant having flowed out of the first heat exchanger 14a flows into the second expansion valve 13b and is decompressed. The low-pressure refrigerant decompressed in the second expansion valve 13b flows into the second heat exchanger 14b.

The refrigerant having flowed into the second heat exchanger 14b exchanges heat with air (specifically, outside air) having flowed into the second air passage 31b from the second outside air introduction port 323b. In the second heat exchanger 14b, the refrigerant absorbs heat from the air and evaporates.

The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

The heat medium circuit 20 in the second dehumidifying heating mode operates as in the inside-air heating mode.

Figure 11:
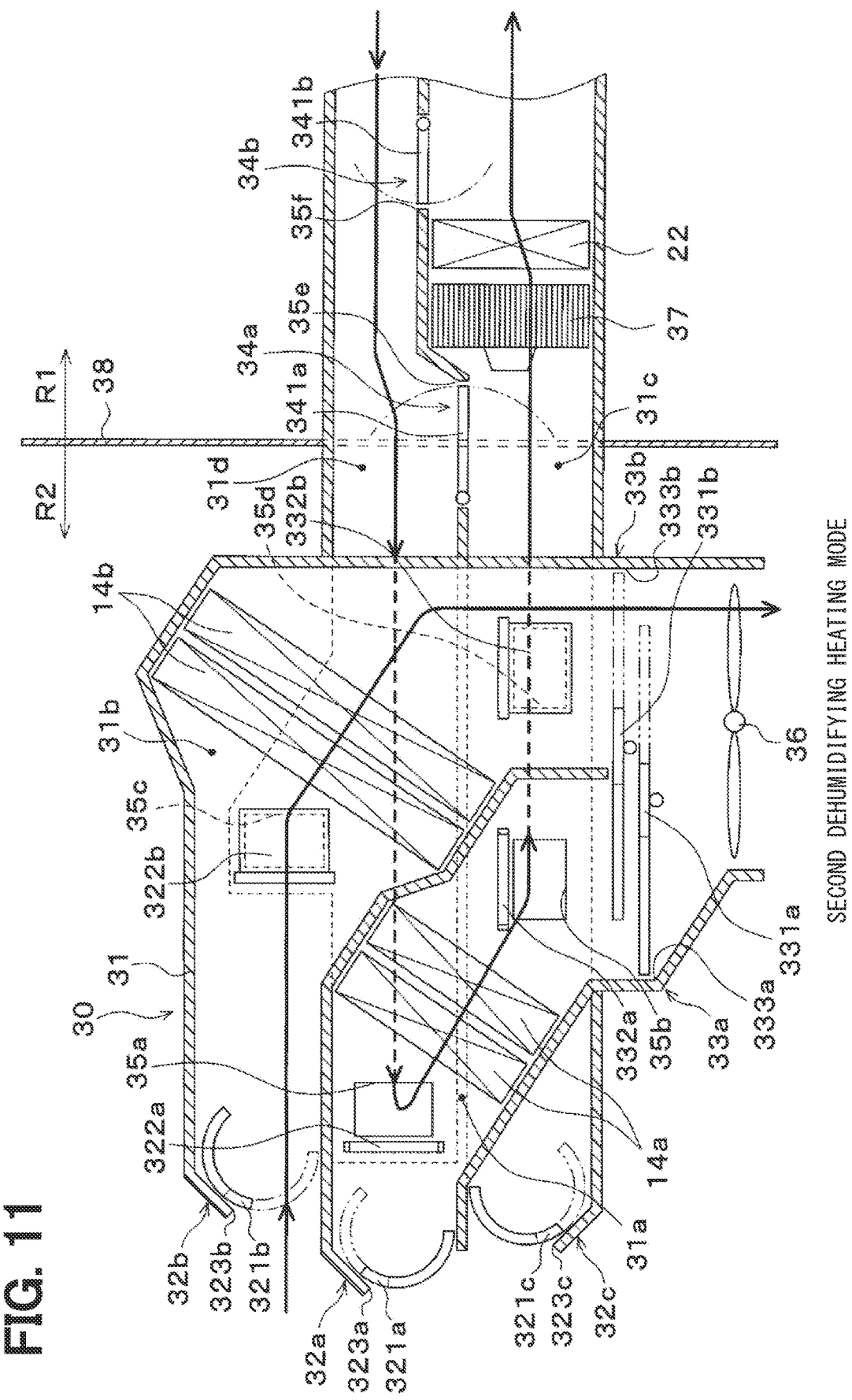
FIG. 11 is a schematic sectional view illustrating an airflow in a second dehumidifying heating mode of the air conditioning unit of the first embodiment.

In the air conditioning unit 30 in the second dehumidifying heating mode, air flows through each air passage as indicated by a thick arrow in FIG. 11.

Air (specifically, inside air) having flowed through the fourth air passage 31d flows into the first air passage 31a via the first inside air introduction port 35a. The air having flowed into the first air passage 31a exchanges heat with the refrigerant in the first heat exchanger 14a and is cooled and dehumidified. The air cooled in the first heat exchanger 14a flows into the third air passage 31c via the first interior outflow port 35b.

Air (specifically, outside air) flows into the second air passage 31b via the second outside air introduction port 323b. The air having flowed into the second air passage 31b is cooled in the second heat exchanger 14b and released out of the vehicle interior as in the inside-air heating mode.

The air having flowed into the third air passage 31c is sucked into the indoor blower 37 and blown to the heater core 22. The air having flowed into the heater core 22 exchanges heat with the heat medium and is reheated. The air reheated in the heater core 22 is blown into the vehicle interior. This achieves dehumidification and heating in the vehicle interior.

In the heat pump cycle 10 in the second dehumidifying heating mode, the refrigerant evaporation temperature in the second heat exchanger 14b may be 0° C. or lower. The absolute humidity of the outside air when the second dehumidifying heating mode is executed is higher than the absolute humidity of the outside air when the heating mode is executed. Therefore, in the second dehumidifying heating mode, there is a high possibility that frost forms on the second heat exchanger 14b.

Such frosting blocks the air passage of the second heat exchanger 14b and significantly degrades heat exchange performance between the refrigerant and outside air. As a result, when frost forms on the second heat exchanger 14b, the air heating capacity of the heat pump cycle 10 decreases.

Figure 12:
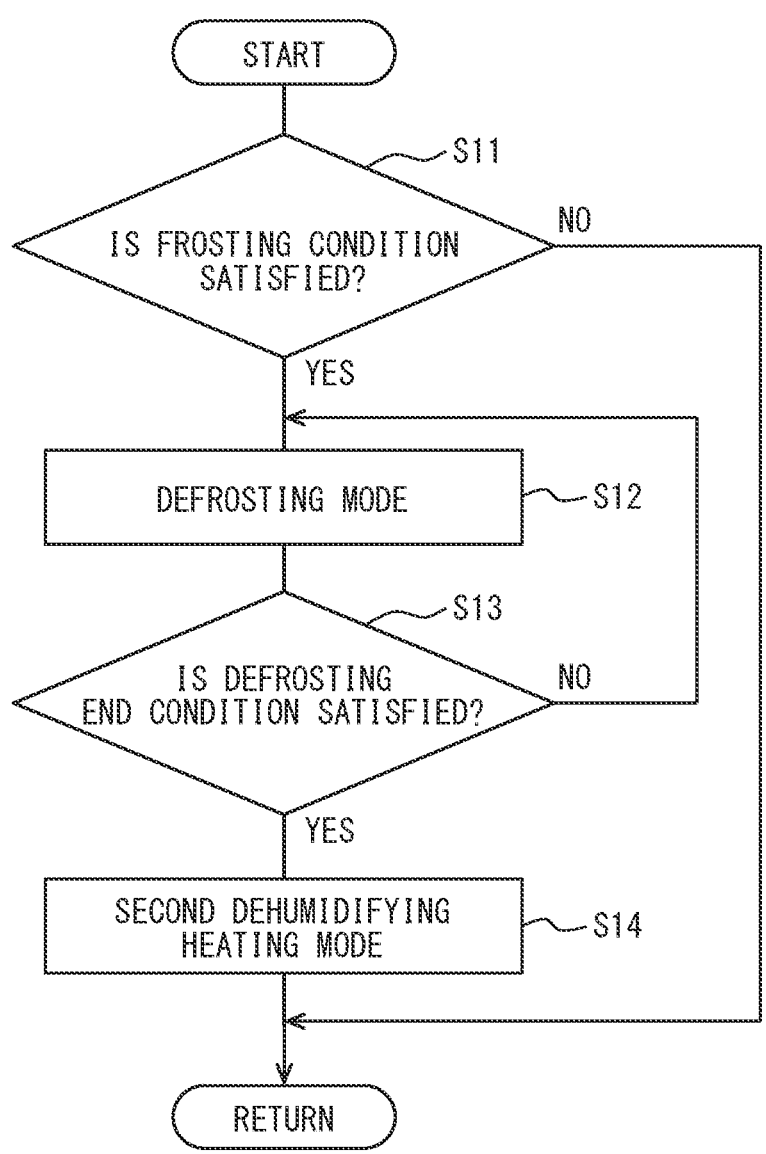
FIG. 12 is a flowchart illustrating a control flow for executing a defrosting mode.

Therefore, in the air conditioner of the present embodiment, a control routine illustrated in the flowchart of FIG. 12 is executed to defrost the second heat exchanger 14b. The control routine illustrated in FIG. 12 is executed at predetermined intervals as a subroutine of the air-conditioning control program when the second dehumidifying heating mode is executed.

First, in step S11 in FIG. 12, it is determined whether or not a predetermined frosting condition is satisfied. In the present embodiment, it is assumed that the frosting condition is satisfied when the time during which a second heat exchanger temperature Tefin2 is equal to or lower than the reference frosting temperature after the start of the second dehumidifying heating mode is equal to or longer than the reference frosting time. Specifically, in the present embodiment, the reference frosting temperature is set to −5° C., and the reference frosting time is set to 5 minutes.

When it is determined in step S11 that the frosting condition is satisfied, the process proceeds to step S12. In step S12, the second dehumidifying heating mode is switched to the defrosting mode, and the process proceeds to step S13. Details of the defrosting mode will be described later. When it is not determined in step S11 that the frosting condition is satisfied, the process returns to the main routine.

In step S13, it is determined whether or not a defrosting end condition is satisfied. In the present embodiment, it is assumed that the defrosting end condition is satisfied when the time during which the defrosting operation is continued is equal to or longer than the reference frosting time. Specifically, in the present embodiment, the reference frosting time is set to 3 minutes.

When it is determined in step S13 that the defrosting end condition is satisfied, the process proceeds to step S14. In step S14, the defrosting mode is switched again to the second dehumidifying heating mode, and the process returns to the main routine. When it is determined in step S13 that the defrosting end condition is not satisfied, the process proceeds to step S12 to continue the defrosting mode. Details of the defrosting mode will be described below.

(d) Defrosting Mode

The air conditioner 1 of the present embodiment can switch between the normal defrosting mode and the low-temperature inside-air defrosting mode as the defrosting mode. The low-temperature inside-air defrosting mode is a defrosting mode executed when the inside air temperature Tr is equal to or lower than a reference defrosting inside air temperature KTr (0° C. in the present embodiment).

(d-1) Normal Defrosting Mode

In the normal defrosting mode, the control device 40 decreases the refrigerant discharge capacity of the compressor 11 in the heat pump cycle 10. That is, the control device 40 makes the flow rate of the refrigerant flowing through the second heat exchanger 14b lower than in the second dehumidifying heating mode. However, the control device 40 operates the compressor 11 without stopping.

The control device 40 controls the operation of the second expansion valve 13b such that the temperature of the refrigerant flowing through the second heat exchanger 14b falls within a predetermined reference defrosting temperature range. More specifically, in the defrosting mode, the control device 40 controls the operations of the compressor 11 and the second expansion valve 13b such that the temperature of the refrigerant flowing through the second heat exchanger 14b falls within the reference defrosting temperature range.

In the present embodiment, the reference defrosting temperature range is specifically −3° C. or higher and 10° C. or lower. This is a value obtained experimentally as a temperature range of the refrigerant in which the second heat exchanger 14b can be defrosted.

The control device 40 controls the operation of the first expansion valve 13a in accordance with the operations of the compressor 11 and the second expansion valve 13b so as to balance the amount of heat absorption and radiation in the entire cycle.

As in the inside-air heating mode, the control device 40 controls the operations of the heat medium pump 21, the first flow rate control valve 24a, and the second flow rate control valve 24b of the heat medium circuit 20.

The control device 40 controls the operation of the first inlet-side inside/outside air switch device 32a so as to close the first outside air introduction port 323a of the air conditioning unit 30 and open the first inside air introduction port 35a. That is, the first inlet-side inside/outside air switch device 32a makes a switch to the ventilation path that guides inside air to the first heat exchanger 14a.

The control device 40 controls the operation of the first outlet-side inside/outside air switch device 33a so as to close the first exterior outflow port 333a and open the first interior outflow port 35b. That is, the first outlet-side inside/outside air switch device 33a makes a switch to the ventilation path that guides the air having passed through the first heat exchanger 14a into the vehicle interior.

The control device 40 controls the operation of the second inlet-side inside/outside air switch device 32b so as to close the second outside air introduction port 323b and open the second inside air introduction port 35c. That is, the second inlet-side inside/outside air switch device 32b makes a switch to the ventilation path that guides the inside air to the second heat exchanger 14b.

The control device 40 controls the operation of the second outlet-side inside/outside air switch device 33b so as to close the second exterior outflow port 333b and open the second interior outflow port 35d. That is, the second outlet-side inside/outside air switch device 33b makes a switch to a ventilation path that guides the air having passed through the second heat exchanger 14b into the vehicle interior.

As in the inside-air cooling mode, the control device 40 controls the operations of the outside air introduction device 32c, the heating part inlet-side switch device 34a, and the heating part outlet-side switch device 34b. The control device 40 stops the blower 36. As in the inside-air cooling mode, the control device 40 controls the operation of the indoor blower 37.

Thus, in the heat pump cycle 10 in the normal defrosting mode, the high-pressure refrigerant discharged from the compressor 11 flows into the refrigerant passage of the water-refrigerant heat exchanger 12. At this time, the temperature of the high-pressure refrigerant is lower than that in the second dehumidifying heating mode. Hence the refrigerant having flowed into the refrigerant passage of the water-refrigerant heat exchanger 12 flows out of the refrigerant passage while hardly radiating heat to the heat medium.

The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, inside air) having flowed into the first air passage 31a from the first inside air introduction port 35a of the air conditioning unit 30. In the first heat exchanger 14a, the refrigerant radiates or absorbs heat so as to balance the amount of absorbed and radiated heat in the entire cycle.

The refrigerant having flowed out of the first heat exchanger 14a flows into the second expansion valve 13b and is decompressed. At this time, the throttle opening of the second expansion valve 13b is regulated such that the temperature of the refrigerant flowing through second heat exchanger 14b falls within the reference defrosting temperature range. The low-pressure refrigerant decompressed in the second expansion valve 13b flows into the second heat exchanger 14b.

In the second heat exchanger 14b, the refrigerant radiates heat to the frost. Thereby, the frost melts, and the defrosting of the second heat exchanger 14b proceeds. The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

The heat medium circuit 20 in the normal defrosting mode operates as in the inside-air heating mode.

Figure 13:
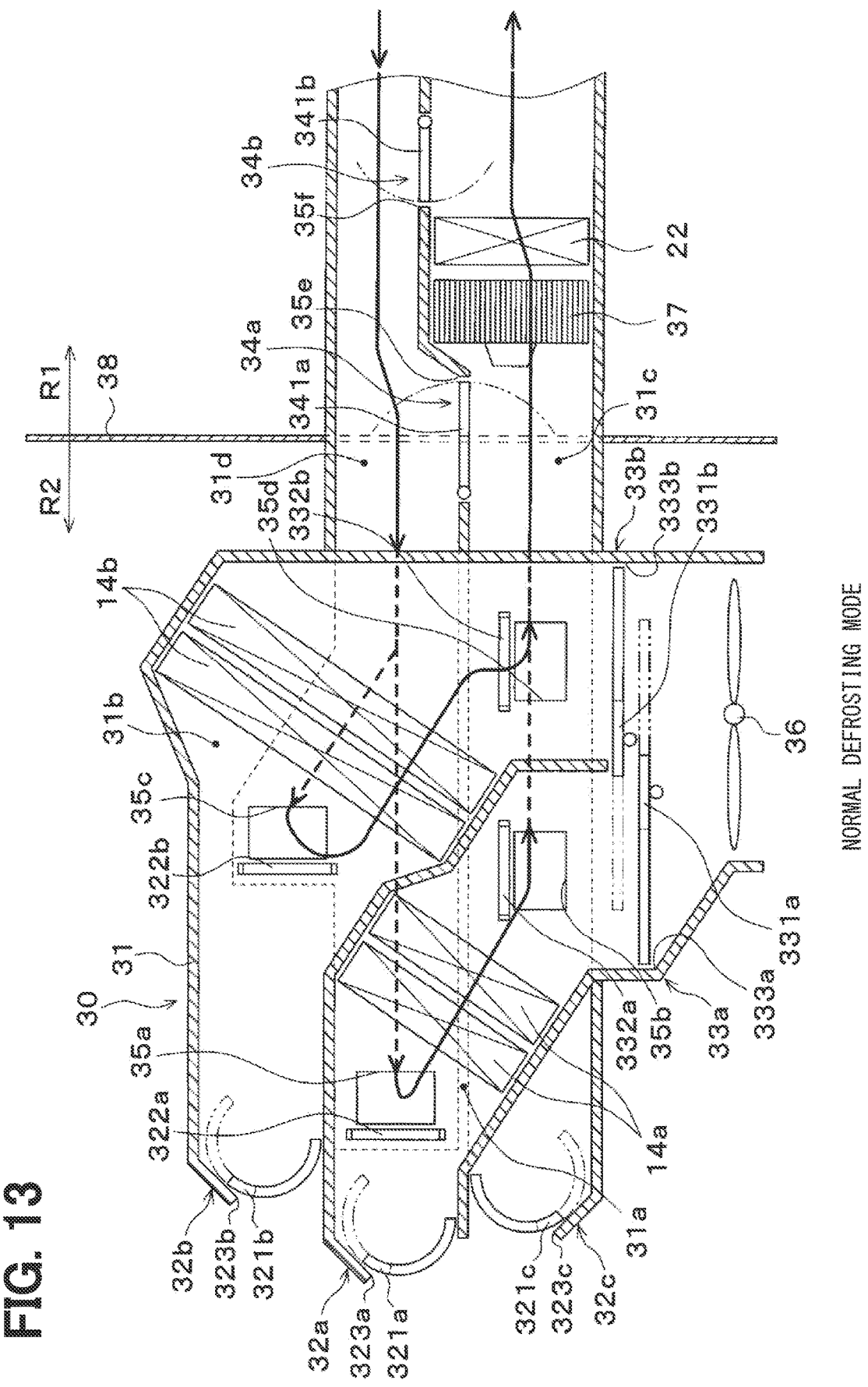
FIG. 13 is a schematic sectional view illustrating an airflow in a normal defrosting mode of the air conditioning unit of the first embodiment.

In the air conditioning unit 30 in the normal defrosting mode, air flows through each air passage as indicated by a thick arrow in FIG. 13.

Air (specifically, inside air) flows into the first air passage 31a via the first inside air introduction port 35a. The air having flowed into the first air passage 31a exchanges heat with the refrigerant in the first heat exchanger 14a. The air having exchanged heat with the refrigerant in the first heat exchanger 14a flows into the third air passage 31c via the first interior outflow port 35b.

Air (specifically, inside air) having flowed through the fourth air passage 31d flows into the second air passage 31b via the second inside air introduction port 35c. The relatively high-temperature inside air having flowed into the second air passage 31b radiates heat to the frost of the second heat exchanger 14b. Thereby, the frost melts, and the defrosting of the second heat exchanger 14b proceeds.

Further, the air having flowed into the second air passage 31b is cooled to near 0° C. by frost and dehumidified. The air having passed through the second heat exchanger 14b flows into the third air passage 31c via the second interior outflow port 35d.

The air having flowed into the third air passage 31c is sucked into the indoor blower 37 and blown to the heater core 22. The air having flowed into the heater core 22 exchanges heat with the heat medium and is reheated. The air reheated in the heater core 22 is blown into the vehicle interior. This achieves defrosting of the second heat exchanger 14b and dehumidifying and heating in the vehicle interior.

(d-2) Low-Temperature Inside-Air Defrosting Mode

In the low-temperature inside-air defrosting mode, the control device 40 controls the operation of the compressor 11 so as to exhibit a predetermined reference discharge performance for the low-temperature inside-air defrosting mode.

The control device 40 brings the first expansion valve 13a into the throttling state. More specifically, the control device 40 controls the operation of the first expansion valve 13a such that the temperature of the refrigerant flowing through the first heat exchanger 14a and the second heat exchanger 14b falls within the reference defrosting temperature range. The control device 40 brings the second expansion valve 13b into the fully open state.

As in the inside-air heating mode, the control device 40 controls the operations of the heat medium pump 21, the first flow rate control valve 24a, and the second flow rate control valve 24b of the heat medium circuit 20.

Figure 14:
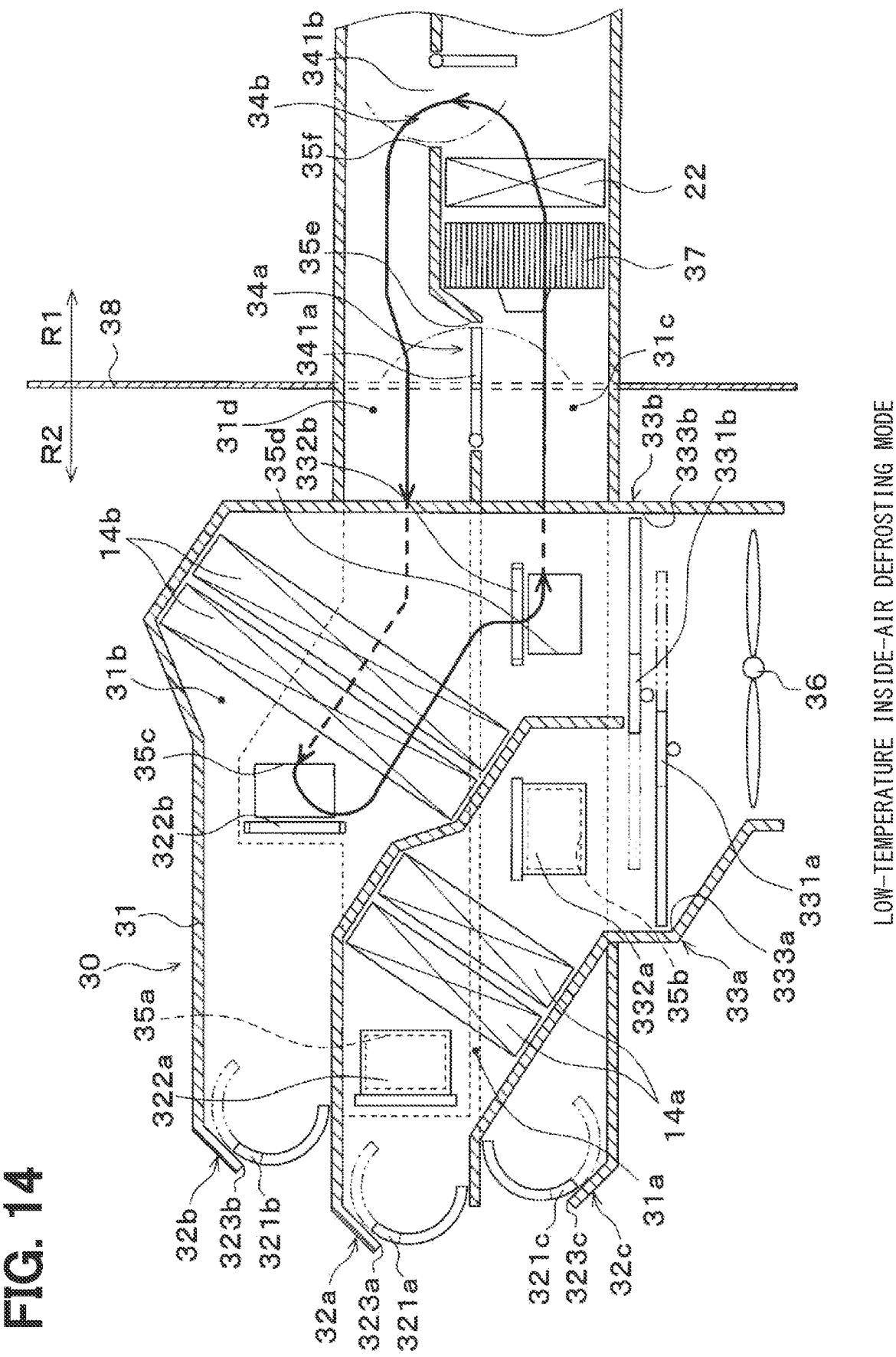
FIG. 14 is a schematic sectional view illustrating an airflow in a low-temperature inside-air defrosting mode of the air conditioning unit of the first embodiment.

The control device 40 controls the operation of the first inlet-side inside/outside air switch device 32a so as to close the first inside air introduction port 35a of the air conditioning unit 30. In the low-temperature inside-air defrosting mode, as illustrated in FIG. 14, the first inlet-side inside/outside air switch device 32a desirably closes the first outside air introduction port 323a but may open the first outside air introduction port 323a.

The control device 40 controls the operation of the first outlet-side inside/outside air switch device 33a so as to open the first interior outflow port 35b. In the low-temperature inside-air defrosting mode, as illustrated in FIG. 14, the first outlet-side inside/outside air switch device 33a desirably closes the first exterior outflow port 333a but may open the first exterior outflow port 333a.

The control device 40 controls the operation of the second inlet-side inside/outside air switch device 32b so as to close the second outside air introduction port 323b and open the second inside air introduction port 35c. That is, the second inlet-side inside/outside air switch device 32b makes a switch to the ventilation path that guides the inside air to the second heat exchanger 14b.

The control device 40 controls the operation of the second outlet-side inside/outside air switch device 33b so as to close the second exterior outflow port 333b and open the second interior outflow port 35d. That is, the second outlet-side inside/outside air switch device 33b makes a switch to the ventilation path that guides the air having passed through the second heat exchanger 14b into the vehicle interior.

The control device 40 controls the operation of the outside air introduction device 32c so as to close the third outside air introduction port 323c. The control device 40 controls the operation of the heating part inlet-side switch device 34a so as to close the heating part inlet-side opening portion 35e.

The control device 40 controls the operation of the heating part outlet-side switch device 34b so as to open the heating part outlet-side opening portion 35f. That is, the heating part outlet-side switch device 34b makes a switch to a ventilation path that allows the air heated in the heater core 22 to flow into the fourth air passage 31d side while bypassing the vehicle interior.

The control device 40 stops the blower 36. As in the inside-air cooling mode, the control device 40 controls the operation of the indoor blower 37.

Thus, in the heat pump cycle 10 in the low-temperature inside-air defrosting mode, the high-pressure refrigerant discharged from the compressor 11 flows into the refrigerant passage of the water-refrigerant heat exchanger 12. In the water-refrigerant heat exchanger 12, the heat medium is heated. The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

In the low-temperature inside-air defrosting mode, the air is not allowed to flow through the first heat exchanger 14a. Therefore, the refrigerant having flowed into the first heat exchanger 14a flows out of the first heat exchanger 14a almost without exchanging heat with air. The refrigerant having flowed out of the first heat exchanger 14a flows into the second heat exchanger 14b via the fully open second expansion valve 13b.

In the second heat exchanger 14b, the refrigerant radiates heat to the frost. Thereby, the frost melts, and the defrosting of the second heat exchanger 14b proceeds. The refrigerant having flowed out of the second heat exchanger 14b flows into the accumulator 15. The refrigerant having flowed into the accumulator 15 is separated into gas and liquid. The gas-phase refrigerant separated in the accumulator 15 is sucked into the compressor 11 and compressed again.

The heat medium circuit 20 in the low-temperature inside-air defrosting mode operates as in the inside-air heating mode.

In the air conditioning unit 30 in the low-temperature inside-air defrosting mode, air flows through each air passage as indicated by a thick arrow in FIG. 14.

Air having flowed through the fourth air passage 31d flows into the second air passage 31b via the second inside air introduction port 35c. The air having flowed into the second air passage 31b radiates heat to the frost. Accordingly, the defrosting of the second heat exchanger 14b proceeds. Further, the air having flowed into the second air passage 31b is cooled to near 0° C. by frost and dehumidified. The air having passed through the second heat exchanger 14b flows into the third air passage 31c via the second interior outflow port 35d.

The air having flowed into the third air passage 31c is sucked into the indoor blower 37 and blown to the heater core 22. The air having flowed into the heater core 22 exchanges heat with the heat medium and is reheated. At least a part of the air heated in the heater core 22 flows into the fourth air passage 31d without being blown into the vehicle interior because the heating part outlet-side switch device 34b opens the heating part outlet-side opening portion 35f.

The air having a relatively high temperature that has flowed into the fourth air passage 31d is guided again to the second air passage 31b via the second inside air introduction port 35c. This achieves defrosting of the second heat exchanger 14b.

As described above, according to the air conditioner 1 of the present embodiment, comfortable air conditioning in the vehicle interior can be achieved by switching the operation mode.

More specifically, in the second dehumidifying heating mode of the present embodiment, the first outlet-side inside/outside air switch device 33a makes a switch to the ventilation path that guides the air having passed through the first heat exchanger 14a into the vehicle interior. Further, the heater core 22 heats the air having passed through the first heat exchanger 14a. Therefore, dehumidification and heating in the vehicle interior can be performed by reheating the air, cooled and dehumidified in the first heat exchanger 14a, in the heater core 22 and guiding the air into the vehicle interior.

Further, in the second dehumidifying heating mode, the second inlet-side inside/outside air switch device 32b makes a switch to the ventilation path that guides outside air to the second heat exchanger 14b. The second outlet-side inside/outside air switch device 33b makes a switch to the ventilation path that guides the air having passed through the second heat exchanger 14b out of the vehicle interior. Hence the air can be reliably reheated in the heater core 22 by using the heat absorbed from the outside air by the refrigerant in the second heat exchanger 14b as a heat source.

However, in the second dehumidifying heating mode, there is a high possibility that frost forms on the second heat exchanger 14b as described above.

In contrast, in the normal defrosting mode of the present embodiment, the second inlet-side inside/outside air switch device 32b makes a switch to the ventilation path that guides the inside air to the second heat exchanger 14b. It is thus possible to defrost the second heat exchanger 14b by using the heat of inside air at a relatively high temperature.

At the same time, in the normal defrosting mode, the flow rate of the refrigerant flowing through the second heat exchanger 14b is reduced more than in the second dehumidifying heating mode, whereby the temperature of the refrigerant flowing through the second heat exchanger 14b is maintained within the reference defrosting temperature range. It is thus possible to effectively defrost the second heat exchanger 14b.

As a result, according to the air conditioner 1 of the present embodiment, it is possible to reduce energy consumed in the heat pump cycle 10 (specifically, electric power consumed by the compressor 11) for defrosting the second heat exchanger 14b.

In the normal defrosting mode of the present embodiment, the compressor 11 is operated, so that the refrigerant can be allowed to flow in the heat pump cycle 10, and the refrigerant can be allowed to flow in the second heat exchanger 14b. Accordingly, the temperature equalization of the second heat exchanger 14b is promoted in the normal defrosting mode, so that the second heat exchanger 14b can be defrosted more effectively.

Further, in the present embodiment, a tank-and-tube heat exchanger is adopted as the second heat exchanger 14b. The second heat exchanger 14b is disposed such that the longitudinal direction of the refrigerant tube has a component extending in the vertical direction. Accordingly, the defrosting can be promoted by dropping the melted frost downward. The defrosting time can then be shortened.

In the normal defrosting mode of the present embodiment, the second outlet-side inside/outside air switch device 33b makes a switch to the ventilation path that guides the air having passed through the second heat exchanger 14b into the vehicle interior. Therefore, the heater core 22 can reheat the air having passed through the second heat exchanger 14b to dehumidify and heat the vehicle interior.

At this time, in the normal defrosting mode, since the refrigerant discharge capacity of the compressor 11 is decreased, the heating capacity of the heat medium in the water-refrigerant heat exchanger 12 decreases. Hence there is a possibility that the air heating capacity of the heater core 22 also decreases temporarily.

In contrast, in the normal defrosting mode of the present embodiment, the heating of the air can be continued in the heater core 22 by using the heat stored in the heat medium circulating in the heat medium circuit 20. Accordingly, deterioration in the occupant's feeling of heating can be restricted in the normal defrosting mode.

As described in the flowchart of FIG. 12, the air conditioner 1 of the present embodiment continuously switches between the second dehumidifying heating mode and the normal defrosting mode. Therefore, dehumidification and heating in the vehicle interior can be continuously performed, and deterioration in the occupant's feeling of heating can further be restricted.

The air conditioner 1 of the present embodiment can operate in the cooling mode. In the cooling mode, the first inlet-side inside/outside air switch device 32a makes a switch to the ventilation path that guides outside air to the first heat exchanger 14a. The first outlet-side inside/outside air switch device 33a makes a switch to a ventilation path that guides the air having passed through the first heat exchanger 14a out of the vehicle interior.

Further, the second inlet-side inside/outside air switch device 32b makes a switch to the ventilation path that guides at least one of the inside air and the outside air to the second heat exchanger 14b. The second outlet-side inside/outside air switch device 33b makes a switch to the ventilation path that guides the air having passed through the second heat exchanger 14b into the vehicle interior. It is thus possible to cool the vehicle interior by guiding the air cooled in the first heat exchanger 14a into the vehicle interior.

The air conditioner 1 of the present embodiment includes the heating part outlet-side switch device 34b. In the low-temperature inside-air defrosting mode, the heating part outlet-side switch device 34b allows the air heated in the heater core 22 to flow into the second heat exchanger 14b of the second air passage 31b via the fourth air passage 31d.

Accordingly, even when the inside air temperature Tr is low and the second heat exchanger 14b cannot be defrosted using the heat of the inside air, the second heat exchanger 14b can be defrosted.

The air conditioner 1 of the present embodiment can operate in the ventilation heating mode. In the ventilation heating mode, the first inlet-side inside/outside air switch device 32a makes a switch to the ventilation path that guides the inside air to the first heat exchanger 14a. Further, the first outlet-side inside/outside air switch device 33a makes a switch to the ventilation path that guides the air having passed through the first heat exchanger 14a out of the vehicle interior.

Accordingly, the first heat exchanger 14a can cause the refrigerant to absorb the heat of inside air having a higher temperature than outside air. Therefore, the heating capacity of the blown air in the heater core 22 can be increased more than in the inside-air heating mode and the outside-air heating mode. In addition, the second heat exchanger 14b can reduce the amount of heat absorbed by the refrigerant from the outside air. It is thus possible to restrict frost from forming on the second heat exchanger 14b.

Further, in the present embodiment, the refrigerant evaporation temperature in the first heat exchanger 14a is regulated to a temperature lower than the inside air and not causing frost to form on the first heat exchanger 14a in the ventilation heating mode. Thus, the refrigerant can reliably absorb the heat of the inside air. Further, no frost is caused to form on first heat exchanger 14a.

The air conditioner 1 of the present embodiment includes the outside air introduction device 32c. Therefore, in the ventilation heating mode, the outside air introduction device 32c can make a switch to a ventilation path for introducing the outside air into the third air passage 31c. Further, the second outlet-side inside/outside air switch device 33b can make a switch to the ventilation path that guides the air having passed through the second heat exchanger 14b out of the vehicle interior.

Accordingly, the second heat exchanger 14b causes the refrigerant to absorb the heat of the outside air. Therefore, the heating capacity of the blown air can be further increased.

Second Embodiment

Figure 15:
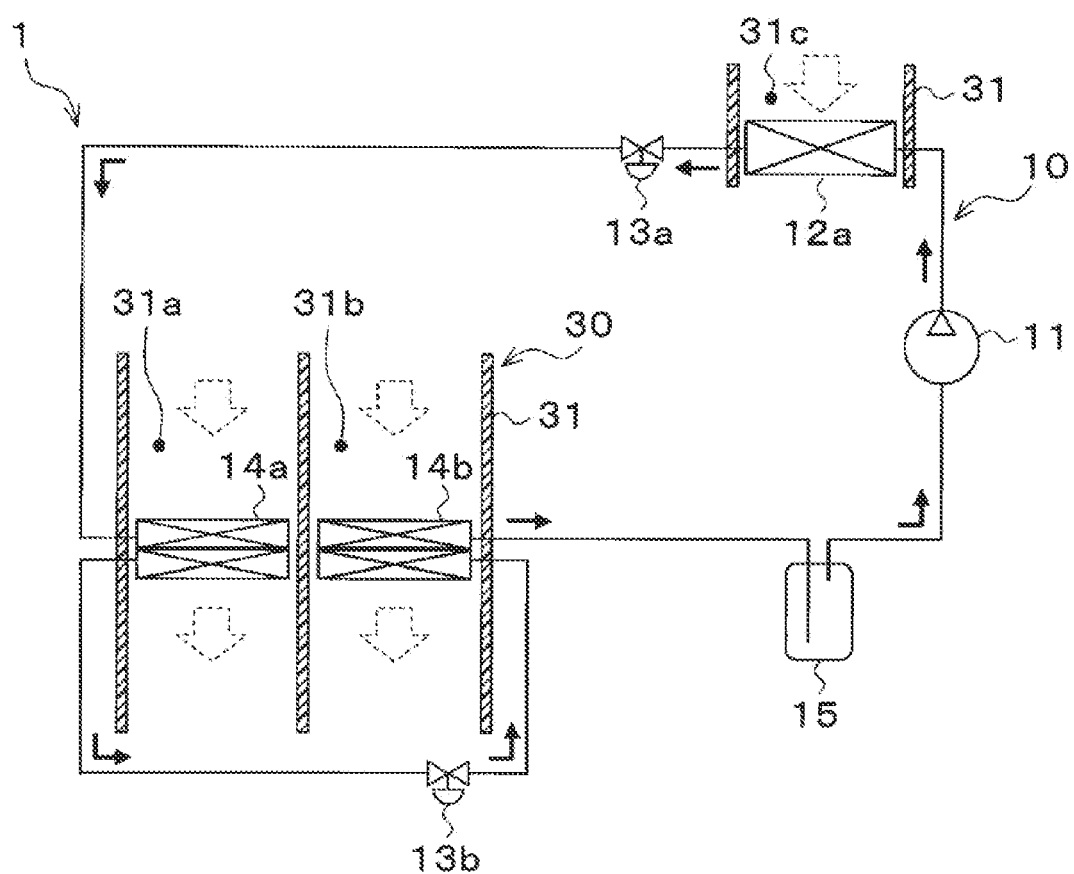
FIG. 15 is a schematic overall configuration diagram of an air conditioner according to a second embodiment.

In the present embodiment, as illustrated in FIG. 15, the configuration of the air conditioner 1 is changed with respect to the first embodiment. Specifically, in the air conditioner 1 of the present embodiment, the heat medium circuit 20 is eliminated. The heat pump cycle 10 of the present embodiment includes an interior condenser 12a instead of the water-refrigerant heat exchanger 12.

The interior condenser 12a exchanges heat between the high-pressure refrigerant discharged from the compressor 11 and air blown into the vehicle interior from the indoor blower 37. In the interior condenser 12a, the heat of the high-pressure refrigerant can be radiated to the air to heat the air.

Similarly to the heater core 22 described in the first embodiment, the interior condenser 12a is disposed in the third air passage 31c formed in the casing 31 of the air conditioning unit 30. That is, the interior condenser 12a of the present embodiment constitutes a heating part that heats air by using the high-pressure refrigerant as a heat source. The other configurations of the air conditioner 1 are similar to those of the first embodiment.

Next, the operation of the present embodiment having the above configuration will be described. The air conditioner 1 of the present embodiment can execute substantially the same heating mode, dehumidifying heating mode, and defrosting mode as in the first embodiment by exchanging heat between the refrigerant and air in the interior condenser 12a.

Therefore, in the air conditioner 1 of the present embodiment, similarly to the first embodiment, energy consumed in the heat pump cycle 10 for defrosting the second heat exchanger 14b can be reduced.

In the air conditioner 1 of the present embodiment, the heat medium circuit 20 is eliminated. Thus, when the second dehumidifying heating mode is switched to the normal defrosting mode, the air cannot be heated using the heat stored in the heat medium. For this reason, when the second dehumidifying heating mode and the normal defrosting mode are continuously switched, the occupant's feeling of heating may deteriorate.

In contrast, in the present embodiment, since the interior condenser 12a for directly exchanging heat between the refrigerant and the air is adopted, the immediate effect in heating the air in the vehicle interior is high. Therefore, by shortening the cycle of switching between the second dehumidifying heating mode and the normal defrosting mode, deterioration in the occupant's feeling of heating can be restricted.

Third Embodiment

Figure 16:
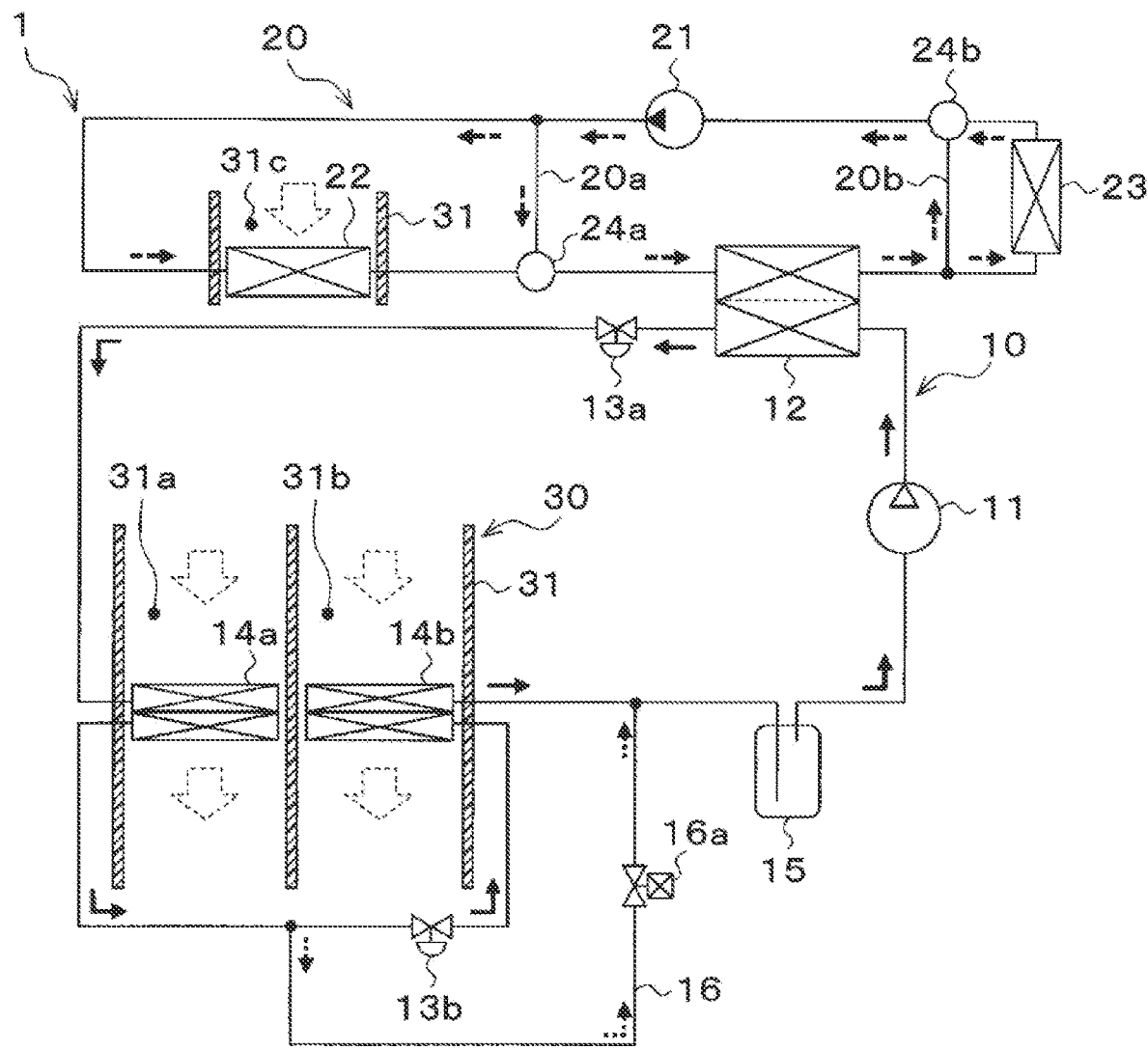
FIG. 16 is a schematic overall configuration diagram of an air conditioner according to a third embodiment.

In the present embodiment, as illustrated in FIG. 16, the configuration of the heat pump cycle 10 is changed with respect to the first embodiment. Specifically, the heat pump cycle 10 of the present embodiment includes a refrigerant bypass passage 16 and an on-off valve 16a.

The refrigerant bypass passage 16 is a refrigerant passage that guides the refrigerant having flowed out of the first heat exchanger 14a to the inlet side of the accumulator 15 while allowing the refrigerant to bypass the second expansion valve 13b and the second heat exchanger 14b. The on-off valve 16a is an electromagnetic valve that opens and closes the refrigerant bypass passage 16. The operation of the on-off valve 16a is controlled by a control voltage output from the control device 40. The other configurations of the air conditioner 1 are similar to those of the first embodiment.

Next, the operation of the present embodiment having the above configuration will be described. In the air conditioner 1 of the present embodiment, the control device 40 closes the on-off valve 16a, so that the cooling mode, the heating mode, the dehumidifying heating mode, and the defrosting mode similar to those of the first embodiment can be executed. Further, in the present embodiment, the heat-absorption defrosting mode can be executed by the control device 40 opening the on-off valve 16a. The heat-absorption defrosting mode will be described below.

(d-3) Heat-Absorption Defrosting Mode

In the heat-absorption defrosting mode, the control device 40 controls the operation of compressor 11 of the heat pump cycle 10 as in the second dehumidifying heating mode. The control device 40 brings the first expansion valve 13a into the throttling state. More specifically, the control device 40 controls the operation of the first expansion valve 13a such that the refrigerant evaporating pressure in the first heat exchanger 14a is lower than the outside air temperature Tam.

The control device 40 brings the second expansion valve 13b into a fully closed state. The control device 40 opens the on-off valve 16a.

As in the normal defrosting mode, the control device 40 controls the operations of the heat medium pump 21, the first flow rate control valve 24a, and the second flow rate control valve 24b of the heat medium circuit 20.

The control device 40 controls the operation of the first inlet-side inside/outside air switch device 32a so as to open the first outside air introduction port 323a of the air conditioning unit 30 and close the first inside air introduction port 35a. That is, the first inlet-side inside/outside air switch device 32a makes a switch to the ventilation path that guides outside air to the first heat exchanger 14a.

The control device 40 controls the operation of the first outlet-side inside/outside air switch device 33a so as to open the first exterior outflow port 333a and close the first interior outflow port 35b. That is, the first outlet-side inside/outside air switch device 33a makes a switch to the ventilation path that guides the air having passed through the first heat exchanger 14a out of the vehicle interior.

As in the normal defrosting mode, the control device 40 controls the operations of the second inlet-side inside/outside air switch device 32b and the second outlet-side inside/outside air switch device 33b. As in the inside-air cooling mode, the control device 40 controls the operations of the outside air introduction device 32c, the heating part inlet-side switch device 34a, and the heating part outlet-side switch device 34b. As in the inside-air cooling mode, the control device 40 controls the operations of the blower 36 and the indoor blower 37.

Accordingly, in the heat pump cycle 10 in the heat-absorption defrosting mode, the high-pressure refrigerant discharged from the compressor 11 flows into the refrigerant passage of the water-refrigerant heat exchanger 12. In the water-refrigerant heat exchanger 12, the heat medium is heated. The refrigerant having flowed out of the refrigerant passage of the water-refrigerant heat exchanger 12 flows into the first expansion valve 13a and is decompressed. The low-pressure refrigerant decompressed in the first expansion valve 13a flows into the first heat exchanger 14a.

The refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the refrigerant absorbs heat from the air and evaporates.

With the on-off valve 16a being open, the refrigerant having flowed out of the first heat exchanger 14a flows into the accumulator 15 via the refrigerant bypass passage 16. The refrigerant having flowed into the accumulator 15 is separated into gas and liquid. The gas-phase refrigerant separated in the accumulator 15 is sucked into the compressor 11 and compressed again.

The heat medium circuit 20 in the heat-absorption defrosting mode operates as in the normal defrosting mode.

Figure 17:
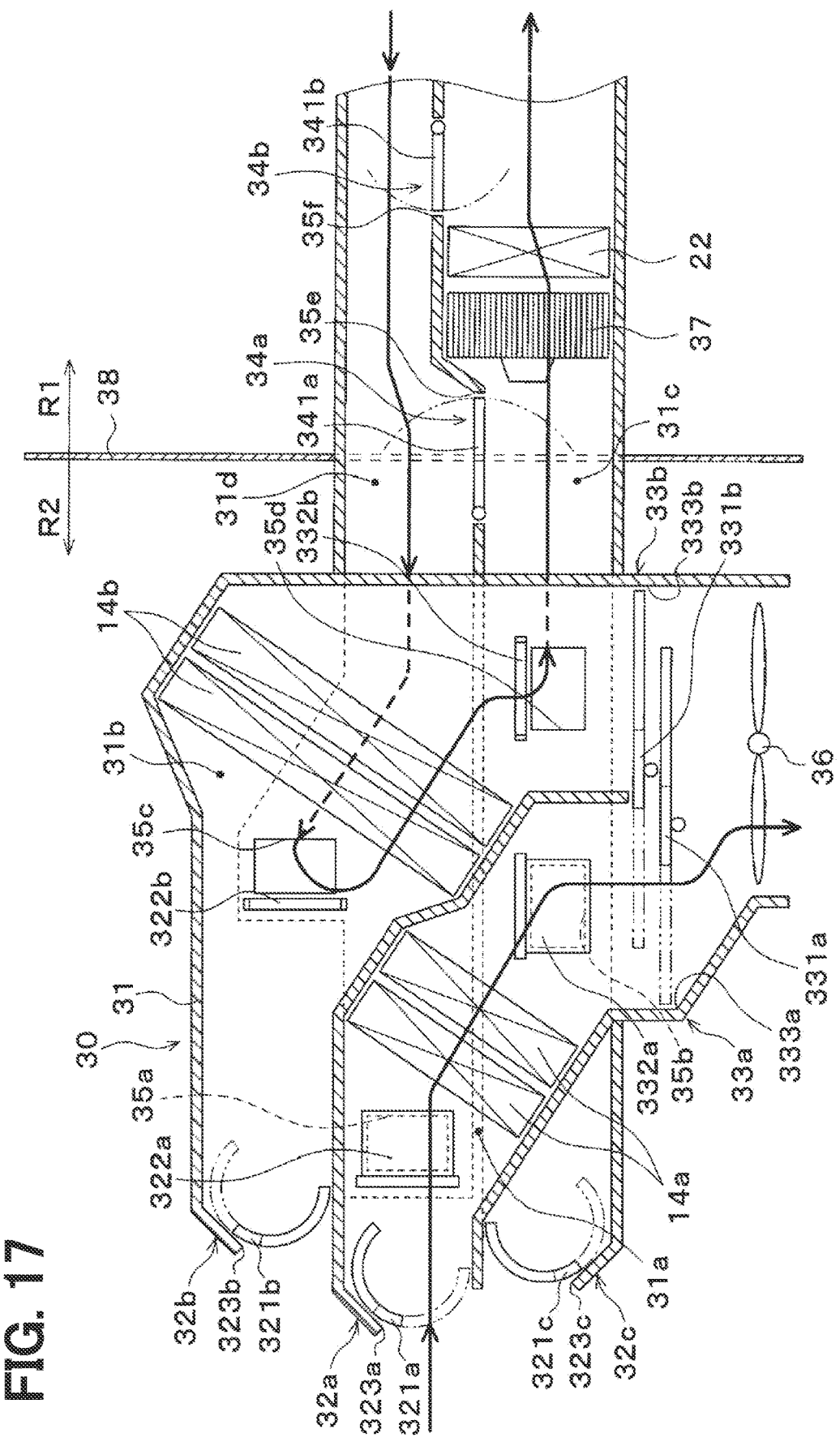
FIG. 17 is a schematic sectional view illustrating an airflow in a heat-absorption defrosting mode of an air conditioning unit of the third embodiment.

In the air conditioning unit 30 in the heat-absorption defrosting mode, air flows through each air passage as indicated by a thick arrow in FIG. 17.

Air (specifically, outside air) flows into the first air passage 31a via the first outside air introduction port 323a. As in the inside-air heating mode, the air having flowed into the first air passage 31a is heated in the first heat exchanger 14a and released out of the vehicle interior.

Air (specifically, inside air) having flowed through the fourth air passage 31d flows into the second air passage 31b via the second inside air introduction port 35c. The relatively high-temperature inside air having flowed into the second air passage 31b radiates heat to frost. Thereby, the frost melts, and the defrosting of the second heat exchanger 14b proceeds. Further, the air having flowed into the second air passage 31b is cooled to near 0° C. by frost and dehumidified. The air having passed through the second heat exchanger 14b flows into the third air passage 31c via the second interior outflow port 35d.

The air having flowed into the third air passage 31c is sucked into the indoor blower 37 and blown to the heater core 22. The air having flowed into the heater core 22 exchanges heat with the heat medium and is reheated. The air reheated in the heater core 22 is blown into the vehicle interior. This achieves defrosting of the second heat exchanger 14b and dehumidifying and heating in the vehicle interior.

The air conditioner 1 of the present embodiment operates as described above, so that energy consumed in the heat pump cycle 10 for defrosting the second heat exchanger 14b can be reduced as in the first embodiment.

Further, the air conditioner 1 of the present embodiment can operate in the heat-absorption defrosting mode. In the heat-absorption defrosting mode, the heat medium can be heated in the water-refrigerant heat exchanger 12 by using the heat absorbed by the refrigerant from the outside air in the first heat exchanger 14a as a heat source. Therefore, in the heat-absorption defrosting mode, it is possible to restrict a decrease in the heating capacity of the heat medium as compared with the normal defrosting mode, and it is possible to further restrict deterioration in the occupant's feeling of heating.

In the heat-absorption defrosting mode, the refrigerant evaporation temperature in the first heat exchanger 14a may be 0° C. or lower. Therefore, in the heat-absorption defrosting mode, frost may form in the first heat exchanger 14a. Therefore, the mode may be switched from the heat-absorption defrosting mode to the normal defrosting mode in an operating condition in which frost forms on the first heat exchanger 14a before the defrosting of the second heat exchanger 14b is completed.

Fourth Embodiment

Figure 18:
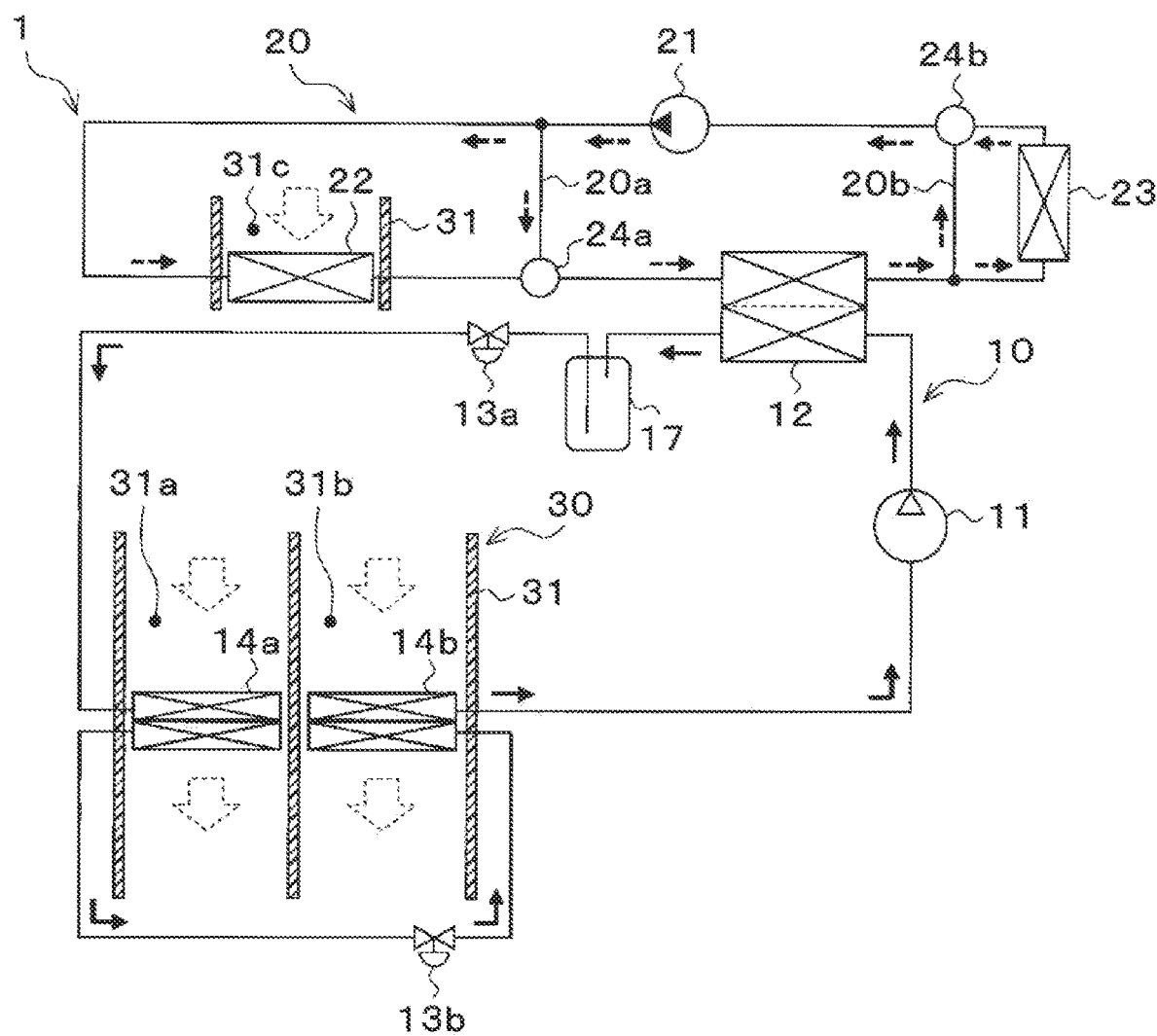
FIG. 18 is a schematic overall configuration diagram of an air conditioner according to a fourth embodiment.

In the present embodiment, as illustrated in FIG. 18, the configuration of the heat pump cycle 10 is changed with respect to the first embodiment. Specifically, in the heat pump cycle 10 of the present embodiment, a receiver 17 is provided instead of the accumulator 15.

The receiver 17 is disposed in a refrigerant flow path from an outlet of a refrigerant passage of the water-refrigerant heat exchanger 12 to an inlet of the first expansion valve 13a. The receiver 17 is a high-pressure liquid storage that separates the refrigerant having flowed out of the refrigerant passage of the water-refrigerant heat exchanger 12 into gas and liquid and stores the separated liquid-phase refrigerant into the cycle as a surplus refrigerant. The other configurations of the air conditioner 1 are similar to those of the first embodiment.

Next, the operation of the present embodiment having the above configuration will be described. In the present embodiment, in each operation mode, the throttle opening of at least one of the first expansion valve 13a and the second expansion valve 13b is regulated such that the degree of superheating of the refrigerant on the outlet side of the second heat exchanger 14b becomes a predetermined reference degree of superheating (3° C. in the present embodiment). The other basic operations are similar to those of the first embodiment. Accordingly, the air conditioner 1 of the present embodiment can execute substantially the same heating mode, dehumidifying heating mode, and defrosting mode as those of the first embodiment.

In the inside-air cooling mode or the outside-air cooling mode, the control device 40 brings the first expansion valve 13a into the fully open state. The control device 40 brings the second expansion valve 13b into a throttling state where a refrigerant decompressing action is exerted. At this time, the control device 40 controls the operation of the second expansion valve 13b such that the degree of superheating of the refrigerant on the outlet side of the second heat exchanger 14b approaches the reference degree of superheating.

Thus, in the heat pump cycle 10 in the inside-air cooling mode or the outside-air cooling mode, the high-pressure refrigerant discharged from the compressor 11 radiates heat to the heat medium and condenses in the water-refrigerant heat exchanger 12 as in the first embodiment. Thereby, the heat medium is heated.

The refrigerant having flowed out of the refrigerant passage of the water-refrigerant heat exchanger 12 flows into the receiver 17 and is separated into gas and liquid. A part of the liquid-phase refrigerant separated in the receiver 17 flows into the first heat exchanger 14a via the first expansion valve 13a.

The liquid-phase refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the liquid-phase refrigerant is supercooled. The refrigerant having flowed out of the first heat exchanger 14a flows into the second expansion valve 13b and is decompressed. The low-pressure refrigerant decompressed in the second expansion valve 13b flows into the second heat exchanger 14b.

The refrigerant having flowed into the second heat exchanger 14b exchanges heat with the air having flowed into the second air passage 31b of the air conditioning unit 30. In the second heat exchanger 14b, the refrigerant absorbs heat from the air and evaporates. Accordingly, the air flowing through the second air passage 31b is cooled. Further, the refrigerant on the outlet side of the second heat exchanger 14b becomes a gas-phase refrigerant having a degree of superheating.

The gas-phase refrigerant having the degree of superheating having flowed out of the second heat exchanger 14b is sucked into the compressor 11 and compressed again.

The heat medium circuit 20 and the air conditioning unit 30 operate as in the first embodiment. Thus, in the air conditioning unit 30, the air cooled in the second heat exchanger 14b is blown into the vehicle interior as in the first embodiment. This achieves cooling in the vehicle interior.

The air conditioner 1 of the present embodiment operates as described above, so that energy consumed in the heat pump cycle 10 for defrosting the second heat exchanger 14b can be reduced as in the first embodiment.

Further, in the air conditioner 1 of the present embodiment, the refrigerant can be supercooled in the first heat exchanger 14a in the inside-air cooling mode or the outside-air cooling mode. It is thus possible to increase an enthalpy difference obtained by subtracting the enthalpy of the refrigerant on the outlet side of the second heat exchanger 14b from the enthalpy of the refrigerant on the inlet side. As a result, the cooling capacity of the air in the second heat exchanger 14b can be improved.

Fifth Embodiment

Figure 19:
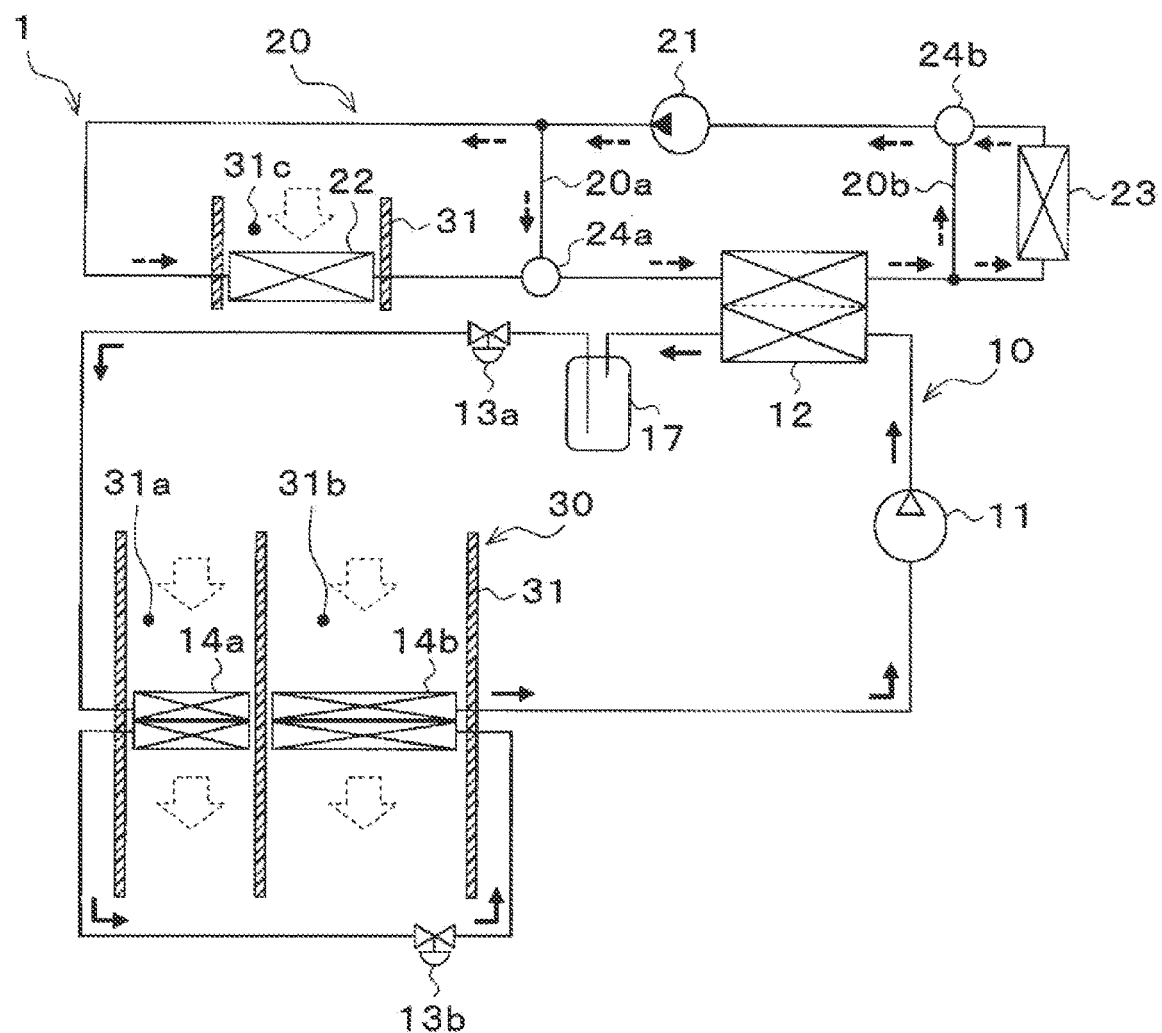
FIG. 19 is a schematic overall configuration diagram of an air conditioner according to a fifth embodiment.

In the present embodiment, as illustrated in FIG. 19, the configuration of the heat pump cycle 10 is changed with respect to the fourth embodiment.

In the heat pump cycle 10 of the present embodiment, the first heat exchanger 14a and the second heat exchanger 14b having different heat exchange capacities are adopted. More specifically, as the first heat exchanger 14a and the second heat exchanger 14b, those having different heat exchange areas are adopted. In the present embodiment, the heat exchange area of the first heat exchanger 14a is smaller than the heat exchange area of the second heat exchanger 14b.

The heat exchange area in the heat exchanger means the front surface area (i.e., projected area) of the heat exchange core portion when viewed from the airflow direction. In the heat exchanger, the heat exchange performance is improved with a decrease in the heat exchange area. The heat exchange areas of the first heat exchanger 14a and the second heat exchanger 14b of the present embodiment are formed in a rectangular shape. The other configurations and operations of the air conditioner 1 are similar to those of the first embodiment.

Next, the operation of the present embodiment having the above configuration will be described. The air conditioner 1 of the present embodiment can execute a cooling mode, a heating mode, a dehumidifying heating mode, and a defrosting mode similar to those of the first embodiment. Therefore, in the air conditioner 1 of the present embodiment, similarly to the first embodiment, energy consumed in the heat pump cycle 10 for defrosting the second heat exchanger 14b can be reduced.

Further, in the air conditioner 1 of the present embodiment, the amount of heat absorbed by the refrigerant in the second heat exchanger 14b having a large heat exchange area can be increased in the operation mode in which the refrigerant absorbs heat from low-temperature outside air in the second heat exchanger 14b. Specifically, in the inside-air heating mode, the outside-air heating mode, the ventilation heating mode, and the second dehumidifying heating mode, the amount of heat absorbed by the refrigerant in the second heat exchanger 14b can be increased to increase the heating capacity in the vehicle interior.

In the first dehumidifying heating mode, the refrigerant absorbs heat from the outside air in the first heat exchanger 14a. The first dehumidifying heating mode is an operation mode executed when the outside air temperature Tam is higher than that in the second dehumidifying heating mode or the like, and hence the amount of heat required for reheating the air is smaller than that in the second dehumidifying heating mode or the like. Therefore, even when the heat exchange area of the first heat exchanger 14a is small in the first dehumidifying heating mode, the heating capacity in the vehicle interior is not insufficient.

In the air conditioner 1 of the present embodiment, the liquid-phase refrigerant is supercooled in the first heat exchanger 14a in the inside-air cooling mode or the outside-air cooling mode as in the fourth embodiment. In the present embodiment, the heat exchange area of the first heat exchanger 14a is smaller than the heat exchange area of the second heat exchanger 14b. Therefore, the amount of liquid-phase refrigerant stored in the first heat exchanger 14a can be reduced, and the amount of refrigerant sealed in the heat pump cycle 10 can be reduced.

Sixth Embodiment

Figure 20:
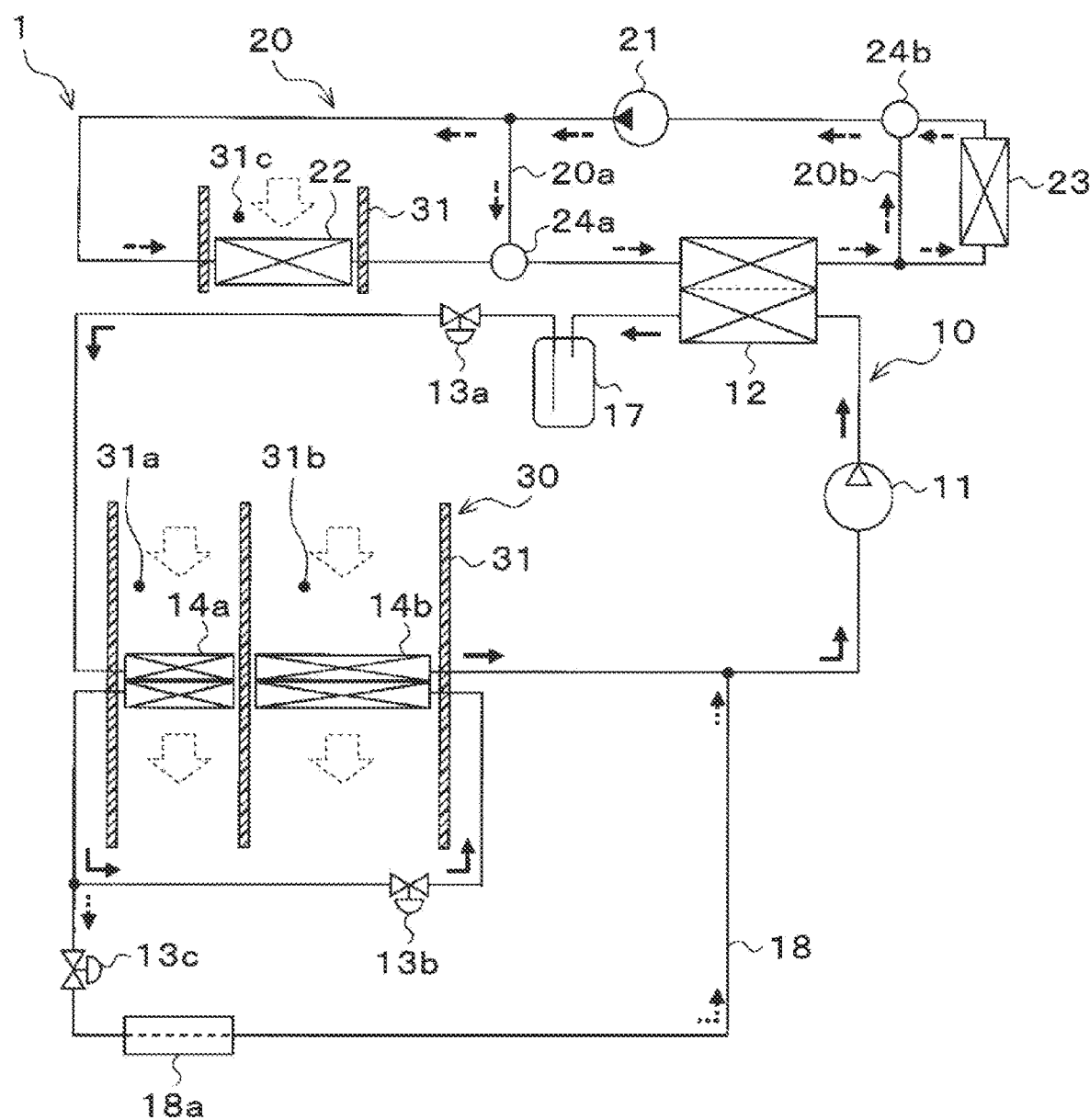
FIG. 20 is a schematic overall configuration diagram of an air conditioner according to a sixth embodiment.

In the present embodiment, as illustrated in FIG. 20, the configuration of the heat pump cycle 10 is changed with respect to the fifth embodiment. Specifically, the heat pump cycle 10 of the present embodiment includes a third expansion valve 13c, a cooling bypass passage 18, and a cooler 18a.

The cooling bypass passage 18 is a refrigerant passage that guides the refrigerant having flowed out of the first heat exchanger 14a to the suction side of the compressor 11 while allowing the refrigerant to bypass the second expansion valve 13b and the second heat exchanger 14b.

The third expansion valve 13c is a third decompression part that decompresses the refrigerant having flowed out of the refrigerant passage of the first heat exchanger 14a. The third expansion valve 13c is disposed in the cooling bypass passage 18. The third expansion valve 13c is a second flow rate regulating part that regulates the flow rate of the refrigerant allowed to flow the cooler 18a. The basic configuration of the third expansion valve 13c is similar to those of the first expansion valve 13a and the second expansion valve 13b.

The cooler 18a exchanges heat between the refrigerant decompressed in the third expansion valve 13c and a cooling target. The cooler 18a can cool the cooling target by evaporating the refrigerant to exert a heat absorbing action. The cooling target of the present embodiment is a battery that supplies electric power to an electric motor or the like.

The battery of the present embodiment is an assembled battery formed by electrically connecting a plurality of battery cells in series or in parallel. The battery cell is a chargeable/dischargeable secondary battery (a lithium-ion battery in the present embodiment). The battery is a battery in which a plurality of battery cells are stacked and arranged in a substantially rectangular parallelepiped shape and housed in a dedicated case.

The cooler 18a is formed integrally with the dedicated case for the battery by forming a refrigerant passage in the dedicated case. The other configurations of the air conditioner 1 are similar to those of the first embodiment.

Next, the operation of the present embodiment having the above configuration will be described. In the air conditioner 1 of the present embodiment, the control device 40 brings the third expansion valve 13c into the fully closed state, so that the cooling mode, the heating mode, the dehumidifying heating mode, and the defrosting mode similar to those of the first embodiment can be executed.

Therefore, in the air conditioner 1 of the present embodiment, similarly to the first embodiment, energy consumed in the heat pump cycle 10 for defrosting the second heat exchanger 14b can be reduced.

Further, in the air conditioner 1 of the present embodiment, by the control device 40 bringing the third expansion valve 13c into the throttling state in the inside-air cooling mode or the outside-air cooling mode, the battery, which is the cooling target, can be cooled.

Seventh Embodiment

Figure 21:
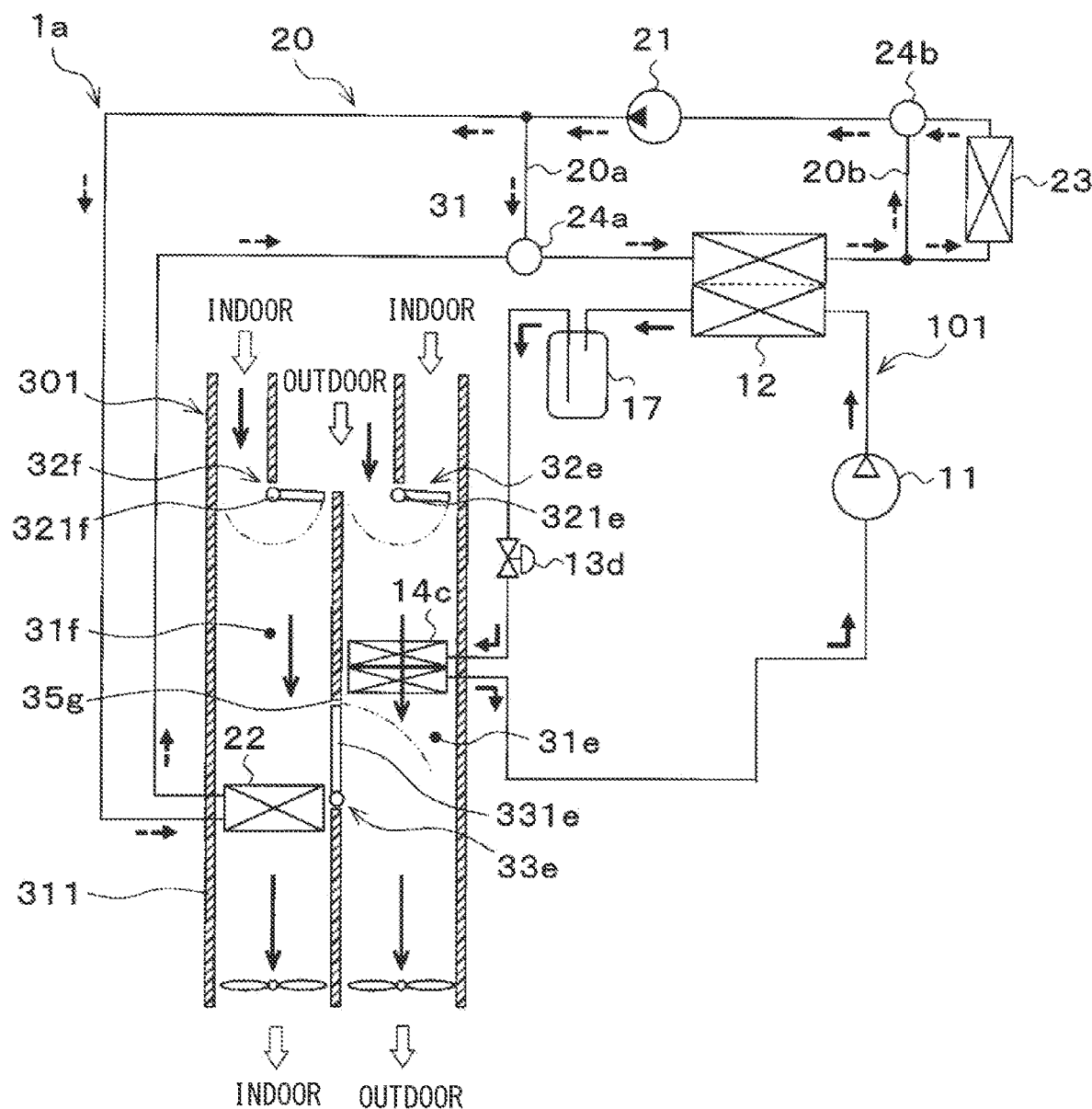
FIG. 21 is a schematic overall configuration diagram illustrating an airflow in an inside-air heating mode of an air conditioner of a seventh embodiment.

An air conditioner 1a for a vehicle will be described with reference to FIGS. 21 to 23. The air conditioner 1a includes a heat pump cycle 101, a heat medium circuit 20, an air conditioning unit 301, a control device 40, and the like. As illustrated in FIG. 21 and the like, the heat pump cycle 101 of the present embodiment includes a compressor 11, a water-refrigerant heat exchanger 12, a receiver 17, an expansion valve 13d, a heat exchanger 14c, and the like.

The expansion valve 13d is a decompression part that decompresses the liquid-phase refrigerant flowing out of the receiver 17. The expansion valve 13d is a flow rate regulating part that regulates the flow rate of the refrigerant flowing out to the downstream side. The basic configuration of the expansion valve 13d is similar to those of the first expansion valve 13a and the like.

The refrigerant inlet side of the heat exchanger 14c is connected to the outlet of the expansion valve 13d. The heat exchanger 14c is a heat exchange part that exchanges heat between the refrigerant having flowed out of the expansion valve 13d and air. The basic configuration of the heat exchanger 14c is similar to those of the first heat exchanger 14a and the like. The suction port side of the compressor 11 is connected to the refrigerant outlet of the heat exchanger 14c.

The other configurations of the heat pump cycle 10 are similar to those of the heat pump cycle 10 described in the first embodiment. The heat medium circuit 20 of the present embodiment is similar to the heat medium circuit 20 described in the first embodiment. The heater core 22 of the present embodiment is disposed in a heating part-side air passage 31f formed in a casing 311 of the air conditioning unit 301.

Next, the air conditioning unit 301 will be described. The air conditioning unit 301 includes the casing 311 as in the first embodiment. Inside the casing 311, a heat exchange part-side air passage 31e and the heating part-side air passage 31f are formed. The heat exchange part-side air passage 31e and the heating part-side air passage 31f are at least partially disposed adjacent to each other.

The heat exchanger 14c is disposed in the heat exchange part-side air passage 31e. Therefore, the heat exchange part-side air passage 31e is an air passage through which the air flowing into the heat exchanger 14c and the air having passed through the heat exchanger 14c are allowed to flow.

A heat exchange part inlet-side inside/outside air switch device 32e, which is a heat exchange part inlet-side inside/outside air switching part, is disposed on the airflow most upstream side of the heat exchange part-side air passage 31e. The heat exchange part inlet-side inside/outside air switch device 32e switches between a ventilation path that guides inside air to the inlet side of the heat exchanger 14c and a ventilation path that guides outside air to the inlet side of the heat exchanger 14c, as air allowed to flow into the heat exchanger 14c.

The heat exchange part inlet-side inside/outside air switch device 32e includes a heat exchange part inlet-side door 321e. The heat exchange part inlet-side door 321e continuously changes an opening ratio between an outside air introduction port for introducing outside air into the heat exchange part-side air passage 31e and an inside air introduction port for introducing inside air into the heat exchange part-side air passage 31e.

The heat exchange part inlet-side door 321e is driven by a heat exchange part inlet-side electric actuator (not illustrated). The operation of the heat exchange part inlet-side electric actuator is controlled by a control signal output from the control device 40.

A heat exchange part outlet-side inside/outside air switch device 33e, which is a heat exchange part outlet-side inside/outside air switching part, is disposed on the airflow downstream side of the heat exchanger 14c in the heat exchange part-side air passage 31e. The heat exchange part outlet-side inside/outside air switch device 33e is disposed at a portion partitioning the heat exchange part-side air passage 31e and the heating part-side air passage 31f of the casing 311.

The heat exchange part outlet-side inside/outside air switch device 33e switches between a ventilation path that guides the air having passed through the heat exchanger 14c to the vehicle interior via the heating part-side air passage 31f and a ventilation path that guides the air having passed through the heat exchanger 14c to the vehicle exterior.

The heat exchange part outlet-side inside/outside air switch device 33e includes a heat exchange part outlet-side door 331e. The heat exchange part outlet-side door 331e continuously changes an opening of a heat exchange part outlet-side opening portion 35g. The heat exchange part outlet-side opening portion 35g allows the heat exchange part-side air passage 31e and the heating part-side air passage 31f to communicate with each other.

The heat exchange part outlet-side opening portion 35g is formed in a portion of the heating part-side air passage 31f on the airflow upstream side of the heater core 22. Therefore, the heater core 22 is disposed to be able to heat the air having passed through the heat exchanger 14c and having flowed into the heating part-side air passage 31f from the heat exchange part outlet-side opening portion 35g.

The heat exchange part outlet-side door 331e is coupled to a heating part inlet-side electric actuator (not illustrated). The heat exchange part outlet-side door 331e is driven by the heat exchange part inlet-side electric actuator. The operation of the heat exchange part inlet-side electric actuator is controlled by a control signal output from the control device 40.

The heater core 22 is disposed in the heating part-side air passage 31f. Hence the heating part-side air passage 31f is an air passage through which the air flowing into the heater core 22 and the air having passed through the heater core 22 are allowed to flow.

A heating part inlet-side inside/outside air switch device 32f, which is a heating part inlet-side inside/outside air switching part, is disposed on the airflow most upstream side of the heating part-side air passage 31f. The heating part inlet-side inside/outside air switch device 32f switches between a ventilation path that guides inside air to the inlet side of the heater core 22 and a ventilation path that guides outside air to the inlet side of the heater core 22, as air allowed to flow into the heater core 22.

The heating part inlet-side inside/outside air switch device 32f includes a heating part inlet side door 321f. The heating part inlet side door 321f continuously changes an opening ratio between an outside air introduction port for introducing outside air into the heating part-side air passage 31f and an inside air introduction port for introducing inside air into the heating part-side air passage 31f.

The heating part inlet side door 321f is driven by a heating part inlet-side electric actuator (not illustrated). The operation of the heating part inlet-side electric actuator is controlled by a control signal output from the control device 40.

Similarly to the air conditioning unit 30 of the first embodiment, a face opening hole, a foot opening hole, and a defroster opening hole (not illustrated) are formed on the downstream side of the heater core 22 in the heating part-side air passage 31f of the casing 311. A blower 36 similar to that of the first embodiment is disposed on the downstream side of each exterior outflow port of the casing 311. An indoor blower 37 similar to that of the first embodiment is disposed on the downstream side of the interior outflow port of the casing 311.

The other basic configuration of the air conditioner 1a is similar to that of the air conditioner 1 described in the first embodiment.

Next, the operation of the air conditioner 1a of the present embodiment having the above configuration will be described. The air conditioner 1a can switch operation modes of a heating mode and a defrosting mode in order to perform air conditioning in the vehicle interior.

(b) Heating Mode

The air conditioner 1a can switch between the inside-air heating mode and the outside-air heating mode as the heating mode.

(b-1) Inside-Air Heating Mode

In the inside-air cooling mode, the control device 40 operates the compressor 11 of the heat pump cycle 10. More specifically, as in the inside-air heating mode of the first embodiment, the refrigerant discharge capacity of the compressor 11 is controlled such that the high pressure Pd approaches the target high pressure PDO. As in the fourth embodiment, the control device 40 regulates the throttle opening of the expansion valve 13d such that the degree of superheating of the refrigerant on the outlet side of the heat exchanger 14c becomes the reference degree of superheating.

The control device 40 operates the heat medium pump 21 of the heat medium circuit 20 so as to exhibit a predetermined reference pumping capacity. As in the inside-air heating mode of the first embodiment, the control device 40 controls the operations of the first flow rate control valve 24a and the second flow rate control valve 24b.

The control device 40 controls the operation of the heat exchange part inlet-side inside/outside air switch device 32e to make a switch to a ventilation path that guides outside air to the heat exchanger 14c. The control device 40 controls the operation of the heat exchange part outlet-side inside/outside air switch device 33e to make a switch to a ventilation path that guides the air having passed through the heat exchanger 14c out of the vehicle interior. The control device 40 controls the operation of the heating part inlet-side inside/outside air switch device 32f to make a switch to a ventilation path that guides the inside air to the heater core 22.

As in the inside-air heating mode of the first embodiment, the control device 40 controls the operations of the blower 36 and the indoor blower 37.

Thus, in the heat pump cycle 101 in the inside-air heating mode, the high-pressure refrigerant discharged from the compressor 11 flows into the refrigerant passage of the water-refrigerant heat exchanger 12. The high-pressure refrigerant having flowed into the refrigerant passage of the water-refrigerant heat exchanger 12 exchanges heat with the heat medium flowing through the heat medium passage. In the water-refrigerant heat exchanger 12, the refrigerant radiates heat to the heat medium and condenses. Thereby, the heat medium is heated.

The refrigerant having flowed out of the refrigerant passage of the water-refrigerant heat exchanger 12 flows into the receiver 17 and is separated into gas and liquid. A part of the liquid-phase refrigerant separated in the receiver 17 flows into the expansion valve 13d and is decompressed. The low-pressure refrigerant decompressed in expansion valve 13d flows into heat exchanger 14c.

The refrigerant having flowed into the heat exchanger 14c exchanges heat with the air (specifically, outside air) having flowed into the heat exchange part-side air passage 31e. In the heat exchanger 14c, the refrigerant absorbs heat from the air and evaporates. The gas-phase refrigerant having the degree of superheating having flowed out of the heat exchanger 14c is sucked into the compressor 11 and compressed again.

The heat medium circuit 20 in the inside-air heating mode operates as in the inside-air heating mode in the first embodiment.

In the air conditioning unit 301 in the inside-air heating mode, air flows through each air passage as indicated by a thick arrow in FIG. 21.

The heat exchange part inlet-side inside/outside air switch device 32e allows outside air to flow into the heat exchange part-side air passage 31e. The air having flowed into the heat exchange part-side air passage 31e exchanges heat with the refrigerant in the heat exchanger 14c and absorbs the heat. The air cooled in the heat exchanger 14c is guided to the suction side of the blower 36 by the heat exchange part outlet-side inside/outside air switch device 33e and released out of the vehicle interior.

The heating part inlet-side inside/outside air switch device 32f allows inside air to flow into the heating part-side air passage 31f. The air having flowed into the heating part-side air passage 31f exchanges heat with the heat medium in the heater core 22 and is heated. The air heated in the heater core 22 is sucked into the indoor blower 37 and blown into the vehicle interior. This achieves heating in the vehicle interior.

In the inside-air heating mode, the inside air is circulated and blown to be heated in the heater core 22. Thus, by making a switch to the inside-air heating mode immediately after the start of heating, the vehicle interior can be expected to be heated rapidly.

(b-2) Outside-Air Heating Mode

In the outside-air heating mode, the control device 40 controls the operations of the compressor 11 and the expansion valve 13d of the heat pump cycle 10 as in the inside-air heating mode. As in the inside-air heating mode, the control device 40 controls the operations of the heat medium pump 21, the first flow rate control valve 24a, and the second flow rate control valve 24b of the heat medium circuit 20.

As in the inside-air heating mode, the control device 40 controls the operations of the heat exchange part inlet-side inside/outside air switch device 32e and the heat exchange part outlet-side inside/outside air switch device 33e of the air conditioning unit 30. As in the inside-air heating mode, the control device 40 controls the operations of the blower 36 and the indoor blower 37.

Accordingly, the heat pump cycle 10 and the heat medium circuit 20 in the outside-air heating mode operate as in the inside-air heating mode described above.

Figure 22:
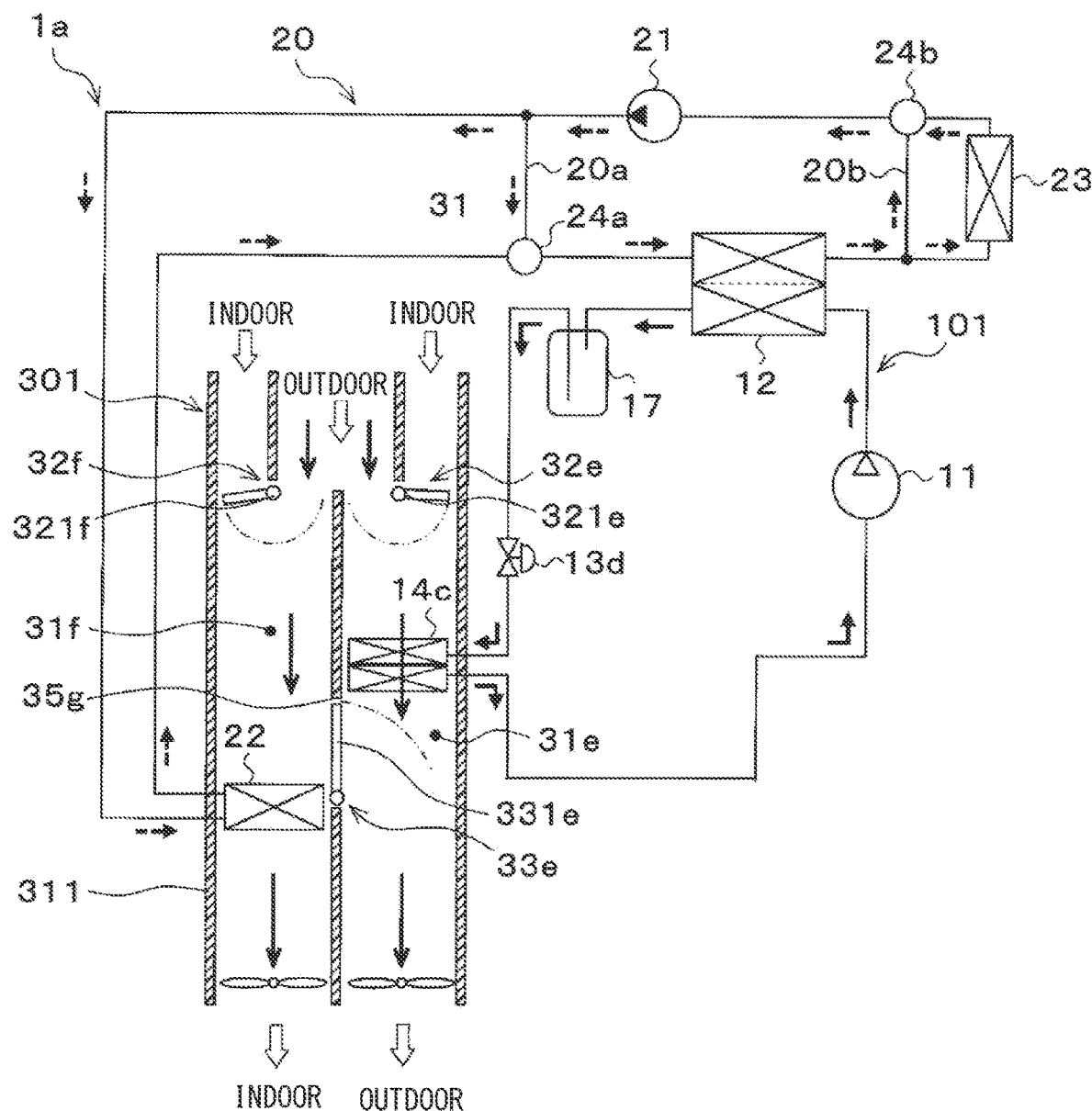
FIG. 22 is a schematic overall configuration diagram illustrating an airflow in an outside-air heating mode of the air conditioner of the seventh embodiment.

In the air conditioning unit 301 in the outside-air heating mode, air flows through each air passage as indicated by a thick arrow in FIG. 22.

As in the inside-air heating mode, outside air flows into the heat exchange part-side air passage 31e. The air having flowed into the heat exchange part-side air passage 31e is cooled in the heat exchanger 14c and released out of the vehicle interior as in the inside-air heating mode.

The heating part inlet-side inside/outside air switch device 32f allows outside air to flow into the heating part-side air passage 31f. The air having flowed into the heating part-side air passage 31f is heated in the heater core 22 as in the inside-air heating mode. The air heated in the heater core 22 is sucked into the indoor blower 37 and blown into the vehicle interior. This achieves heating in the vehicle interior.

In the heat pump cycle 10 in the heating mode, the refrigerant evaporation temperature in the heat exchanger 14c may be 0° C. or lower. For this reason, there is a possibility that frost forms on the heat exchanger 14c.

Therefore, in the air conditioner 1a of the present embodiment as well, when the heating mode is executed, a subroutine equivalent to that of the control flow described in FIG. 12 of the first embodiment is executed at predetermined intervals. In the present embodiment, the operation mode in step S14 in FIG. 12 is the "heating mode".

(d) Defrosting Mode

In the air conditioner 1a, the operation in the defrosting mode can be performed in order to defrost the heat exchanger 14c. Further, the vehicle interior can be dehumidified and heated simultaneously with the execution of the defrosting mode. Therefore, the defrosting mode described below can also be expressed as a dehumidifying heating mode with defrosting capacity.

In the defrosting mode, the control device 40 decreases the refrigerant discharge capacity of the compressor 11 in the heat pump cycle 10. That is, the flow rate of the refrigerant flowing through the heat exchanger 14c is made lower than that in the heating mode. However, the control device 40 operates the compressor 11 without stopping.

The control device 40 controls the operation of the expansion valve 13d such that the temperature of the refrigerant flowing through heat exchanger 14c falls within the reference defrosting temperature range described in the first embodiment. More specifically, in the defrosting mode, the control device 40 controls the operations of the compressor 11 and the expansion valve 13d such that the temperature of the refrigerant flowing through the heat exchanger 14c falls within the reference defrosting temperature range.

As in the inside-air heating mode, the control device 40 controls the operations of the heat medium pump 21, the first flow rate control valve 24a, and the second flow rate control valve 24b of the heat medium circuit 20.

As in the inside-air heating mode, the control device 40 controls the operations of the heat medium pump 21, the first flow rate control valve 24a, and the second flow rate control valve 24b of the heat medium circuit 20.

The control device 40 controls the operation of the heat exchange part inlet-side inside/outside air switch device 32e to make a switch to a ventilation path that guides inside air to the heat exchanger 14c. The control device 40 controls the operation of the heat exchange part outlet-side inside/outside air switch device 33e to make a switch to a ventilation path that guides the air having passed through the heat exchanger 14c into the vehicle interior via the heating part-side air passage 31f.

The control device 40 controls the operation of the heating part inlet-side inside/outside air switch device 32f to make a switch to a ventilation path that guides the outside air to the heater core 22. The control device 40 stops the blower 36. As in the inside-air heating mode, the control device 40 controls the operation of the indoor blower 37.

Accordingly, in the heat pump cycle 10 in the defrosting mode, the high-pressure refrigerant discharged from the compressor 11 flows into the refrigerant passage of the water-refrigerant heat exchanger 12. At this time, the temperature of the high-pressure refrigerant is lower than in the inside-air heating mode and the outside-air heating mode. Hence the refrigerant having flowed into the refrigerant passage of the water-refrigerant heat exchanger 12 flows out of the refrigerant passage while hardly radiating heat to the heat medium.

The refrigerant having flowed out of the refrigerant passage of the water-refrigerant heat exchanger 12 flows into the expansion valve 13d via the receiver 17 and is decompressed. The low-pressure refrigerant decompressed in expansion valve 13d flows into heat exchanger 14c. In the heat exchanger 14c, the refrigerant radiates heat to frost. Accordingly, the frost melts, and the defrosting of the second heat exchanger 14b proceeds. The refrigerant having flowed out of the heat exchanger 14c is sucked into the compressor 11 and compressed again.

The heat medium circuit 20 in the defrosting mode operates as in the inside-air heating mode.

Figure 23:
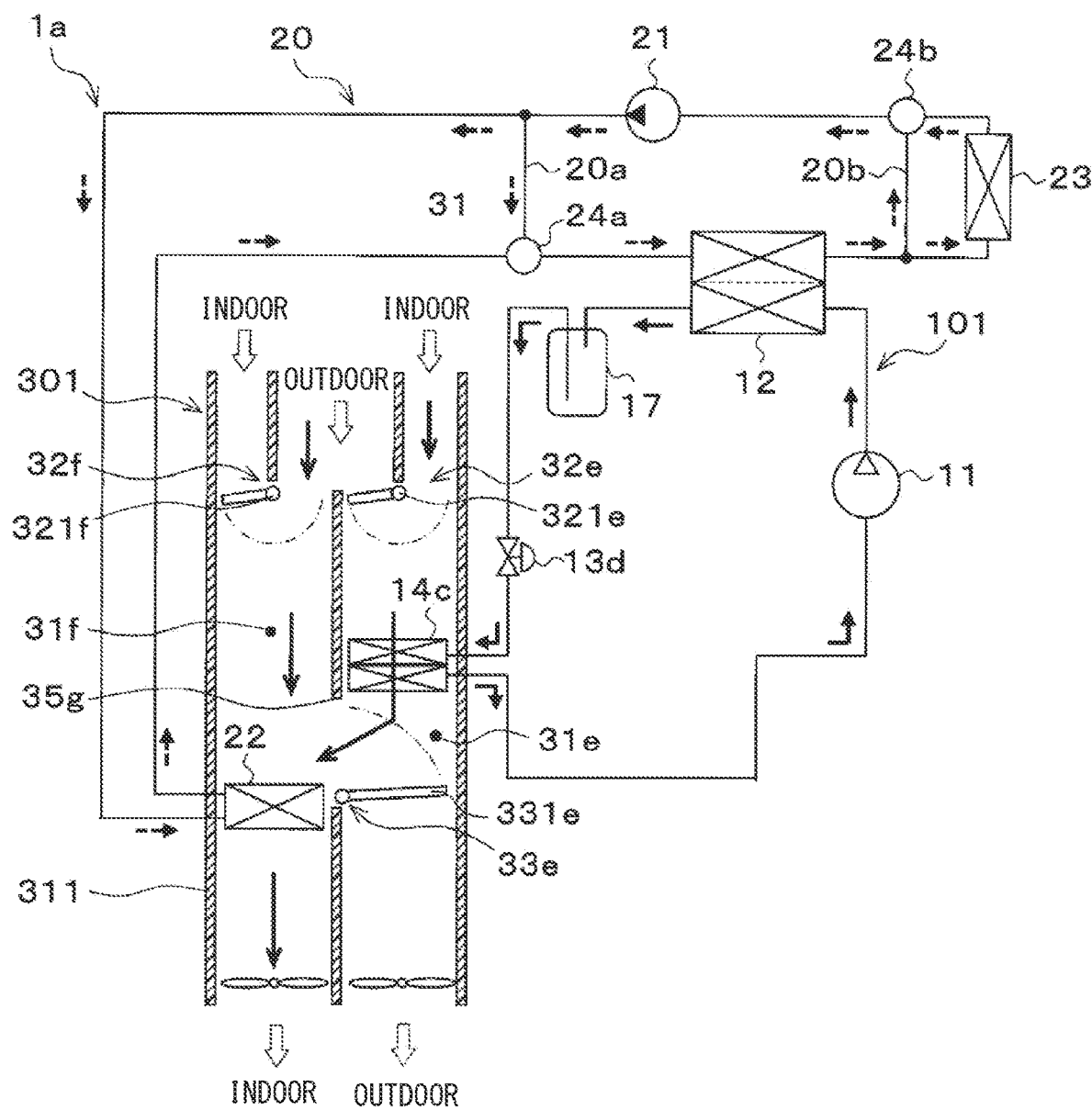
FIG. 23 is a schematic overall configuration diagram illustrating an airflow in a defrosting mode of the air conditioner of the seventh embodiment.

In the air conditioning unit 30 in the defrosting mode, air flows through each air passage as indicated by a thick arrow in FIG. 23.

The heat exchange part inlet-side inside/outside air switch device 32e allows inside air to flow into the heat exchange part-side air passage 31e. The relatively high-temperature inside air having flowed into the heat exchange part-side air passage 31e radiates heat to the frost of the heat exchanger 14c. Thereby, the frost melts, and the defrosting of the heat exchanger 14c proceeds. Further, the air having flowed into the heat exchanger 14c is cooled to near 0° C. by frost and dehumidified.

The air having passed through the heat exchanger 14c flows into the heating part-side air passage 31f by the heat exchange part outlet-side inside/outside air switch device 33e. Further, the heating part inlet-side inside/outside air switch device 32f allows outside air having a relatively low temperature and humidity to flow into the heating part-side air passage 31f.

The air having flowed into the heating part-side air passage 31f flows into the heater core 22. The air having flowed into the heater core 22 exchanges heat with the heat medium and is reheated. The air reheated in the heater core 22 is blown into the vehicle interior. This achieves defrosting of the second heat exchanger 14b and dehumidifying and heating in the vehicle interior.

In the defrosting mode of the present embodiment, the heat exchange part outlet-side inside/outside air switch device 33e guides the air having passed through the heat exchanger 14c to the heating part-side air passage 31f in order to achieve the dehumidifying and heating in the vehicle interior simultaneously with the defrosting of the heat exchanger 14c. In contrast, when the dehumidifying and heating in the vehicle interior is not required, the heat exchange part outlet-side inside/outside air switch device 33e may guide the air having passed through the heat exchanger 14c out of the vehicle interior. In this case, the blower 36 may be operated.

As described above, according to the air conditioner 1 of the present embodiment, it is possible to achieve heating and dehumidifying heating in the vehicle interior by switching the operation mode.

More specifically, in the heating mode (i.e., the inside-air heating mode and the outside-air heating mode) of the present embodiment, the heat exchange part outlet-side inside/outside air switch device 33e makes a switch to the ventilation path that guides the air having passed through the heat exchanger 14c out of the vehicle interior. Accordingly, in the heating mode, the vehicle interior can be heated by guiding the air heated in the heater core 22 to the vehicle interior.

Further, in the heating mode, the air can be reliably heated in the heater core 22 by using the heat absorbed from the outside air by the refrigerant in the heat exchanger 14c as a heat source. However, in the heating mode, the refrigerant evaporation temperature in the heat exchanger 14c may be 0° C. or lower as described above. For this reason, there is a possibility that frost forms on the heat exchanger 14c.

In contrast, in the defrosting mode of the present embodiment, the heat exchange part inlet-side inside/outside air switch device 32e makes a switch to the ventilation path that guides the inside air to the heat exchanger 14c. It is thus possible to defrost the heat exchanger 14c by using the heat of inside air having a relatively high temperature.

At the same time, in the defrosting mode, by reducing the flow rate of the refrigerant flowing through the heat exchanger 14c more than in the heating mode, the temperature of the refrigerant flowing through the heat exchanger 14c is maintained within the reference defrosting temperature range. Therefore, the heat exchanger 14c can be defrosted effectively.

As a result, according to the air conditioner 1a of the present embodiment, energy consumed in the heat pump cycle 101 for defrosting the heat exchanger 14c can be reduced.

In the defrosting mode of the present embodiment, the compressor 11 is operated, so that the refrigerant can be allowed to flow in the heat pump cycle 101, and the refrigerant can be allowed to flow in the heat exchanger 14c. Accordingly, the temperature equalization of heat exchanger 14c is promoted in the defrosting mode, so that the heat exchanger 14c can be defrosted more effectively.

In the defrosting mode of the present embodiment, the heat exchange part outlet-side inside/outside air switch device 33e makes a switch to the ventilation path that guides the air having passed through the heat exchanger 14c into the vehicle interior. Accordingly, the heater core 22 can reheat the air having passed through the heat exchanger 14c to dehumidify and heat the vehicle interior.

At this time, in the defrosting mode, since the refrigerant discharge capacity of the compressor 11 is decreased, the heating capacity of the heat medium in the water-refrigerant heat exchanger 12 decreases. Hence there is a possibility that the air heating capacity of the heater core 22 also decreases temporarily.

In contrast, in the defrosting mode of the present embodiment, the heating of the air can be continued in the heater core 22 by using the heat stored in the heat medium circulating in the heat medium circuit 20. Accordingly, deterioration in the occupant's feeling of heating can be restricted in the normal defrosting mode.

Further, in the present embodiment, the heating mode and the defrosting mode are switched continuously. Therefore, heating, as well as dehumidification and heating, in the vehicle interior can be continuously performed, and deterioration in the occupant's feeling of heating can further be restricted.

Eighth Embodiment

Figure 24:
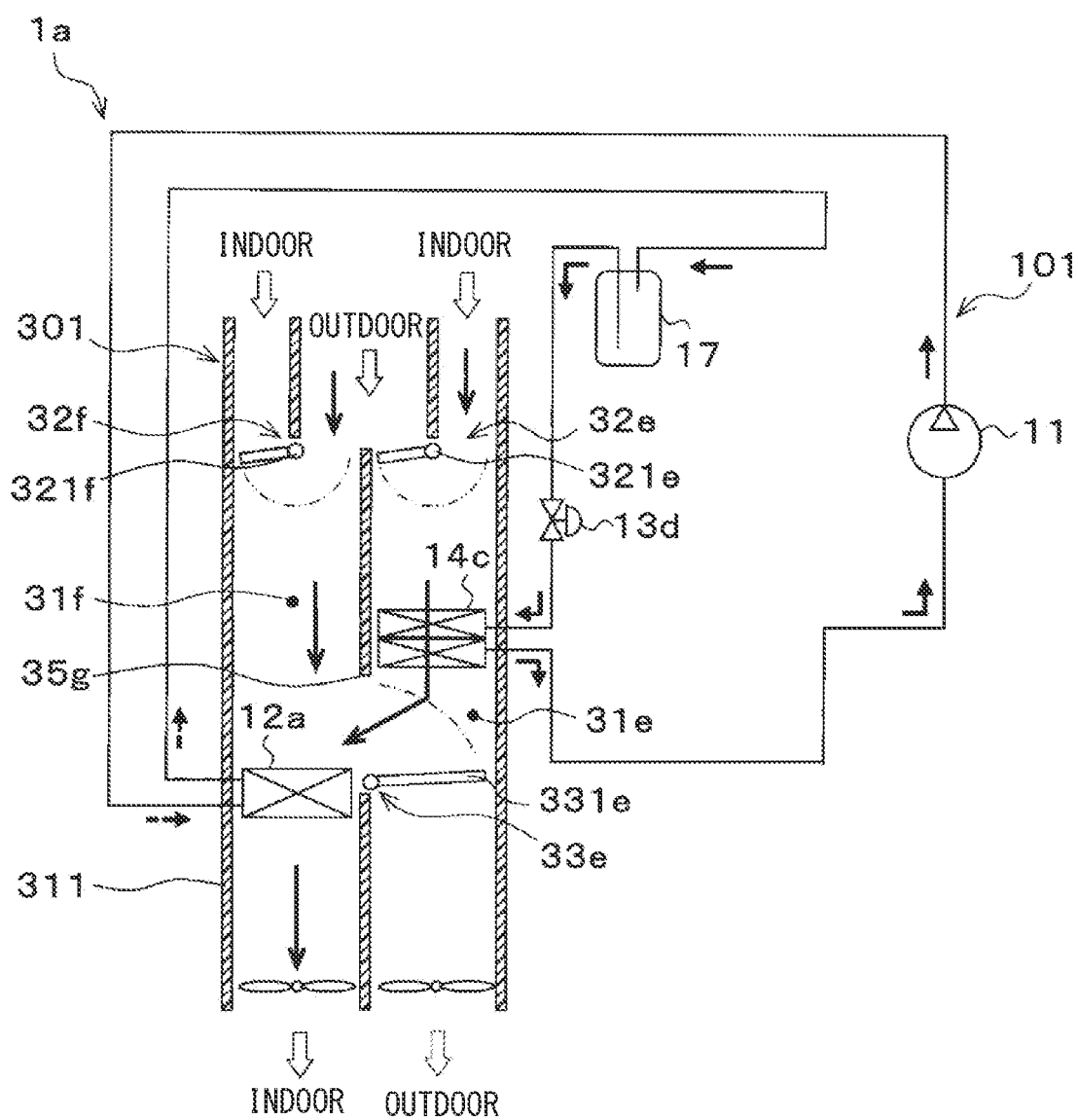
FIG. 24 is a schematic overall configuration diagram illustrating an airflow in a defrosting mode of an air conditioner of an eighth embodiment.

In the present embodiment, as illustrated in FIG. 24, the configuration of the air conditioner 1a is changed with respect to the seventh embodiment. Specifically, in the air conditioner 1a of the present embodiment, the heat medium circuit 20 is eliminated as in the second embodiment. The heat pump cycle 101 of the present embodiment includes an interior condenser 12a instead of the water-refrigerant heat exchanger 12. The other configurations of the air conditioner 1a are similar to those of the seventh embodiment.

The air conditioner 1a of the present embodiment can execute substantially the same heating mode and defrosting mode as those of the seventh embodiment by exchanging heat between the refrigerant and air in the interior condenser 12a. Therefore, as described in the second embodiment, although there is a possibility that the feeling of heating deteriorates, energy consumed in the heat pump cycle 101 for defrosting the heat exchanger 14c can be reduced as in the seventh embodiment.

Ninth Embodiment

Figure 25:
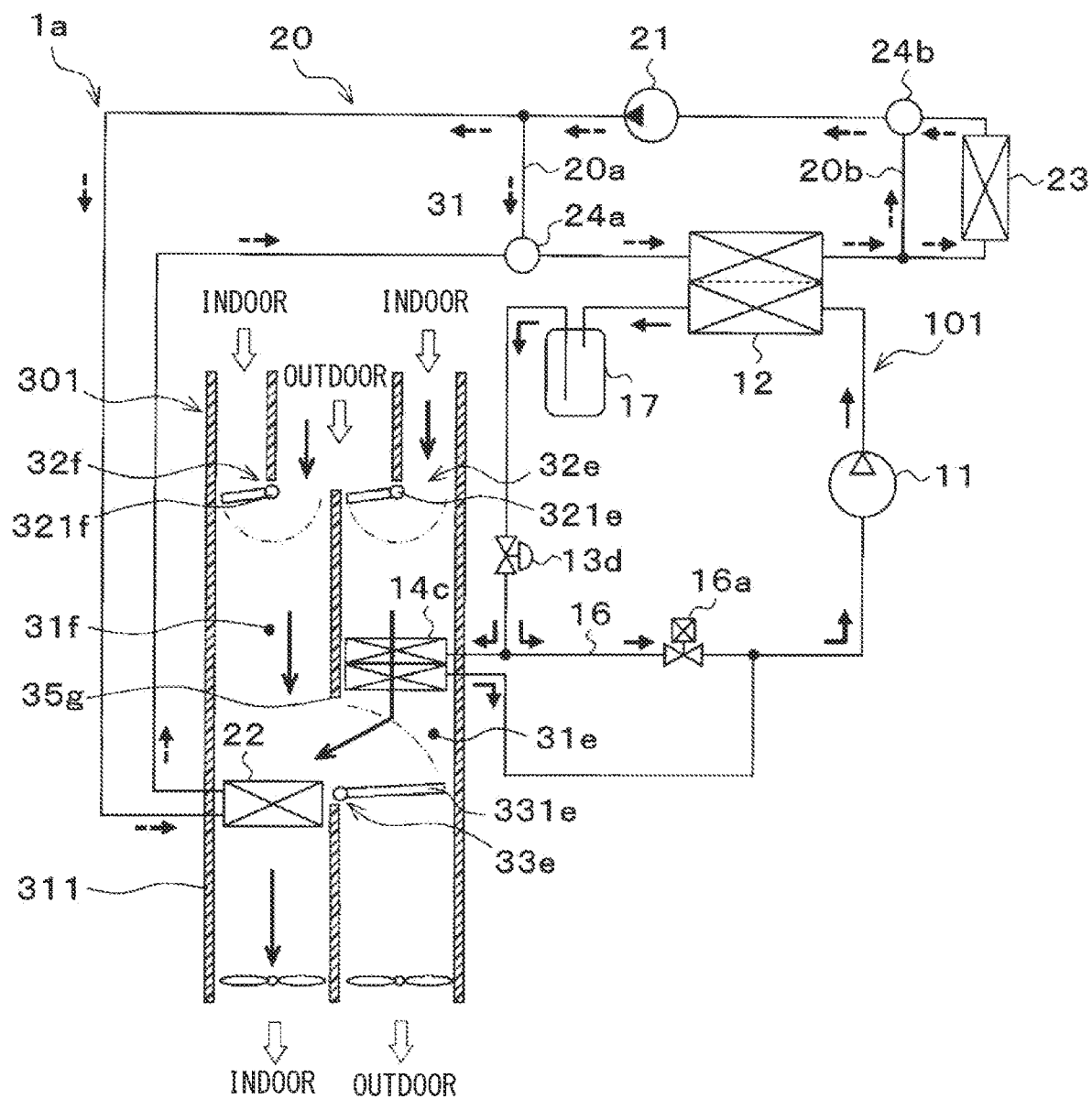
FIG. 25 is a schematic overall configuration diagram illustrating an airflow in a defrosting mode of an air conditioner according to a ninth embodiment.

In the present embodiment, as illustrated in FIG. 25, the configuration of the heat pump cycle 101 is changed with respect to the seventh embodiment.

Specifically, the heat pump cycle 101 of the present embodiment includes a refrigerant bypass passage 16 and an on-off valve 16a similar to those of the third embodiment. More specifically, the refrigerant bypass passage 16 of the present embodiment is a refrigerant passage that guides the refrigerant on the outlet side of the expansion valve 13d to the suction side of the compressor 11 while allowing the refrigerant to bypass the heat exchanger 14c. The other configurations of the air conditioner 1a are similar to those of the seventh embodiment.

The air conditioner 1a of the present embodiment operates as in the seventh embodiment when the on-off valve 16a closes the refrigerant bypass passage 16. Therefore, as in the seventh embodiment, energy consumed in the heat pump cycle 101 for defrosting the heat exchanger 14c can be reduced.

Further, in the defrosting mode, the on-off valve 16a can reduce the flow rate of the refrigerant flowing through heat exchanger 14c. Further, in the water-refrigerant heat exchanger 12, heat generated by the compression work of the compressor 11 can be radiated to the heat medium. Accordingly, in the defrosting mode, it is possible to achieve defrosting of the heat exchanger 14c and dehumidifying and heating in the vehicle interior.

Tenth Embodiment

Figure 26:
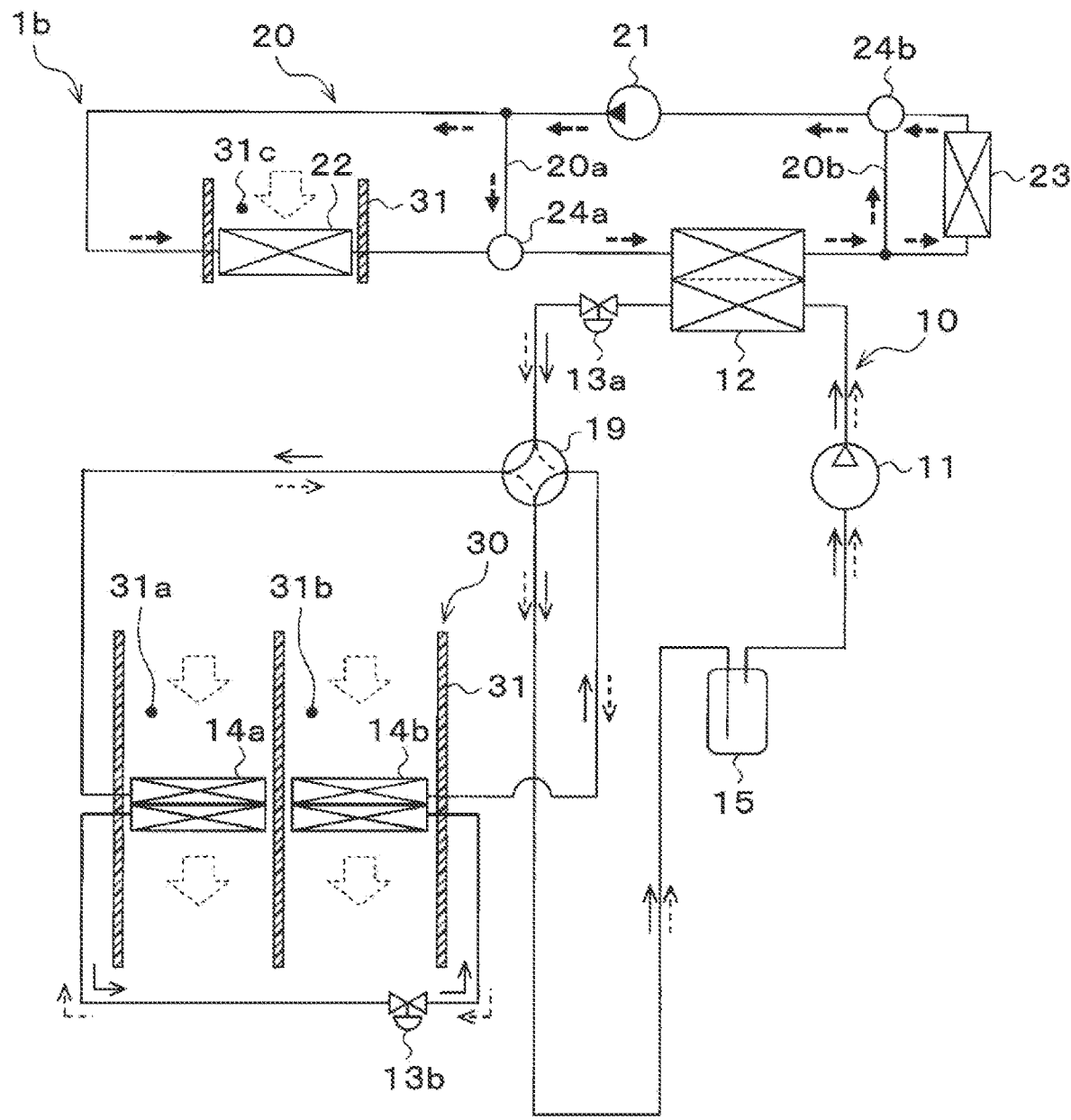
FIG. 26 is a schematic overall configuration diagram of an air conditioner according to a tenth embodiment.

An air conditioner 1b for a vehicle will be described with reference to FIGS. 26 and 27. The air conditioner 1b includes a heat pump cycle 102, a heat medium circuit 20, an air conditioning unit 30, a control device 40, and the like. As illustrated in FIG. 26 and the like, the heat pump cycle 102 of the present embodiment is obtained by adding a four-way valve 19 as a refrigerant circuit switching part to the heat pump cycle 10 described in the first embodiment.

The four-way valve 19 can make a switch to a first refrigerant circuit that connects the outlet side of the first expansion valve 13a and one refrigerant inlet/outlet side of the first heat exchanger 14a and simultaneously connects one refrigerant inlet/outlet side of the second heat exchanger 14b and the inlet side of the accumulator 15. Also, the four-way valve 19 can make a switch to the second refrigerant circuit that connects the outlet side of the first expansion valve 13a and one refrigerant inlet/outlet side of the second heat exchanger 14b and simultaneously connects the refrigerant outlet side of the first heat exchanger 14a and the inlet side of the accumulator 15.

In the first refrigerant circuit, the refrigerant circuit is switched to a refrigerant circuit in which the refrigerant circulates through the discharge port of the compressor 11, the water-refrigerant heat exchanger 12, the first expansion valve 13a, the first heat exchanger 14a, the second expansion valve 13b, the second heat exchanger 14b, the accumulator 15, and the suction port of the compressor 11 in this order. That is, the heat pump cycle 102 switched to the first refrigerant circuit has the same cycle configuration as the heat pump cycle 10 described in the first embodiment.

In the second refrigerant circuit, the refrigerant circuit is switched to a refrigerant circuit in which the refrigerant circulates through the discharge port of the compressor 11, the water-refrigerant heat exchanger 12, the first expansion valve 13a, the second heat exchanger 14b, the second expansion valve 13b, the first heat exchanger 14a, the accumulator 15, and the suction port of the compressor 11 in this order. That is, the heat pump cycle 102 switched to the second refrigerant circuit is switched to a refrigerant circuit in which the first heat exchanger 14a and the second heat exchanger 14b are replaced with respect to the heat pump cycle 10 described in the first embodiment.

The other configurations of the air conditioner 1b are the same as those of the air conditioner 1 described in the first embodiment. Therefore, when the four-way valve 19 has switched the heat pump cycle 102 to the first refrigerant circuit, the air conditioner 1b operates exactly in the same manner as the air conditioner 1 described in the first embodiment and can obtain exactly the same effect.

Further, the air conditioner 1b of the present embodiment can perform the operation in the defrosting heating mode for heating the vehicle interior while defrosting the heat exchanger on which frost has formed. Hereinafter, the operation in the defrosting heating mode will be described.

(d-4) Defrosting Heating Mode

In the following description, the defrosting heating mode when the four-way valve 19 has made a switch to the first refrigerant circuit will be described as an example. When the four-way valve 19 has made a switch to the first refrigerant circuit, the first heat exchanger 14a is defined as one heat exchange part having no possibility of frosting. The second heat exchanger 14b is defined as the other heat exchange part having a possibility of frosting.

In the defrosting heating mode, the control device 40 controls the operation of the four-way valve 19 such that the second heat exchanger 14b, which is the other heat exchange part, is disposed on the refrigerant flow upstream side of the first heat exchanger 14a, which is the one heat exchange part. That is, the control device 40 makes a switch to the second refrigerant circuit.

The control device 40 temporarily stops the compressor 11 when the four-way valve 19 switches the refrigerant circuit. After the four-way valve 19 switches the refrigerant circuit, the control device 40 controls the operation of the compressor 11 in the heat pump cycle 102 as in the second dehumidifying heating mode.

The control device 40 brings the first expansion valve 13a into the throttling state. More specifically, the control device 40 controls the operation of the first expansion valve 13a such that the temperature of the refrigerant flowing through the second heat exchanger 14b falls within the reference defrosting temperature range.

The control device 40 brings the second expansion valve 13b into the throttling state. More specifically, the control device 40 controls the operation of the first expansion valve 13a such that the refrigerant evaporation temperature in the first heat exchanger 14a is lower than the outside air temperature Tam.

As in the normal defrosting mode, the control device 40 controls the operations of the heat medium pump 21, the first flow rate control valve 24a, and the second flow rate control valve 24b of the heat medium circuit 20.

The control device 40 controls the operation of the first inlet-side inside/outside air switch device 32a so as to open the first outside air introduction port 323a of the air conditioning unit 30 and close the first inside air introduction port 35a. That is, the first inlet-side inside/outside air switch device 32a makes a switch to the ventilation path that guides outside air to the first heat exchanger 14a that is one heat exchanger.

The control device 40 controls the operation of the first outlet-side inside/outside air switch device 33a so as to open the first exterior outflow port 333a and close the first interior outflow port 35b. That is, the first outlet-side inside/outside air switch device 33a makes a switch to the ventilation path that guides the air having passed through the first heat exchanger 14a, which is one of the heat exchangers, out of the vehicle interior.

The control device 40 controls the operation of the second inlet-side inside/outside air switch device 32b so as to close the second outside air introduction port 323b and open the second inside air introduction port 35c. That is, the second inlet-side inside/outside air switch device 32b makes a switch to the ventilation path that guides the inside air to the second heat exchanger 14b, which is the other heat exchanger.

The control device 40 controls the operation of the second outlet-side inside/outside air switch device 33b so as to close the second exterior outflow port 333b and open the second interior outflow port 35d. That is, the second outlet-side inside/outside air switch device 33b makes a switch to the ventilation path that guides the air having passed through the second heat exchanger 14b, which is the other heat exchanger, into the vehicle interior.

As in the inside-air cooling mode, the control device 40 controls the operations of the outside air introduction device 32c, the heating part inlet-side switch device 34a, and the heating part outlet-side switch device 34b. As in the inside-air cooling mode, the control device 40 controls the operations of the blower 36 and the indoor blower 37.

Thus, in the heat pump cycle 102 in the defrosting and heating mode, the high-pressure refrigerant discharged from the compressor 11 flows into the refrigerant passage of the water-refrigerant heat exchanger 12. In the water-refrigerant heat exchanger 12, the heat medium is heated.

The refrigerant having flowed out of the refrigerant passage of the water-refrigerant heat exchanger 12 flows into the first expansion valve 13a and is decompressed. At this time, the throttle opening of the first expansion valve 13a is regulated such that the temperature of the refrigerant flowing through the second heat exchanger 14b falls within the reference defrosting temperature range.

The low-pressure refrigerant decompressed in first expansion valve 13a flows into the second heat exchanger 14b via the four-way valve 19. In the second heat exchanger 14b, the refrigerant radiates heat to the frost. Thereby, the frost melts, and the defrosting of the second heat exchanger 14b proceeds.

The refrigerant having flowed out of the second heat exchanger 14b flows into the second expansion valve 13b and is decompressed. At this time, the throttle opening of the second expansion valve 13b is regulated such that the refrigerant evaporation temperature in the first heat exchanger 14a is lower than the outside air temperature Tam.

The low-pressure refrigerant decompressed in the second expansion valve 13b flows into the first heat exchanger 14a. The refrigerant having flowed into the first heat exchanger 14a exchanges heat with air (specifically, outside air) having flowed into the first air passage 31a from the first outside air introduction port 323a of the air conditioning unit 30. In the first heat exchanger 14a, the refrigerant absorbs heat from the air and evaporates.

The refrigerant having flowed out of the first heat exchanger 14a flows into accumulator 15 via four-way valve 19. The refrigerant having flowed into the accumulator 15 is separated into gas and liquid. The gas-phase refrigerant separated in the accumulator 15 is sucked into the compressor 11 and compressed again.

The heat medium circuit 20 in the defrosting heating mode operates as in the normal defrosting mode.

Figure 27:
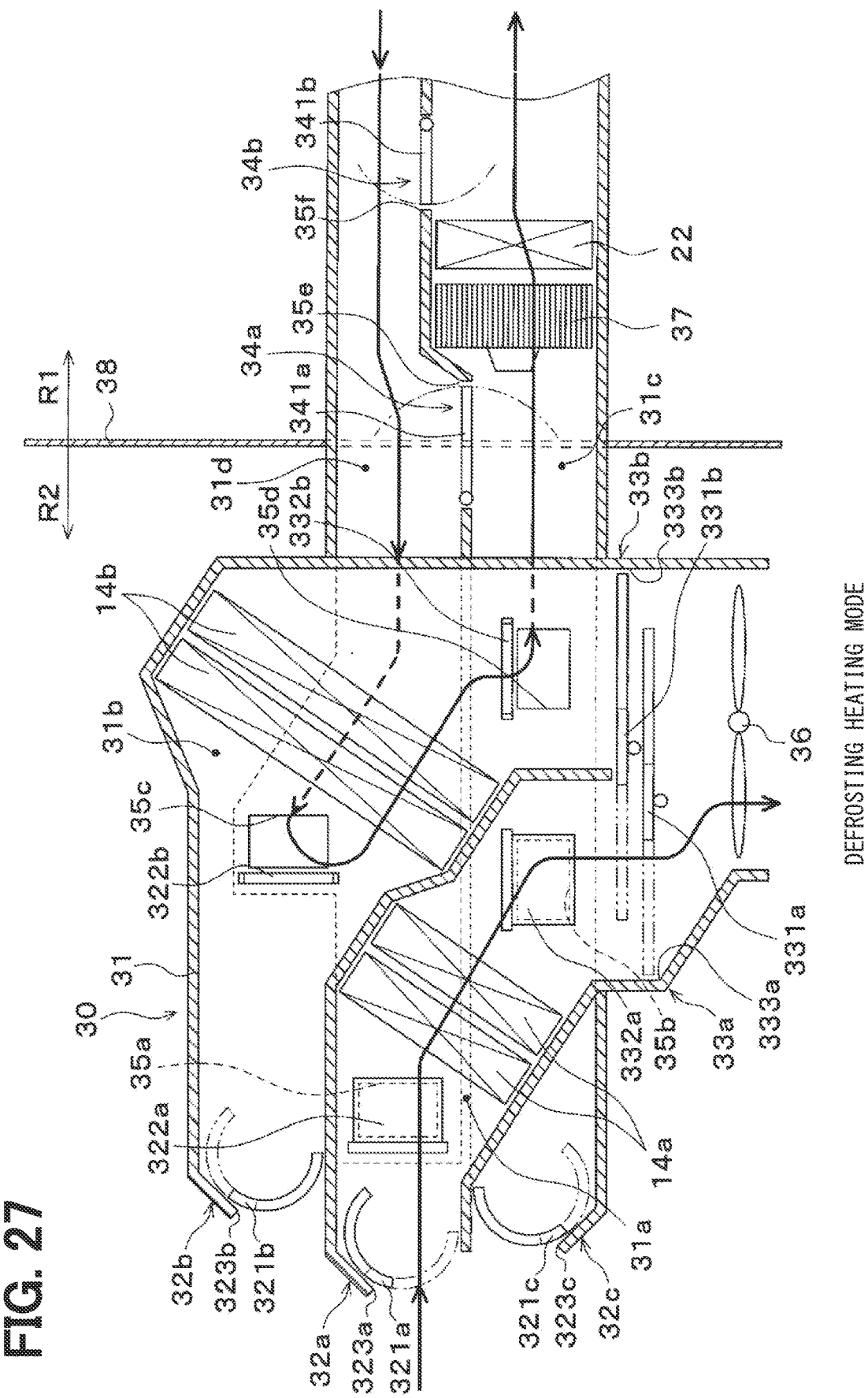
FIG. 27 is a schematic sectional view illustrating an airflow in a normal defrosting mode of the air conditioning unit according to the tenth embodiment.

In the air conditioning unit 30 in the defrosting heating mode, air flows through each air passage as indicated by a thick arrow in FIG. 27.

Air (specifically, outside air) flows into the first air passage 31a via the first outside air introduction port 323a. The air having flowed into the first air passage 31a exchanges heat with the refrigerant in the first heat exchanger 14a and absorbs heat. The air heated in the first heat exchanger 14a flows out of the first exterior outflow port 333a. The air having flowed out of the first exterior outflow port 333a is sucked into the blower 36 and released out of the vehicle interior.

Air (specifically, inside air) having flowed through the fourth air passage 31d flows into the second air passage 31b via the second inside air introduction port 35c. The relatively high-temperature inside air having flowed into the second air passage 31b radiates heat to frost. Thereby, the frost melts, and the defrosting of the second heat exchanger 14b proceeds. Further, the air having flowed into the second air passage 31b is cooled to near 0° C. by frost and dehumidified. The air having passed through the second heat exchanger 14b flows into the third air passage 31c via the second interior outflow port 35d.

The air having flowed into the third air passage 31c is sucked into the indoor blower 37 and blown to the heater core 22. The air having flowed into the heater core 22 exchanges heat with the heat medium and is reheated. The air reheated in the heater core 22 is blown into the vehicle interior. This achieves defrosting of the second heat exchanger 14b and dehumidifying and heating in the vehicle interior.

In the air conditioner 1b of the present embodiment, when the four-way valve 19 has switched the heat pump cycle 102 to the second refrigerant circuit, the second heat exchanger 14b serves as one heat exchange part, and the first heat exchanger 14a serves as the other heat exchange part. Also, when the four-way valve 19 has switched the heat pump cycle 102 to the second refrigerant circuit, the operation modes described in the first embodiment and the defrosting and heating mode described above can be performed.

Since the air conditioner 1b of the present embodiment operates as described above, the energy consumed in the heat pump cycle 102 for defrosting the other heat exchange part can be reduced as in the first embodiment regardless of which refrigerant circuit a switch is made to.

The air conditioner 1b of the present embodiment can operate in the defrosting and heating mode. In the defrosting and heating mode, the heat medium can be heated in the water-refrigerant heat exchanger 12 by using the heat absorbed from the outside air by the refrigerant in one heat exchange part as a heat source. Therefore, in the defrosting and heating mode, it is possible to restrict a decrease in the heating capacity of the heat medium as compared with the normal defrosting mode, and it is possible to further restrict deterioration in the occupant's feeling of heating.

In the defrosting and heating mode, the refrigerant evaporation temperature in one of the heat exchange parts may be 0° C. or lower. For this reason, in the defrosting and heating mode, frost may form on one heat exchange part. Therefore, the defrosting/defrosting mode may be switched to the normal defrosting mode in an operating condition in which frost forms on one heat exchange part before the defrosting of the other heat exchange part is completed.

Eleventh Embodiment

Figure 28:
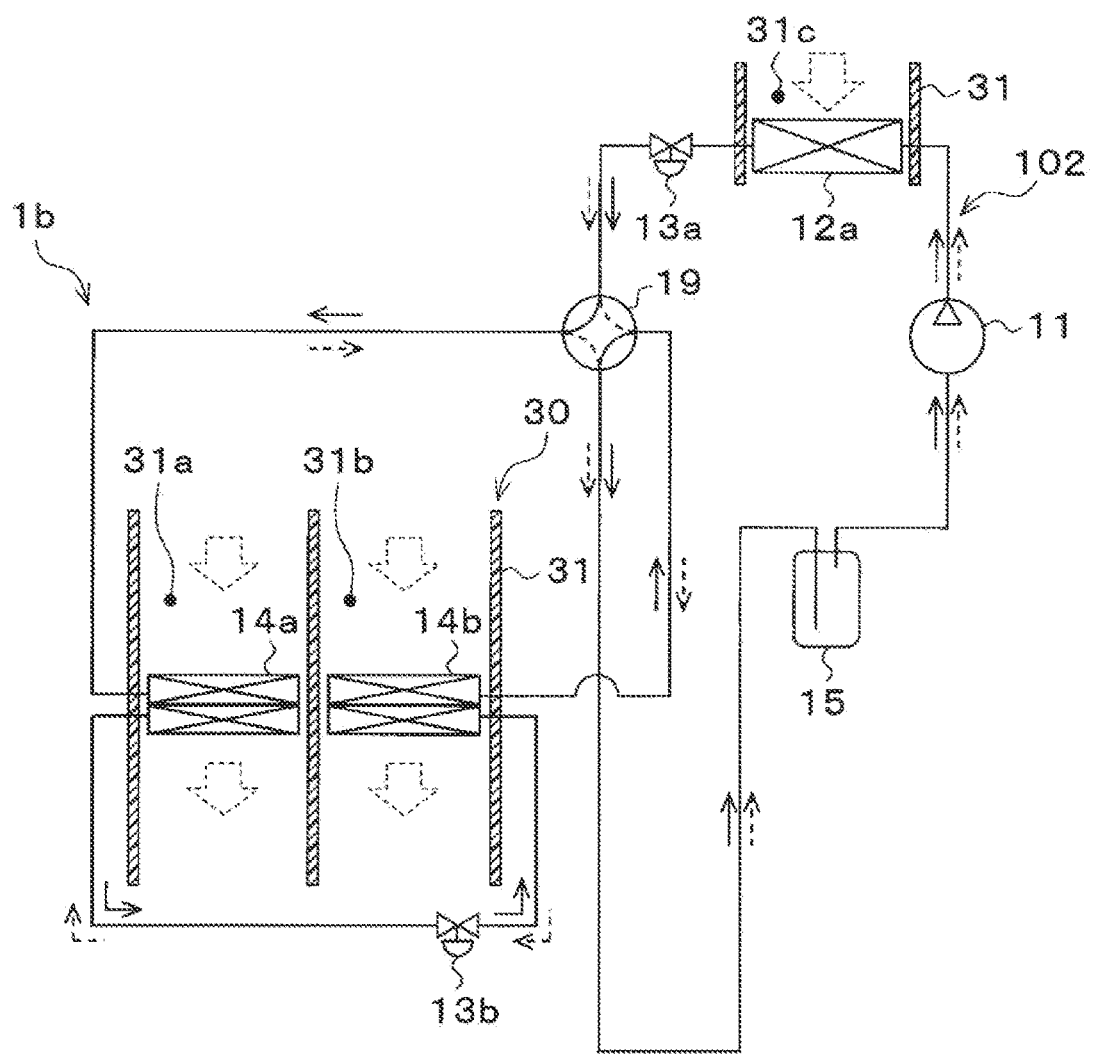
FIG. 28 is a schematic overall configuration diagram of an air conditioner according to an eleventh embodiment.

In the present embodiment, as illustrated in FIG. 28, the configuration of the air conditioner 1b is changed with respect to the tenth embodiment. Specifically, in the air conditioner 1b of the present embodiment, the heat medium circuit 20 is eliminated as in the second embodiment. The heat pump cycle 102 of the present embodiment includes an interior condenser 12a instead of the water-refrigerant heat exchanger 12. The other configurations of the air conditioner 1b are similar to those of the tenth embodiment.

The air conditioner 1b of the present embodiment can substantially execute the heating mode and the defrosting mode as in the tenth embodiment by exchanging heat between the refrigerant and air in the interior condenser 12a. Therefore, as described in the second embodiment, although there is a possibility that the feeling of heating deteriorates, energy consumed in the heat pump cycle 102 for defrosting the other heat exchange part can be reduced as in the tenth embodiment.

Twelfth Embodiment

Figure 29:
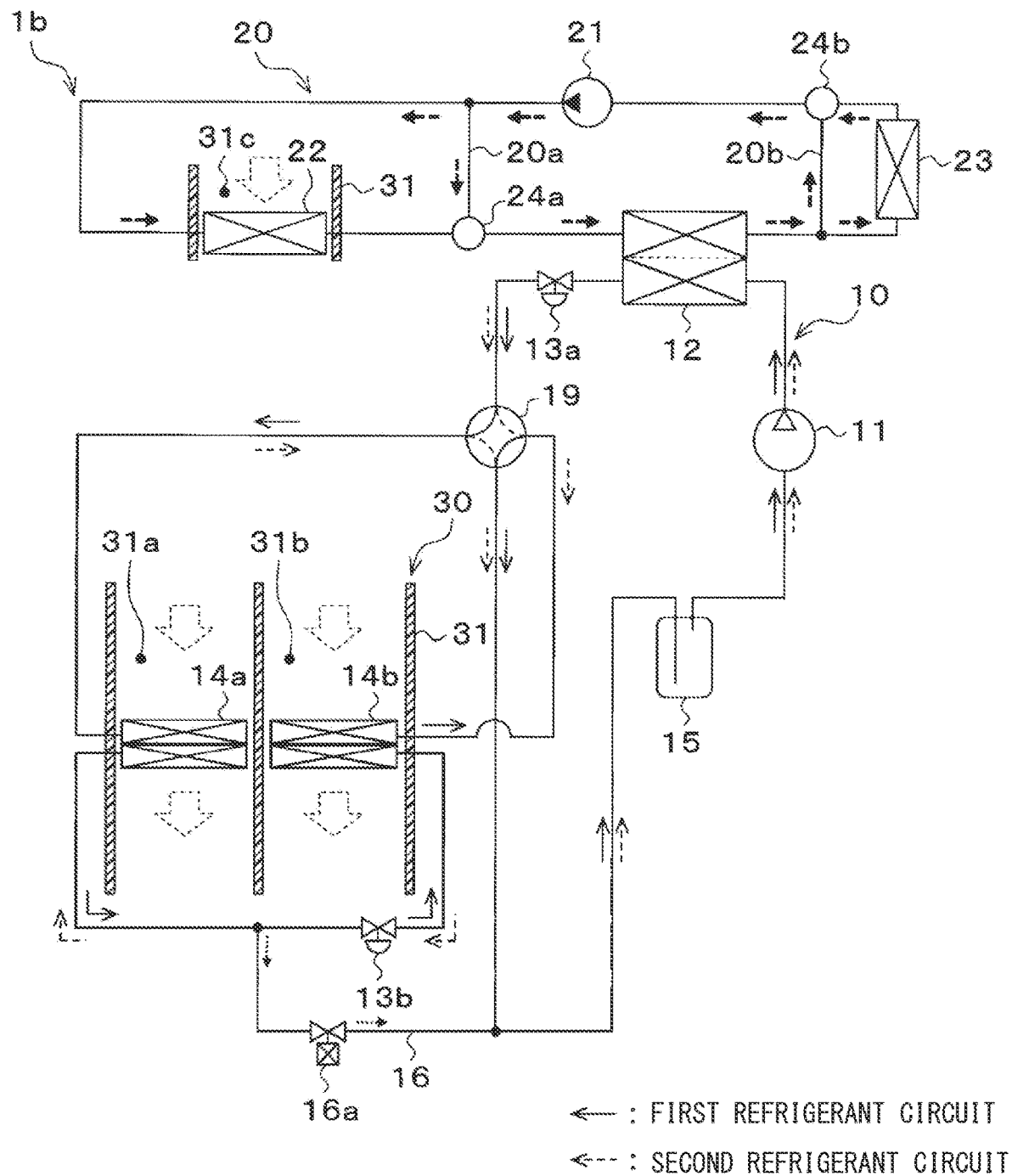
FIG. 29 is a schematic overall configuration diagram of an air conditioner according to a twelfth embodiment.

In the present embodiment, as illustrated in FIG. 29, the configuration of the heat pump cycle 102 is changed with respect to the tenth embodiment.

Specifically, the heat pump cycle 102 of the present embodiment includes a refrigerant bypass passage 16 and an on-off valve 16a similar to those of the third embodiment. The refrigerant bypass passage 16 of the present embodiment guides the refrigerant flowing through the refrigerant passage connecting the first heat exchanger 14a and the second expansion valve 13b to the inlet side of the accumulator 15 (i.e., the suction side of the compressor 11). The other configurations of the air conditioner 1b are similar to those of the tenth embodiment.

The air conditioner 1b of the present embodiment operates as in the tenth embodiment when the on-off valve 16a closes the refrigerant bypass passage 16.

Therefore, as in the tenth embodiment, energy consumed in the heat pump cycle 102 for defrosting the other heat exchange part can be reduced.

Further, in the defrosting mode, the on-off valve 16a can reduce the flow rate of the refrigerant flowing through heat exchanger 14c. Further, in the water-refrigerant heat exchanger 12, heat generated by the compression work of the compressor 11 can be radiated to the heat medium. Accordingly, in the defrosting mode, it is possible to achieve defrosting of the heat exchanger 14c and dehumidifying and heating in the vehicle interior.

Thirteenth Embodiment

Figure 30:
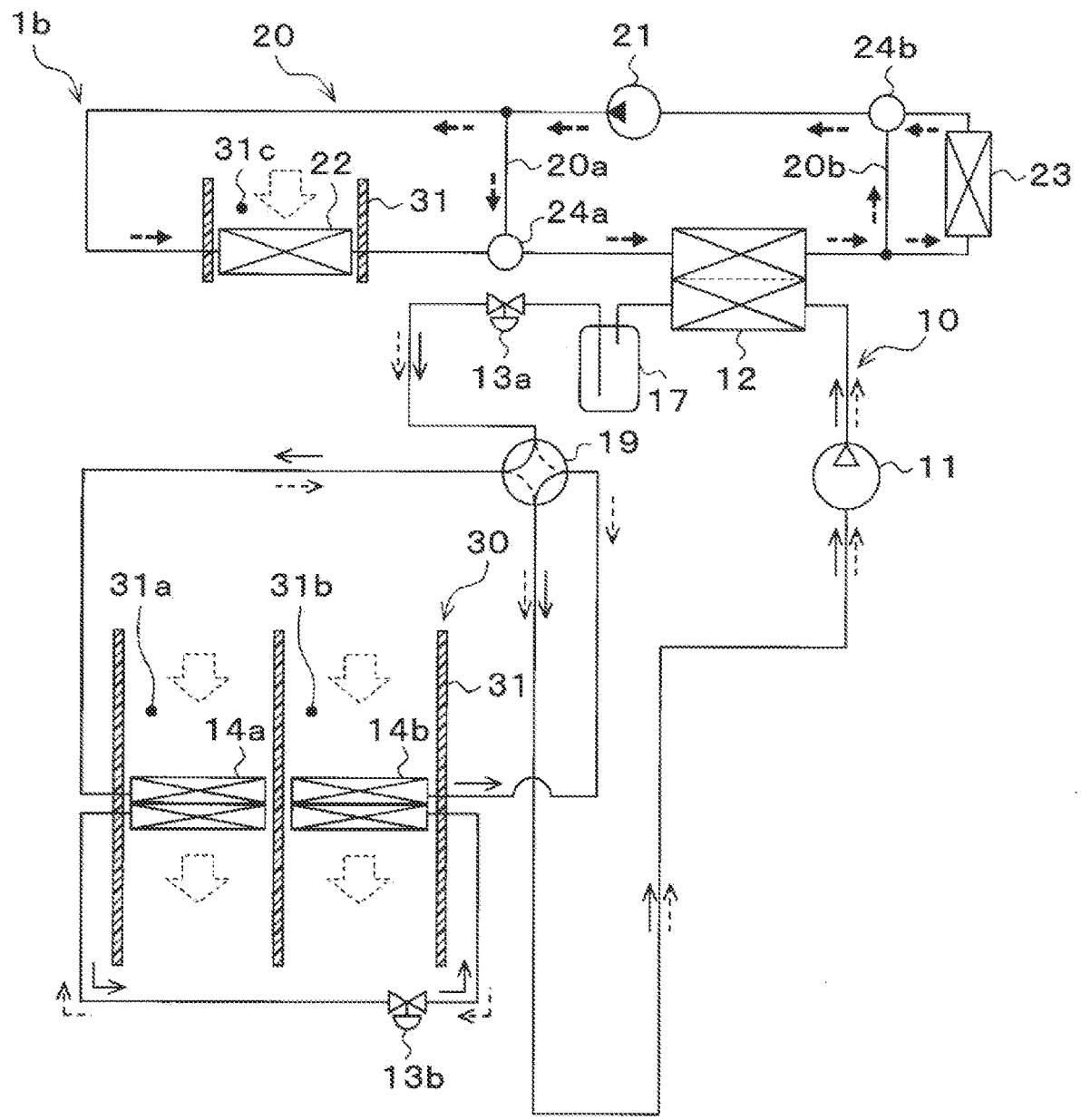
FIG. 30 is a schematic overall configuration diagram of an air conditioner according to a thirteenth embodiment.

In the present embodiment, as illustrated in FIG. 30, the configuration of the heat pump cycle 102 is changed with respect to the tenth embodiment. Specifically, as in the fourth embodiment, the heat pump cycle 102 of the present embodiment includes a receiver 17 instead of the accumulator 15. The other configurations and operations of the air conditioner 1b are similar to those of the tenth embodiment.

Therefore, as in the tenth embodiment, energy consumed in the heat pump cycle 102 for defrosting the other heat exchange part can be reduced.

Further, in the air conditioner 1b of the present embodiment, the refrigerant can be supercooled in one heat exchange part in the inside-air cooling mode or the outside-air cooling mode. It is thus possible to increase an enthalpy difference obtained by subtracting the enthalpy of the refrigerant on the outlet side of the other heat exchange part from the enthalpy of the refrigerant on the inlet side. As a result, the cooling capacity of the air in the other heat exchange part can be improved.

Fourteenth Embodiment

Figure 31:
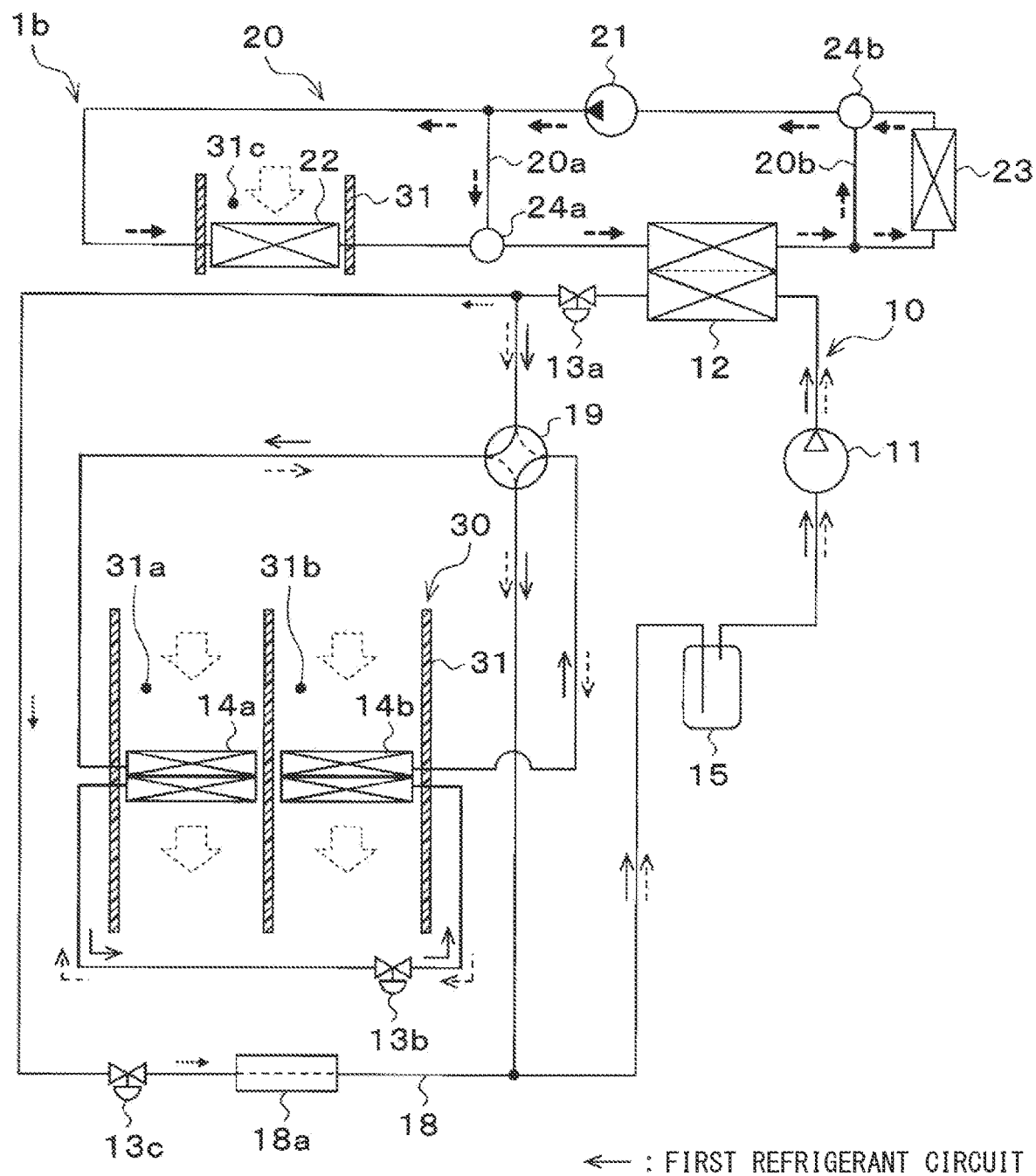
FIG. 31 is a schematic overall configuration diagram of an air conditioner according to a fourteenth embodiment.

In the present embodiment, as illustrated in FIG. 31, the configuration of the heat pump cycle 102 is changed with respect to the tenth embodiment.

Specifically, the heat pump cycle 102 of the present embodiment includes a third expansion valve 13c, a cooling bypass passage 18, and a cooler 18a similar to those of the sixth embodiment. The cooling bypass passage 18 of the present embodiment guides the refrigerant flowing through the refrigerant passage connecting the outlet side of the first expansion valve 13b and the four-way valve 19 to the inlet side of the accumulator 15 (i.e., the suction side of the compressor 11). The other configurations of the air conditioner 1b are similar to those of the tenth embodiment.

The air conditioner 1b of the present embodiment operates as in the tenth embodiment when the third expansion valve 13c is in the fully closed state. Therefore, as in the tenth embodiment, energy consumed in the heat pump cycle 102 for defrosting the other heat exchange part can be reduced.

Further, in the air conditioner 1b of the present embodiment, by the control device 40 bringing the third expansion valve 13c into the throttling state in the inside-air cooling mode or the outside-air cooling mode, the battery, which is the cooling target, can be cooled.

The present disclosure is not limited to the embodiments described above but can be variously modified as follows without departing from the spirit of the present disclosure.

In the above-described embodiment, the air conditioner according to the present disclosure is applied to a vehicle, but is not limited thereto. The air conditioner according to the present disclosure may be applied to a stationary air conditioner.

In the above embodiment, the air conditioner is capable of executing various operation modes, but is not limited thereto. That is, the air conditioner only needs to be able to execute a necessary operation mode.

For example, in the air conditioner 1 described in the first to sixth embodiments, at least the second defrosting and heating mode and the normal defrosting mode may be switched. Accordingly, energy consumed in the heat pump cycle 10 for defrosting the second heat exchanger 14b can be reduced.

For example, in air conditioner 1a described in the seventh to ninth embodiments, at least the heating mode (i.e., one of the inside-air heating mode and the outside-air heating mode) and the defrosting mode may be switched. Accordingly, energy consumed in the heat pump cycle 101 for defrosting heat exchanger 14c can be reduced.

For example, in the air conditioner 1b described in the tenth to fourteenth embodiments, at least the second defrosting and heating mode and the normal defrosting mode may be switched. Accordingly, energy consumed in the heat pump cycle 102 for defrosting the other heat exchange part can be reduced.

Further, an operation mode except for those described in the above embodiments may be implemented. For example, in the ventilation heating mode described in the first embodiment, the first outlet-side inside/outside air switch device 33a may switch the ventilation path so as to guide a part or all of the air having passed through the first heat exchanger 14a into the vehicle interior.

The heat pump cycles 10, 101, 102 are not limited to those disclosed in the above embodiments.

For example, in the tenth to fourteenth embodiments, the four-way valve 19 is adopted as the refrigerant circuit switching part, but is not limited thereto. The refrigerant circuit switching part may be formed by combining a plurality of (e.g., four) on-off valves.

In the above embodiment, R1234yf is adopted as the refrigerant, but the refrigerant is not limited thereto. For example, R134a, R600a, R410A, R404A, R32, R407C, and the like may be adopted. Alternatively, a mixed refrigerant, obtained by mixing a plurality of kinds of these refrigerants, or the like may be adopted.

The heat medium circuit 20 is not limited to that disclosed in the above-described embodiment.

For example, the heat medium pump 21 may be disposed in a flow path from the first flow rate control valve 24a to the heat medium passage of the water-refrigerant heat exchanger 12. Instead of the first flow rate control valve 24a, an electric three-way valve may be adopted.

An auxiliary heating part that heats the heat medium may be disposed in the heat medium circuit 20. As the auxiliary heating part, an electric heating part that generates heat when power is supplied from the control device 40 can be adopted. When the heat medium cannot be sufficiently heated in the water-refrigerant heat exchanger 12, the control device 40 may operate the electric heater such that the heat medium temperature Tw approaches the target heat medium temperature TWO.

In the embodiments described above, the ethylene glycol aqueous solution is adopted as the heat medium, but the heat medium is not limited thereto. For example, dimethylpolysiloxane, a solution containing a nanofluid or the like, an antifreeze liquid, an aqueous liquid refrigerant containing alcohol or the like, a liquid medium containing oil or the like, or the like can be adopted.

The air conditioning units 30, 301 are not limited to those disclosed in the above embodiment.

For example, an air bypass passage that allows air to flow while bypassing the heater core 22 or the interior condenser 12a may be provided in the third air passage 31c of the air conditioning unit 30 or the heating part-side air passage 31f of the air conditioning unit 301. Further, an air mix door may be disposed to regulate a ratio between the volume of air flowing through the heater core 22 or the interior condenser 12a and the volume of air flowing through the air bypass passage.

Accordingly, the temperature of the air blown into the space to be air-conditioned can be regulated by regulating the air volume ratio of the air mix door.

The means disclosed in each of the above embodiments may be appropriately combined within a feasible range.

For example, in the heat pump cycle 10 including the refrigerant bypass passage 16 and the on-off valve 16a described in the third embodiment, the receiver 17 may be adopted as described in the fourth embodiment. For example, in the heat pump cycle 10 having different heat exchange areas of the first heat exchanger 14a and the second heat exchanger 14b described in the fifth embodiment, the accumulator 15 may be adopted as described in the first embodiment.

Although the present disclosure has been described in accordance with the embodiments, it is understood that the present disclosure is not limited to the embodiments and structures. The present disclosure encompasses various modifications and modifications within an equivalent scope. In addition, various combinations and forms, as well as other combinations and forms including only one element, more than that, or less than that, are also within the scope and idea of the present disclosure.

What is claimed is:

1. An air conditioner comprising:
a heat pump cycle including a compressor that compresses and discharges a refrigerant, a heating part that heats air blown into a space to be air-conditioned by using the refrigerant discharged from the compressor as a heat source, a first decompression part that decompresses the refrigerant on a downstream side of the heating part, a first heat exchange part that exchanges heat between the refrigerant flowing out of the first decompression part and air, a second decompression part that decompresses the refrigerant flowing out of the first heat exchange part, and a second heat exchange part that exchanges heat between the refrigerant flowing out of the second decompression part and air;
a first inlet-side inside/outside air switching part configured to switch between a ventilation path that guides inside air in the space to be air-conditioned to the first heat exchange part and a ventilation path that guides outside air outside the space to be air-conditioned to the first heat exchange part;
a first outlet-side outside/inside air switching part configured to switch between a ventilation path that guides the air passing through the first heat exchange part into the space to be air-conditioned and a ventilation path that guides the air passing through the first heat exchange part out of the space to be air-conditioned;
a second inlet-side inside/outside air switching part configured to switch between a ventilation path that guides the inside air to the second heat exchange part and a ventilation path that guides the outside air to the second heat exchange part; and a second outlet-side inside/outside air switching part configured to switch between a ventilation path that guides the air passing through the second heat exchange part into the space to be air-conditioned and a ventilation path that guides the air passing through the second heat exchange part out of the space to be air-conditioned, wherein the heating part is disposed to be able to heat at least the air passing through the first heat exchange part, in a dehumidifying heating mode for dehumidifying and heating the space to be air-conditioned, the first outlet-side inside/outside air switching part makes a switch to the ventilation path that guides the air passing through the first heat exchange part into the space to be air-conditioned, and the heating part heats the air passing through the first heat exchange part, the second inlet-side inside/outside air switching part makes a switch to the ventilation path that guides the outside air to the second heat exchange part, and the second outlet-side inside/outside air switching part makes a switch to the ventilation path that guides the air passing through the second heat exchange part out of the space to be air-conditioned, and in a defrosting mode for defrosting the second heat exchange part, the second inlet-side inside/outside air switching part makes a switch to the ventilation path that passes the inside air to the second heat exchange part and further reduces a flow rate of the refrigerant flowing through the second heat exchange part more than in the dehumidifying heating mode to maintain a temperature of the refrigerant flowing through the second heat exchange part within a predetermined reference defrosting temperature range.

2. The air conditioner according to claim 1, wherein the compressor is operated in the defrosting mode.

3. The air conditioner according to claim 1, wherein in the defrosting mode, the second outlet-side inside/outside air switching part makes a switch to the ventilation path that guides the air passing through the second heat exchange part into the space to be air-conditioned.

4. The air conditioner according to claim 1, wherein
in a cooling mode for cooling the space to be air-conditioned,
the first inlet-side inside/outside air switching part makes a switch to the ventilation path that guides the outside air to the first heat exchange part,
the first outlet-side inside/outside air switching part makes a switch to the ventilation path that guides the air passing through the first heat exchange part out of the space to be air-conditioned,
the second inlet-side inside/outside air switching part makes a switch to the ventilation path that guides at least one of the inside air and the outside air to the second heat exchange part, and
the second outlet-side inside/outside air switching part makes a switch to the ventilation path that guides the air passing through the second heat exchange part into the space to be air-conditioned.

5. The air conditioner according to claim 4, further comprising a liquid storage configured to separate the refrigerant flowing out of the heating part into gas and liquid and allows the separated liquid-phase refrigerant to flow on a downstream side.

6. The air conditioner according to claim 1, wherein a heat exchange area of the first heat exchange part is smaller than a heat exchange area of the second heat exchange part.

7. The air conditioner according to claim 1, further comprising a heating part outlet-side switching part configured to guide the air heated in the heating part to an inlet side of the second heat exchange part while allowing the air to bypass the space to be air-conditioned, wherein in a low-temperature inside-air defrosting mode for defrosting the second heat exchange part, the heating part outlet-side switching part allows the air heated in the heating part to flow into the second heat exchange part.

8. The air conditioner according to claim 1, wherein in a heating mode for heating the space to be air-conditioned, the first inlet-side inside/outside air switching part makes a switch to the ventilation path that guides the inside air to the first heat exchange part, the first outlet-side inside/outside air switching part makes a switch to the ventilation path that guides the air passing through the first heat exchange part out of the space to be air-conditioned, and the second inlet-side inside/outside air switching part makes a switch to the ventilation path that guides the outside air to the second heat exchange part.

9. The air conditioner according to claim 8, further comprising an outside air introduction part that guides the outside air allowed to bypass the first heat exchange part and the second heat exchange part to the heating part, wherein in the heating mode, the heating part heats the outside air introduced from the outside air introduction part.

10. The air conditioner according to claim 8, wherein in the heating mode, a refrigerant evaporation temperature in the first heat exchange part is regulated to a temperature lower than the inside air and not causing frost to form on the first heat exchange part.

11. An air conditioner comprising:
a heat pump cycle including a compressor that compresses and discharges a refrigerant, a heating part that heats blown air blown into a space to be air-conditioned by using a high-pressure refrigerant discharged from the compressor as a heat source, a first decompression part that decompresses the refrigerant on a downstream side of the heating part, a second decompression part that decompresses the refrigerant on the downstream side of the heating part, a first heat exchange part that exchanges heat between the refrigerant flowing out of one of the first decompression part and the second decompression part and air, a second heat exchange part that exchanges heat between the refrigerant flowing out of the other of the first decompression part and the second decompression part and air, and a refrigerant circuit switching part that switches a refrigerant circuit;
a first inlet-side inside/outside air switching part configured to switch between a ventilation path that guides inside air in the space to be air-conditioned to the first heat exchange part and a ventilation path that guides outside air outside the space to be air-conditioned to the first heat exchange part;
a first outlet-side outside/inside air switching part configured to switch between a ventilation path that guides the air passing through the first heat exchange part into the space to be air-conditioned and a ventilation path that guides the air passing through the first heat exchange part out of the space to be air-conditioned;

a second inlet-side inside/outside air switching part configured to switch between a ventilation path that guides the inside air to the second heat exchange part and a ventilation path that guides the outside air to the second heat exchange part; and a second outlet-side inside/outside air switching part configured to switch between a ventilation path that guides the air passing through the second heat exchange part into the space to be air-conditioned and a ventilation path that guides the air passing through the second heat exchange part out of the space to be air-conditioned, wherein the heating part is disposed to be able to heat the air passing through the first heat exchange part and the air passing through the second heat exchange part, the refrigerant circuit switching part is configured to be able to switch between a first refrigerant circuit that allows a refrigerant to flow through at least the first decompression part, the first heat exchange part, the second decompression part, and the second heat exchange part in this order and a second refrigerant circuit that allows a refrigerant to flow through the first decompression part, the second heat exchange part, the second decompression part, and the first heat exchange part in this order, in a dehumidifying heating mode for dehumidifying and heating the space to be air-conditioned,
  the first outlet-side inside/outside air switching part and the second outlet-side inside/outside air switching part make a switch to the ventilation path that guides the air passing through one of the first heat exchange part and the second heat exchange part into the space to be air-conditioned, and the heating part heats the air passing through the one of the first heat exchange part and the second heat exchange part,
  the first outlet-side inside/outside air switching part and the second inlet-side inside/outside air switching part switch the outside air to the other of the first heat exchange part and the second heat exchange part, and
  the first inlet-side inside/outside air switching part and the second outlet-side inside/outside air switching part make a switch to the ventilation path that guides the air passing through the other heat exchange part out of the space to be air-conditioned, and in a defrosting mode for defrosting the other heat exchange part,
  the first inlet-side inside/outside air switching part and the second inlet-side inside/outside air switching part make a switch to the ventilation path that passes the inside air to the other heat exchange part and further reduces a flow rate of the refrigerant flowing through the other heat exchange part more than in the dehumidifying heating mode to maintain a temperature of the refrigerant flowing through the other heat exchange part within a predetermined reference defrosting temperature range.

12. The air conditioner according to claim 11, wherein the compressor is operated in the defrosting mode.

13. The air conditioner according to claim 11, wherein in the defrosting mode, the first outlet-side inside/outside air switching part and the second outlet-side inside/outside air switching part make a switch to the ventilation path that guides the air passing through the other heat exchange part into the space to be air-conditioned.

14. The air conditioner according to claim 11, wherein
in a defrosting and heating mode for heating the space to be air-conditioned while defrosting the other heat exchange part, the refrigerant circuit switching part switches the refrigerant circuit such that the other heat exchange part is disposed on an upstream side of the one heat exchange part in a flow of the refrigerant, and
in the defrosting and heating mode,
  the first inlet-side inside/outside air switching part and the second inlet-side inside/outside air switching part make a switch to the ventilation path that guides the outside air to the one heat exchange part,
  the first outlet-side inside/outside air switching part and the second outlet-side inside/outside air switching part make a switch to the ventilation path that guides the air passing through the one heat exchange part out of the space to be air-conditioned,
  the first inlet-side inside/outside air switching part and the second inlet-side inside/outside air switching part make a switch to the ventilation path that guides the inside air to the other heat exchange part, and
  the first outlet-side inside/outside air switching part and the second outlet-side inside/outside air switching part make a switch to the ventilation path that guides the air passing through the other heat exchange part into the space to be air-conditioned.

* * * * *